(12) United States Patent
Samsoondar

(10) Patent No.: US 11,161,109 B2
(45) Date of Patent: Nov. 2, 2021

(54) POINT-OF-CARE TESTING CARTRIDGE WITH SLIDING CAP

(71) Applicant: INVIDX CORP., Markham (CA)

(72) Inventor: James Samsoondar, Markham (CA)

(73) Assignee: INVIDX CORP., Markham (CA)

( * ) Notice: Subject to any disclaimer, the term of this patent is extended or adjusted under 35 U.S.C. 154(b) by 72 days.

(21) Appl. No.: 16/854,201

(22) Filed: Apr. 21, 2020

(65) Prior Publication Data

US 2021/0086173 A1 Mar. 25, 2021

Related U.S. Application Data

(63) Continuation-in-part of application No. 16/575,645, filed on Sep. 19, 2019.

(51) Int. Cl.
*B01L 3/00* (2006.01)
*G01N 35/00* (2006.01)

(52) U.S. Cl.
CPC ........ *B01L 3/502* (2013.01); *G01N 35/00584* (2013.01); *B01L 2200/16* (2013.01); *B01L 2300/042* (2013.01); *B01L 2300/044* (2013.01); *B01L 2300/045* (2013.01); *B01L 2300/048* (2013.01); *B01L 2300/0627* (2013.01); *B01L 2300/0816* (2013.01); *B01L 2300/0858* (2013.01); *B01L 2400/04* (2013.01); *B01L 2400/06* (2013.01)

(58) Field of Classification Search
CPC combination set(s) only.
See application file for complete search history.

(56) References Cited

U.S. PATENT DOCUMENTS 2,656,508 A 10/1953 Coulter
5,112,455 A 5/1992 Cozzette et al.
(Continued)

FOREIGN PATENT DOCUMENTS

CA 2978737 10/2018
WO 2010/070521 A1 6/2010
WO 2018/209418 A1 11/2018

OTHER PUBLICATIONS

Zhang, Chu et al. Mid-Infrared Spectroscopy for Coffee Variety Identification: Comparison of Pattern Recognition Methods, J. of Spectroscopy, vol. 2016, Article ID 7927286, pp. 1-8.
(Continued)

*Primary Examiner* — Mohamed K Amara
(74) *Attorney, Agent, or Firm* — J.A. Lindeman & Co. PLLC

(57) ABSTRACT

A joint point-of-care testing (POCT) analyzer, and a system comprising an analyzer and a cartridge, for measuring one or more analyte quantities per unit volume of blood and one or more formed element quantities per unit volume of blood, is described. Examples of formed elements of blood are red blood cells and white blood cells, and cell counts are determined by imaging using a two-dimensional multi-channel detector. Examples of analytes are hemoglobin and bilirubin, and hemoglobin and bilirubin concentrations are determined by spectroscopy using a one-dimensional multi-channel detector. Other examples of analytes are electrolytes, and electrolyte concentrations may be determined using biosensors incorporated in the cartridges.

29 Claims, 31 Drawing Sheets

(56) References Cited

U.S. PATENT DOCUMENTS

| | | | |
|---|---|---|---|
| 5,241,340 A * | 8/1993 | Fraser | G03G 15/223 355/27 |
| 5,793,485 A | 8/1998 | Gourley | |
| 5,821,399 A | 10/1998 | Zelin | |
| 5,885,840 A | 3/1999 | Kamentsky | |
| 5,962,794 A * | 10/1999 | Kriesel | A61M 5/152 73/861.47 |
| 6,198,532 B1 | 3/2001 | Cabib | |
| 6,267,927 B1 * | 7/2001 | Pomar Longedo | G01N 35/028 422/510 |
| 6,372,503 B1 | 4/2002 | Samsoondar | |
| 6,651,015 B2 | 11/2003 | Samsoondar | |
| 6,711,516 B2 | 3/2004 | Samsoondar | |
| 6,743,576 B1 | 6/2004 | Sabry | |
| 7,139,415 B2 | 11/2006 | Finkbeiner | |
| 7,223,363 B2 * | 5/2007 | McNeely | B01L 3/502715 422/417 |
| 7,468,161 B2 * | 12/2008 | Reinhardt | G01N 1/312 422/63 |
| 7,521,243 B2 | 4/2009 | Lindberg et al. | |
| 7,547,904 B2 | 6/2009 | Schmidt | |
| 7,553,453 B2 | 6/2009 | Gu | |
| 7,738,094 B2 | 6/2010 | Goldberg | |
| 7,745,221 B2 | 6/2010 | Butler | |
| 7,852,490 B2 | 12/2010 | Kiesel | |
| 8,206,650 B2 | 6/2012 | Samsoondar | |
| 8,320,983 B2 | 11/2012 | Martini | |
| 9,063,117 B2 | 6/2015 | Gourley | |
| 9,470,673 B2 | 10/2016 | Samsoondar | |
| 9,634,607 B2 | 4/2017 | Nguyen et al. | |
| 9,821,307 B2 | 11/2017 | Samsoondar | |
| 9,988,599 B2 * | 6/2018 | Bendis | C12M 45/22 |
| 9,999,884 B2 | 6/2018 | Samsoondar | |
| 10,018,640 B2 | 7/2018 | Bornheimer | |
| 10,024,855 B2 | 7/2018 | Kasdan | |
| 10,272,430 B2 | 4/2019 | Samsoondar | |
| 10,408,995 B1 | 9/2019 | Dong | |
| 10,527,568 B2 | 1/2020 | Watkins | |
| 10,900,885 B2 | 1/2021 | Yamamoto | |
| 2002/0009391 A1 * | 1/2002 | Marquiss | B01L 3/50853 422/63 |
| 2003/0173072 A1 * | 9/2003 | Vinegar | B09C 1/02 166/66.5 |
| 2003/0215791 A1 | 11/2003 | Garini | |
| 2004/0108098 A1 * | 6/2004 | Sanders | B29C 66/836 165/46 |
| 2004/0233543 A1 | 11/2004 | Chang | |
| 2005/0054078 A1 | 3/2005 | Miller | |
| 2005/0105077 A1 | 5/2005 | Padmanabhan | |
| 2005/0181383 A1 | 8/2005 | Su | |
| 2006/0068412 A1 | 3/2006 | Tang | |
| 2006/0094108 A1 * | 5/2006 | Yoder | B01L 3/508 435/287.2 |
| 2006/0097176 A1 | 5/2006 | Szu | |
| 2006/0209413 A1 | 9/2006 | Kim | |
| 2006/0238866 A1 | 10/2006 | Von Lerber | |
| 2008/0260225 A1 | 10/2008 | Szu | |
| 2010/0120083 A1 | 5/2010 | Ritzen et al. | |
| 2011/0201045 A1 | 8/2011 | Levine et al. | |
| 2012/0071342 A1 | 3/2012 | Lochhead | |
| 2016/0169801 A1 | 6/2016 | Rogacs | |
| 2017/0059477 A1 | 3/2017 | Feitisch | |
| 2017/0144146 A1 | 5/2017 | Samsoondar | |
| 2017/0341077 A1 | 11/2017 | Neethirajan | |
| 2017/0355637 A1 | 12/2017 | Nomura | |
| 2018/0120575 A1 | 5/2018 | Chen | |
| 2018/0219302 A1 | 8/2018 | Vella | |
| 2018/0272342 A1 | 9/2018 | Samsoondar | |
| 2019/0200909 A1 * | 7/2019 | Richter | A61B 5/150022 |
| 2019/0224667 A1 | 7/2019 | Samsoondar | |
| 2020/0230966 A1 * | 7/2020 | Nukui | B41J 2/175 |
| 2021/0106987 A1 * | 4/2021 | Lind | G01N 35/00 |

OTHER PUBLICATIONS

G. O. Gogstad et al., "Turbidimetric Determination of Prothrombin Time by Clotting in a Centrifugal Analyzer" Clin. Chem. 32/10, 1857-1862, 1986.

* cited by examiner

FIG. 1A (Prior Art)
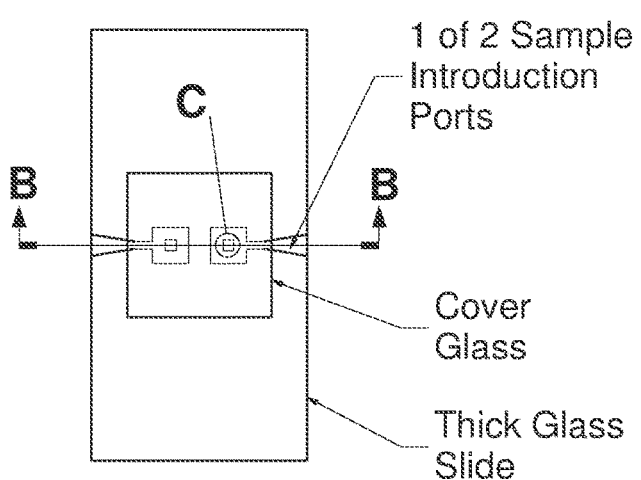
FIG. 1C
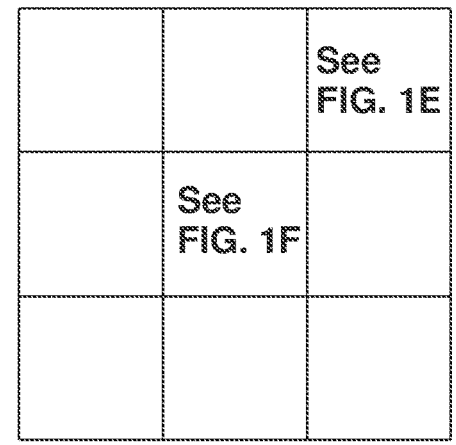
FIG. 1B
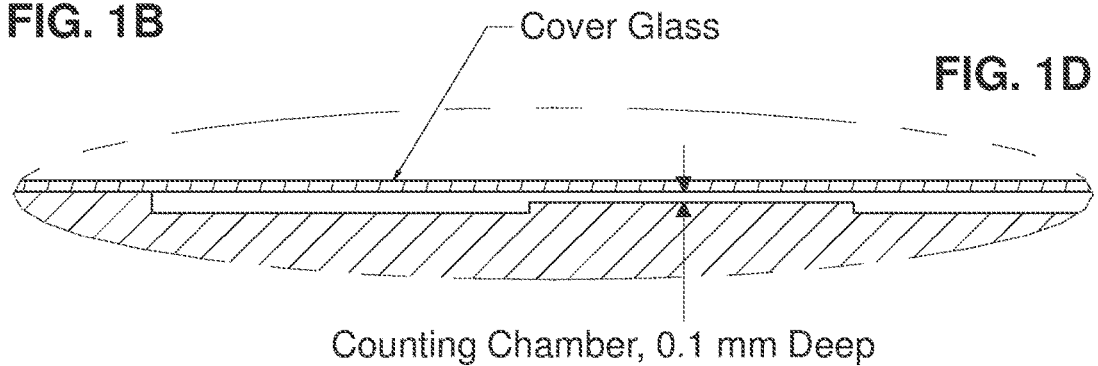
FIG. 1D
FIG. 1E
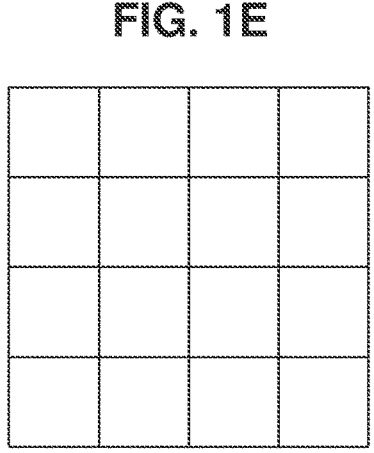
FIG. 1F
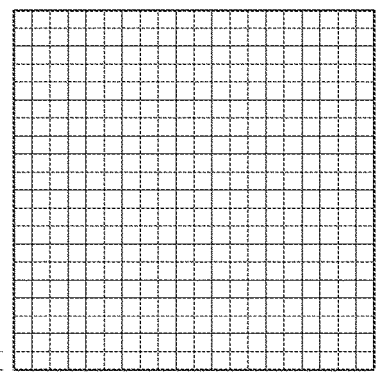

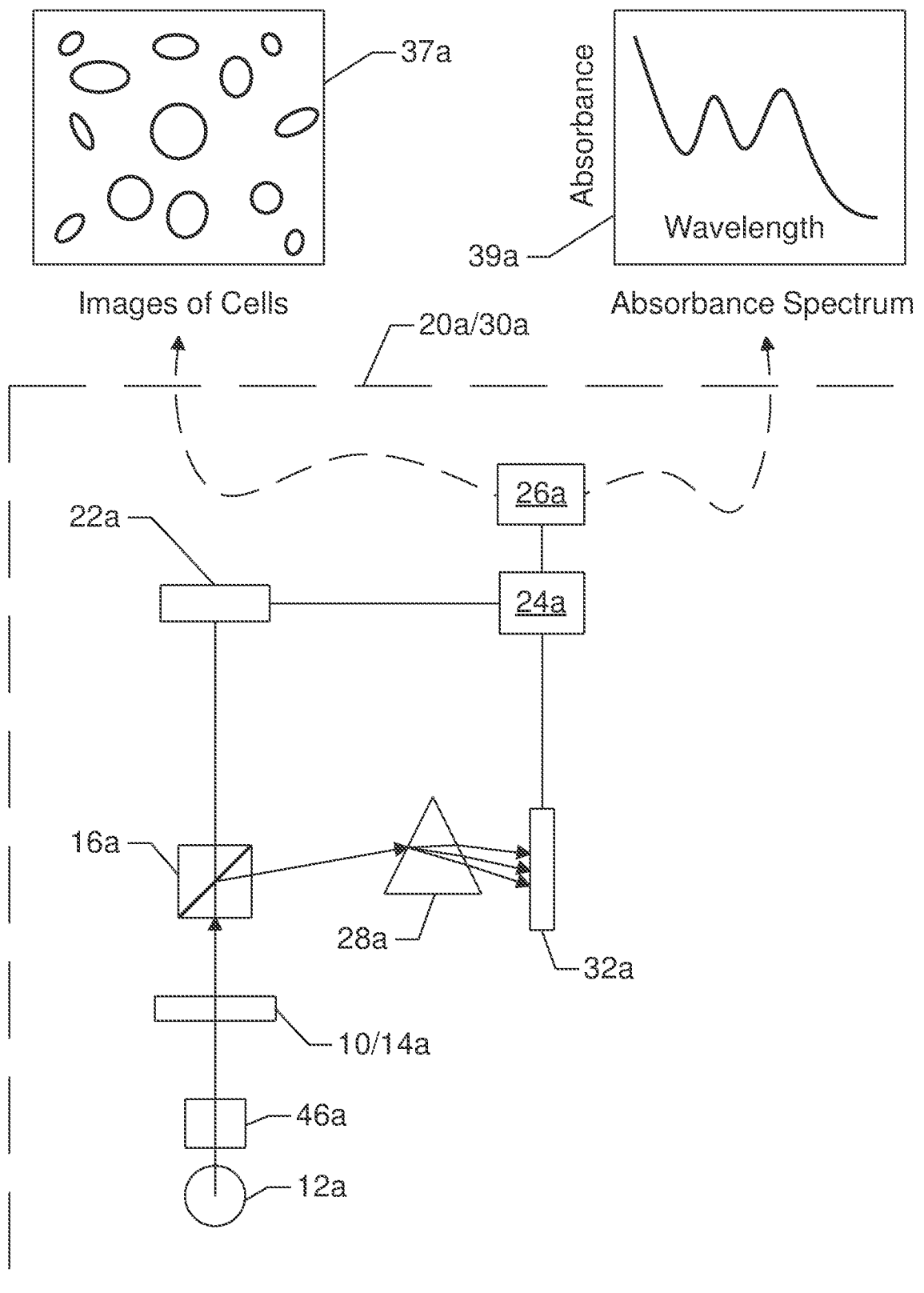

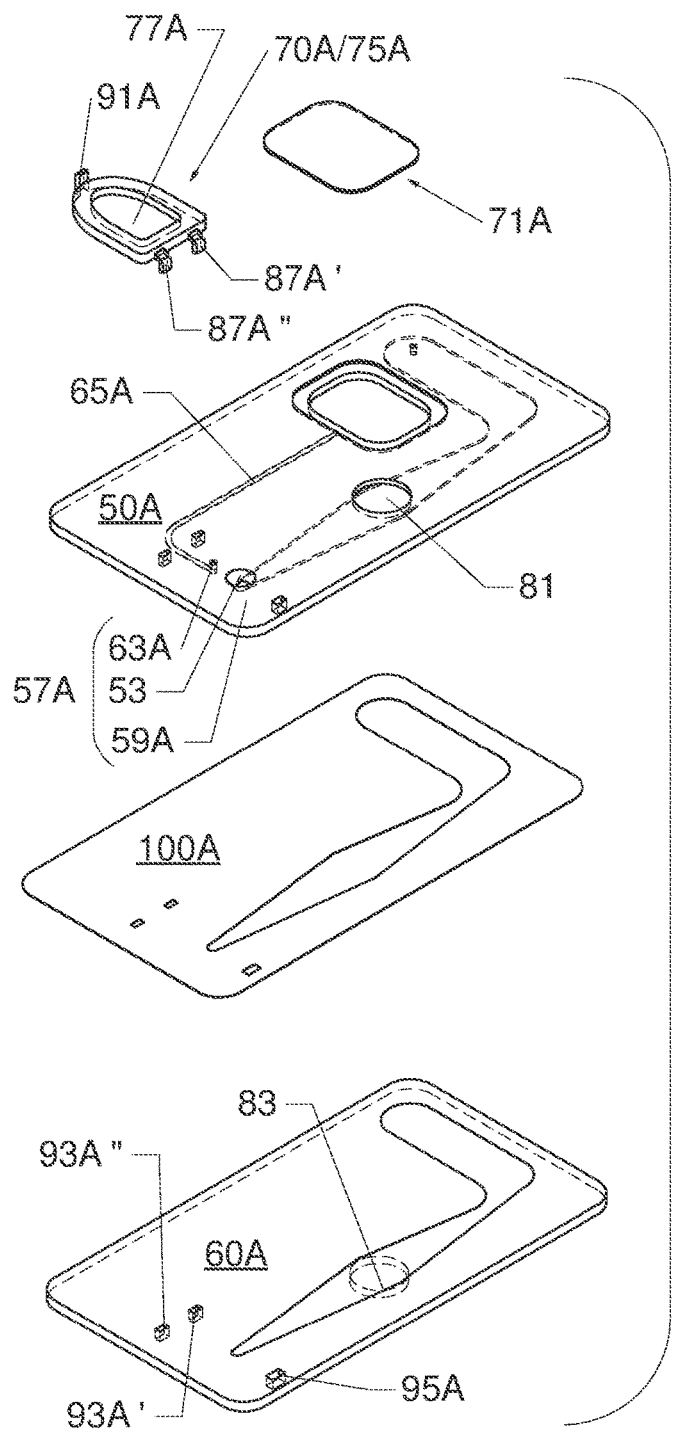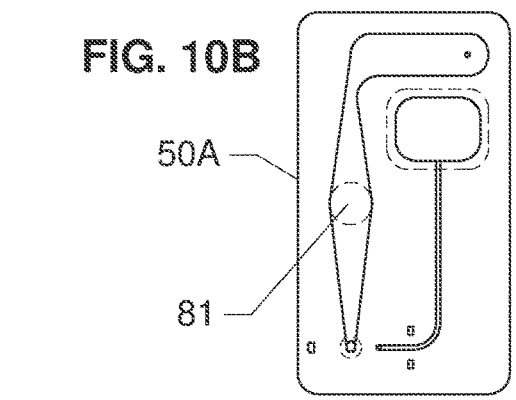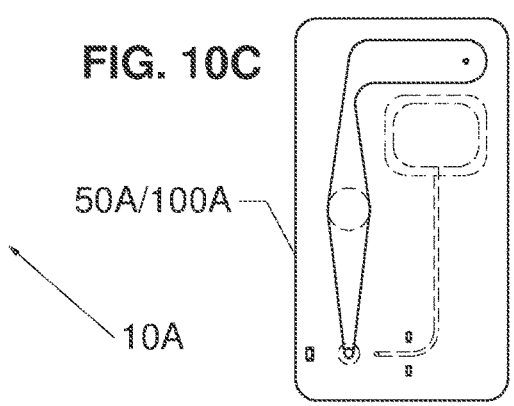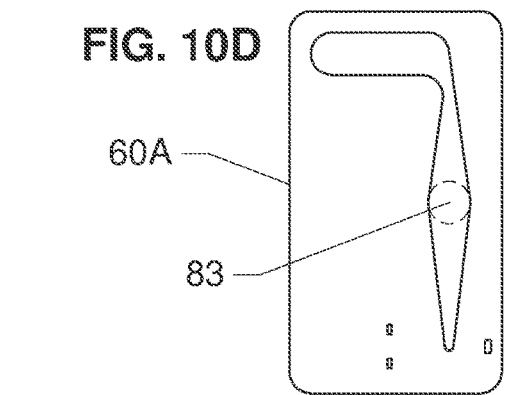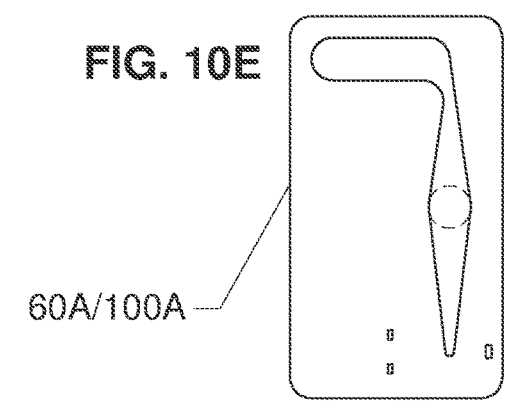

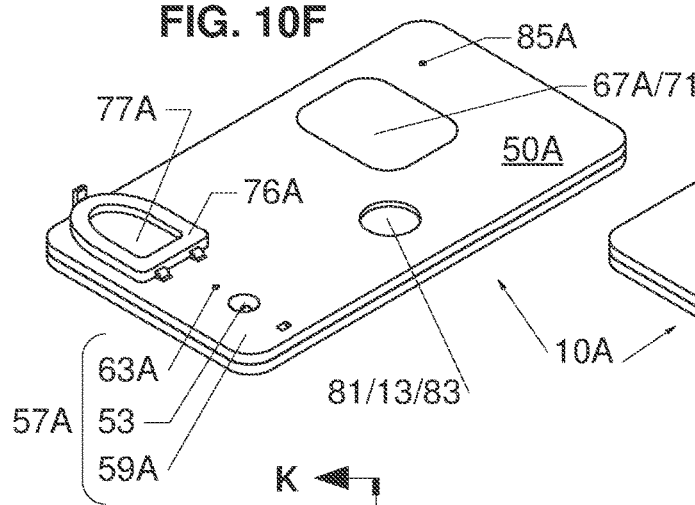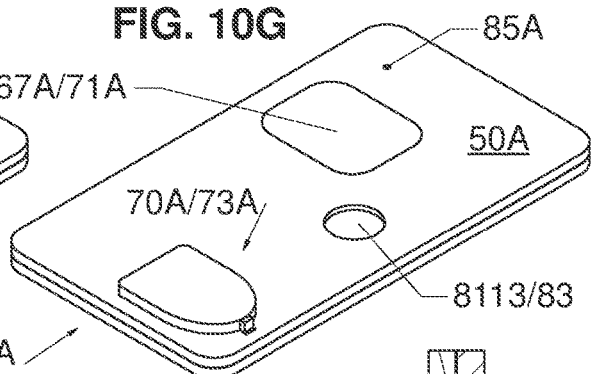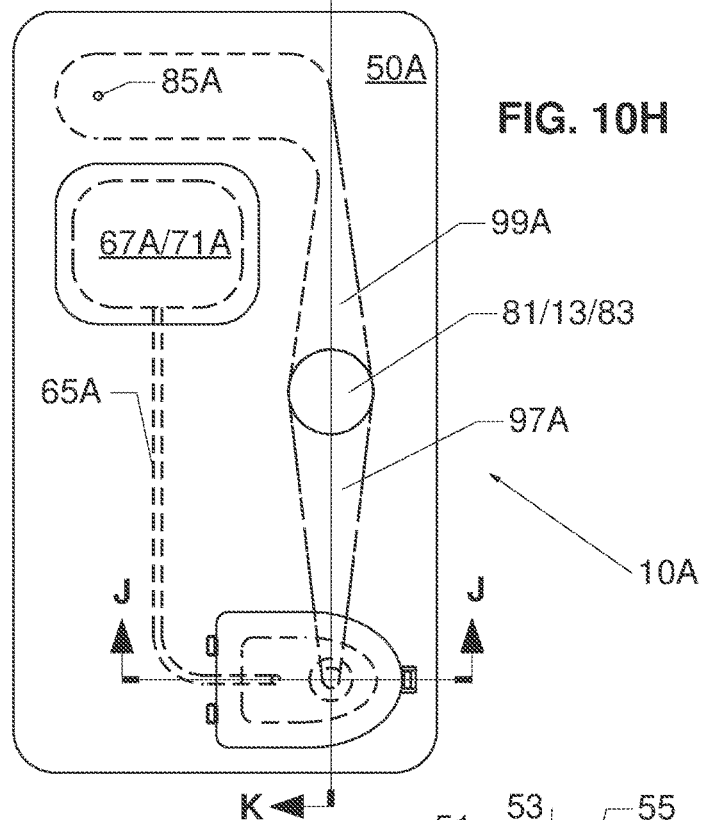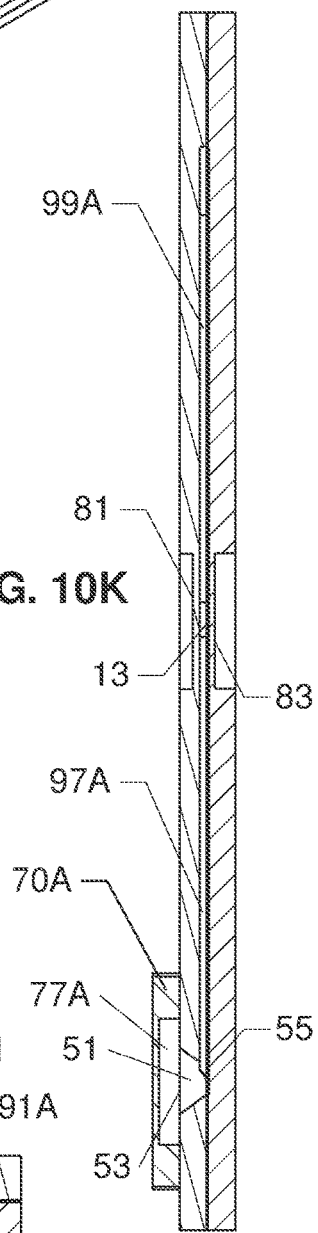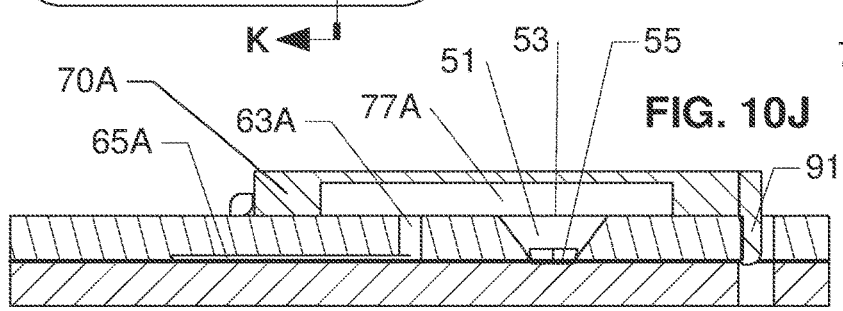

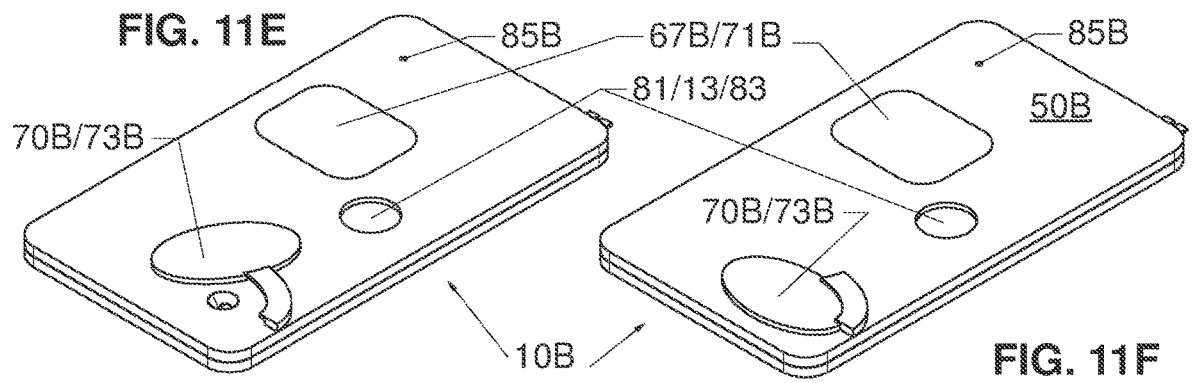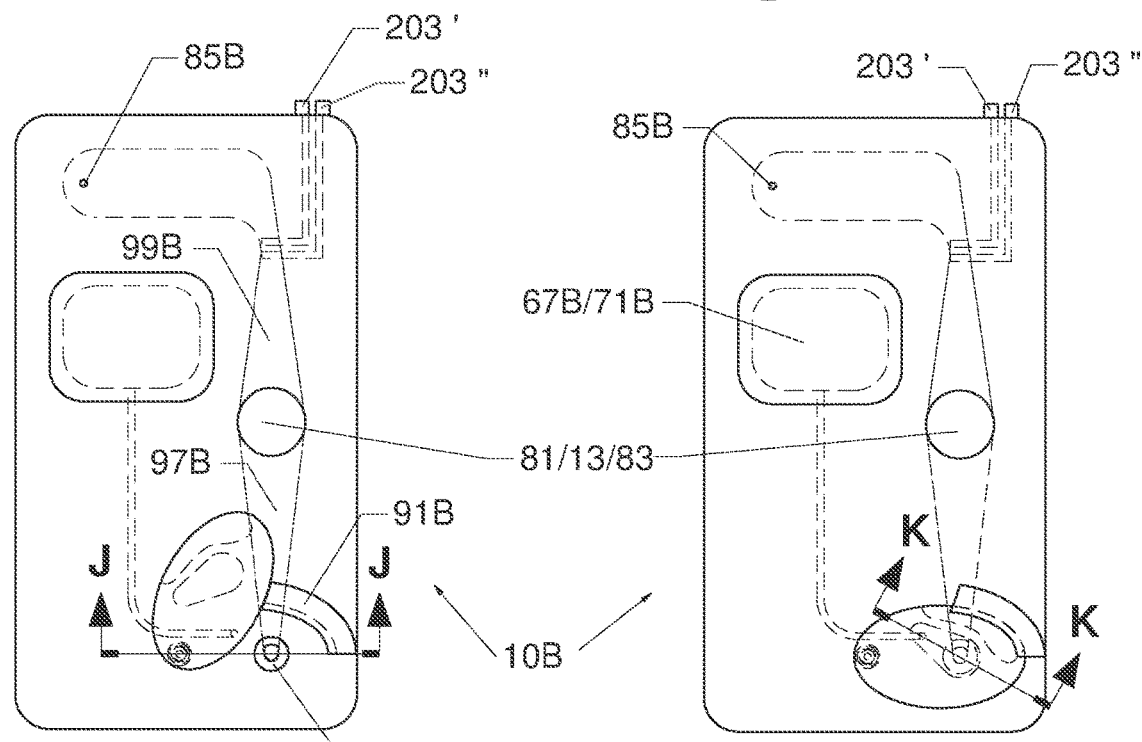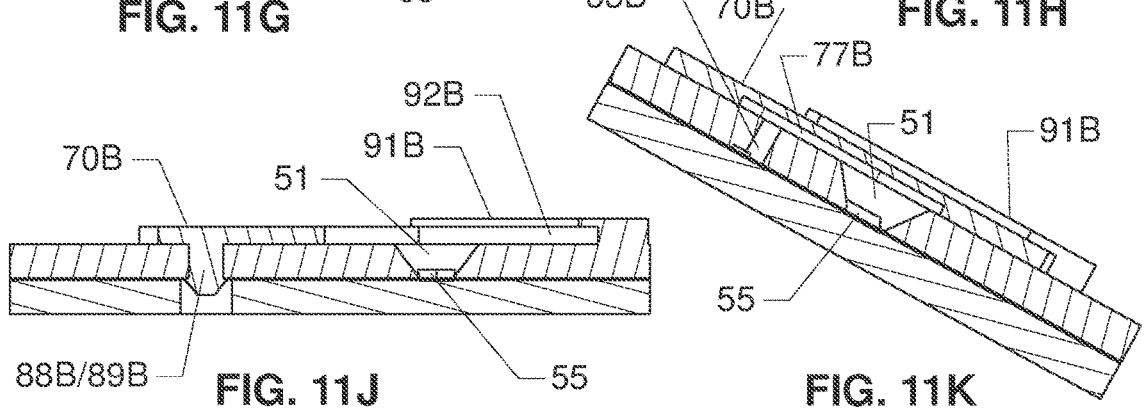

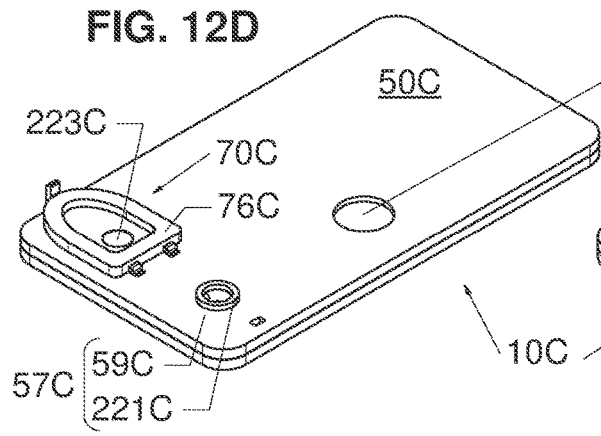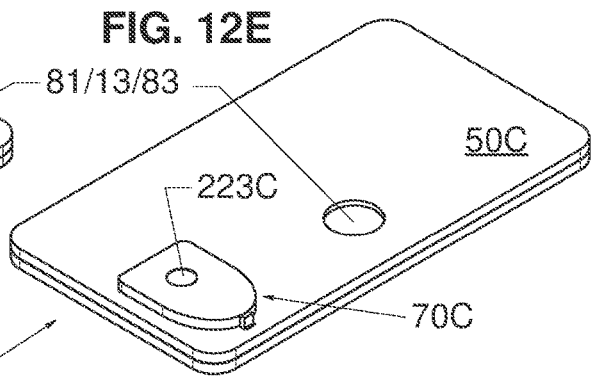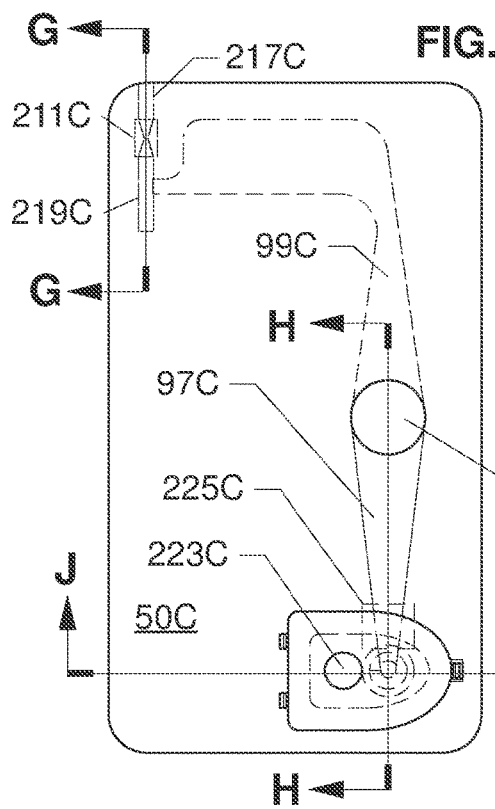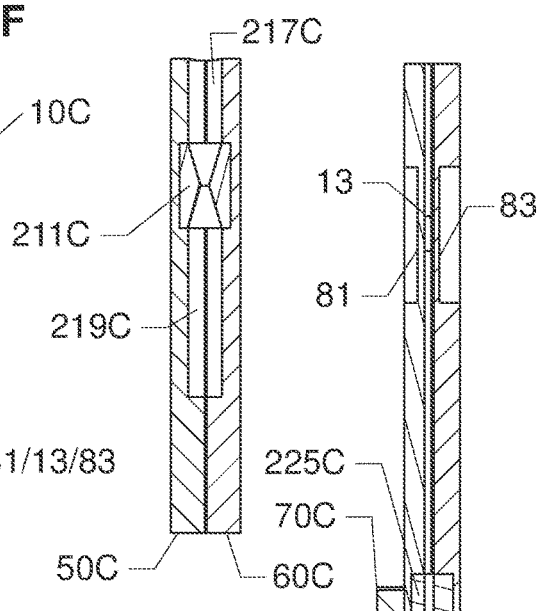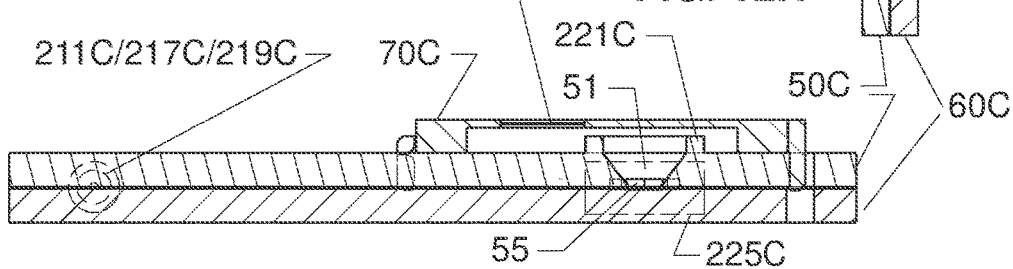

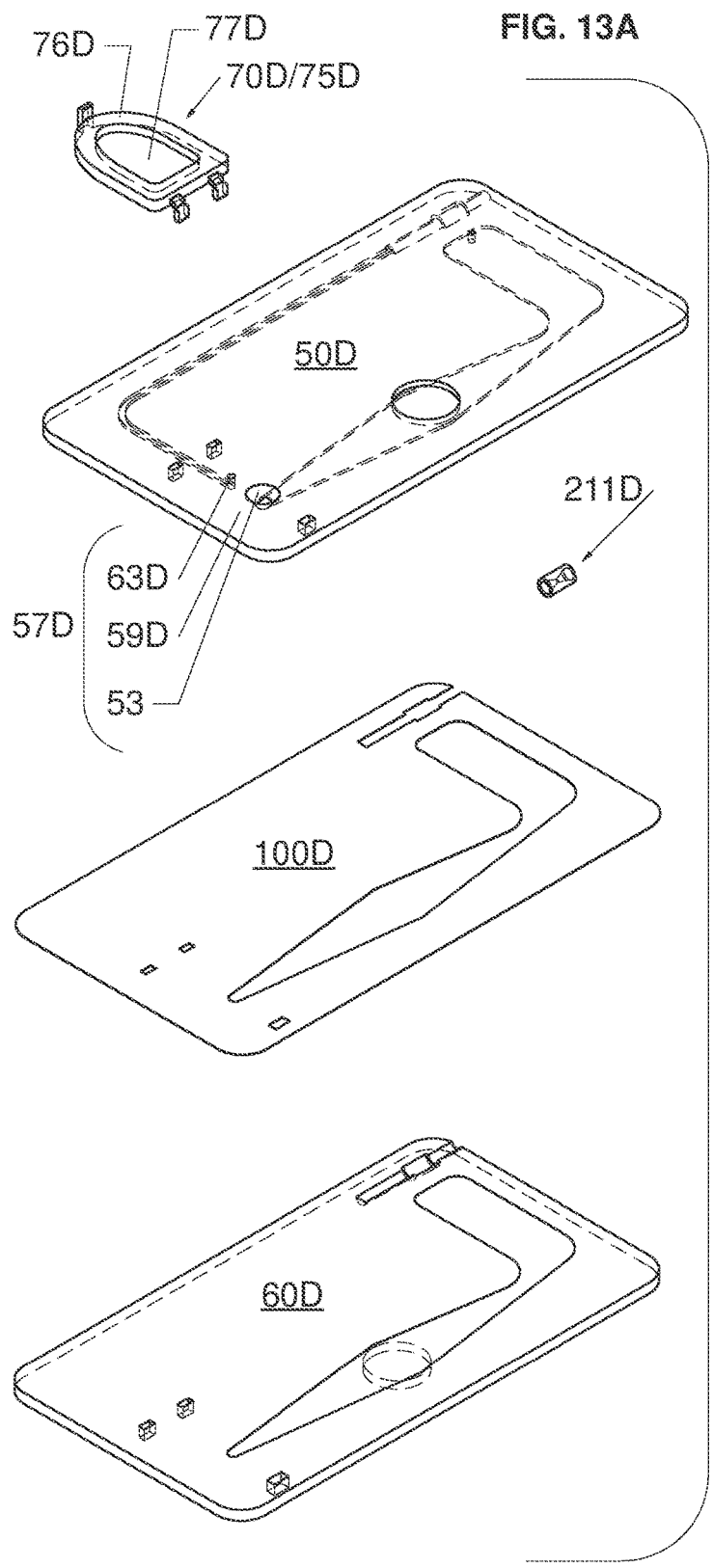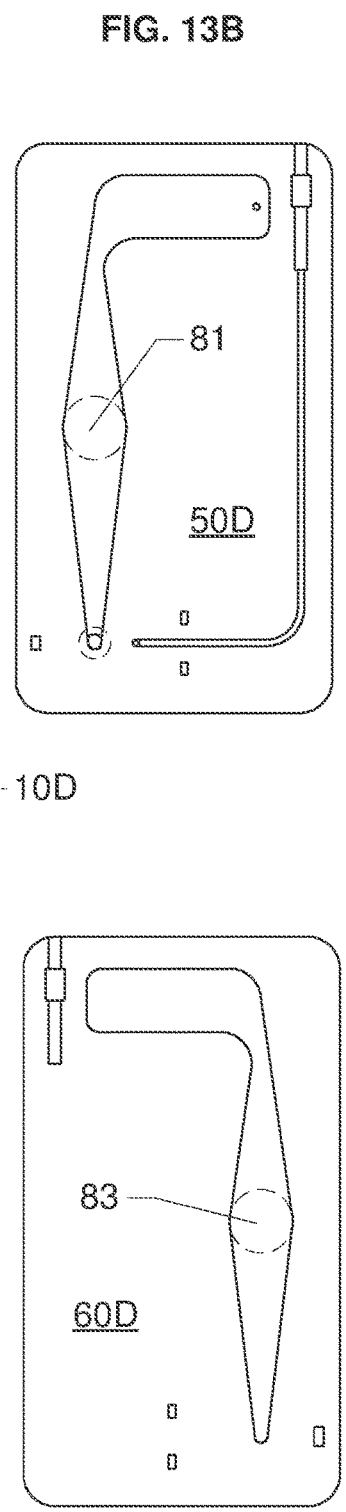

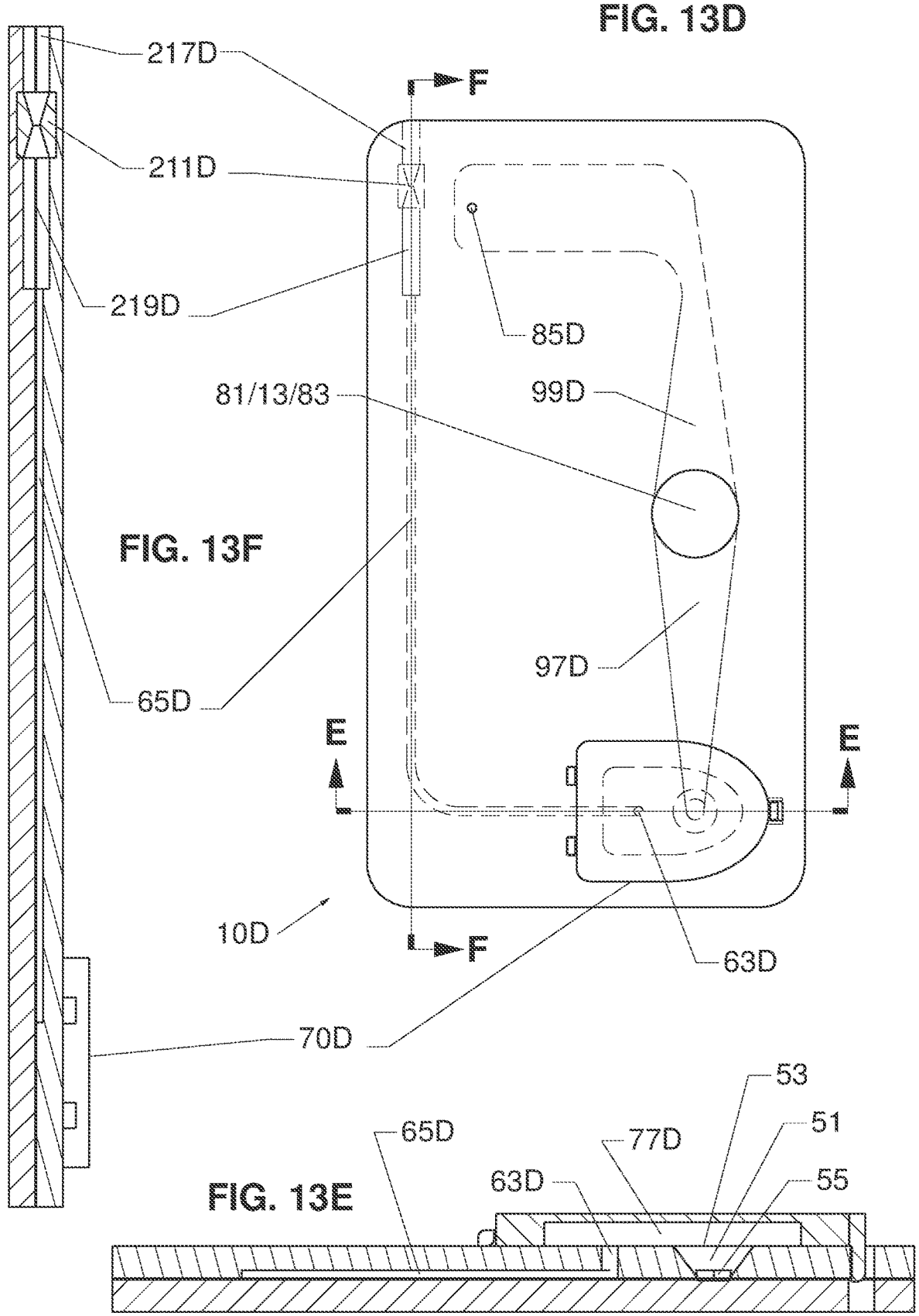

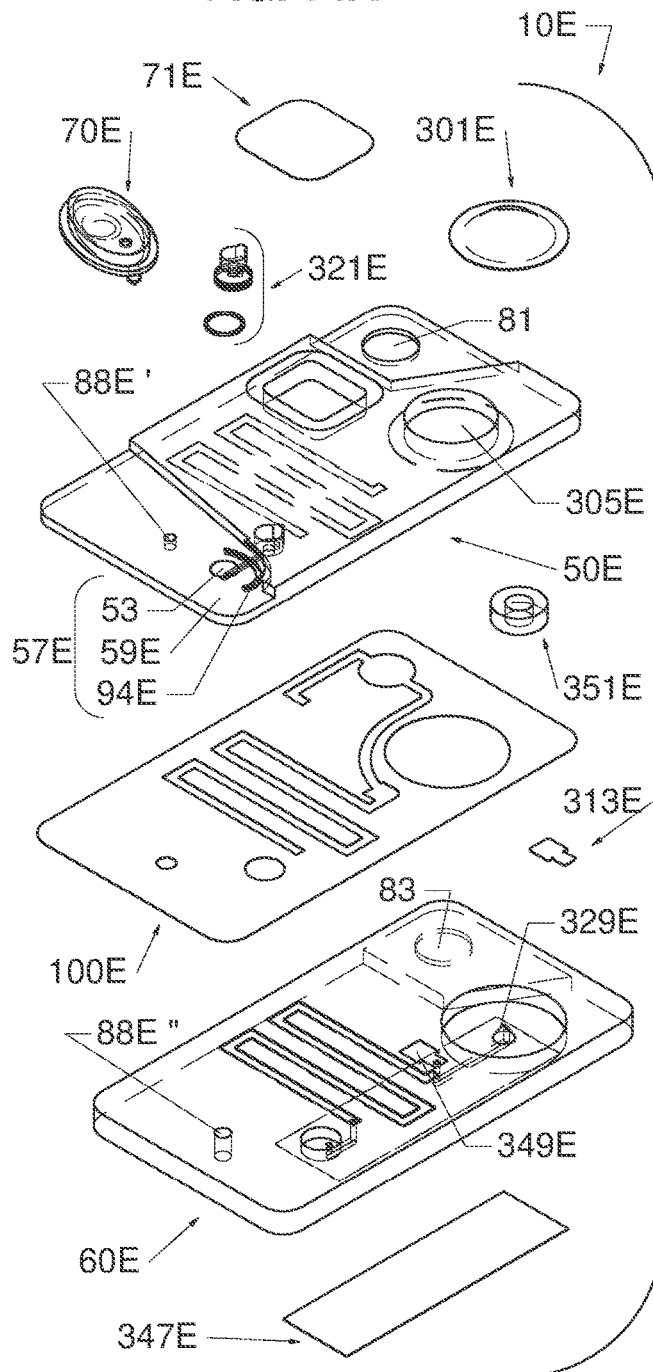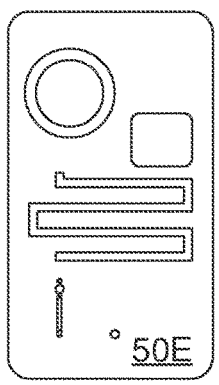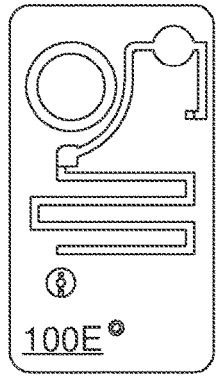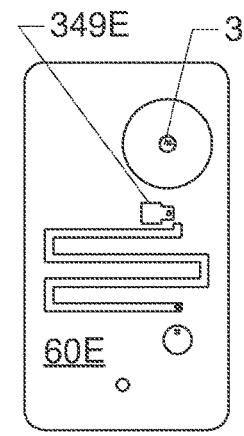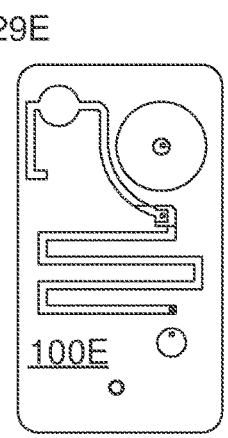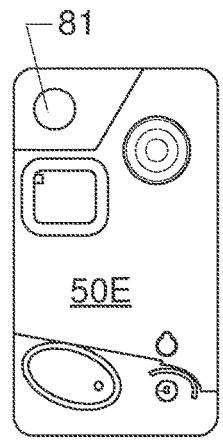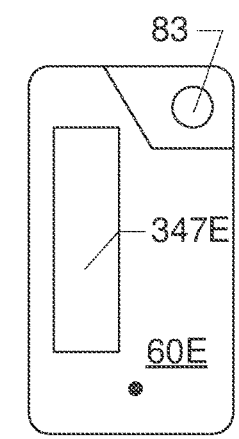

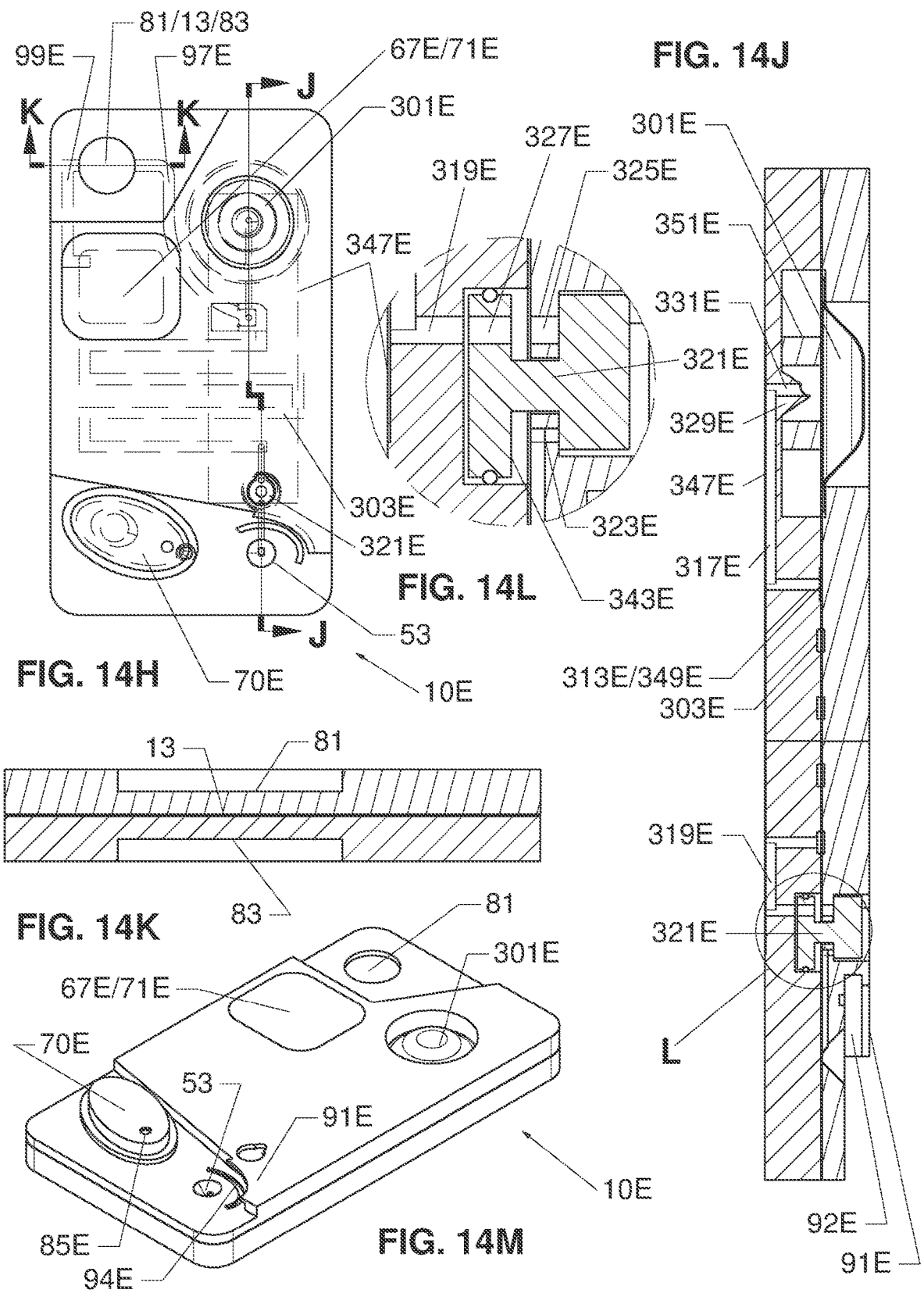

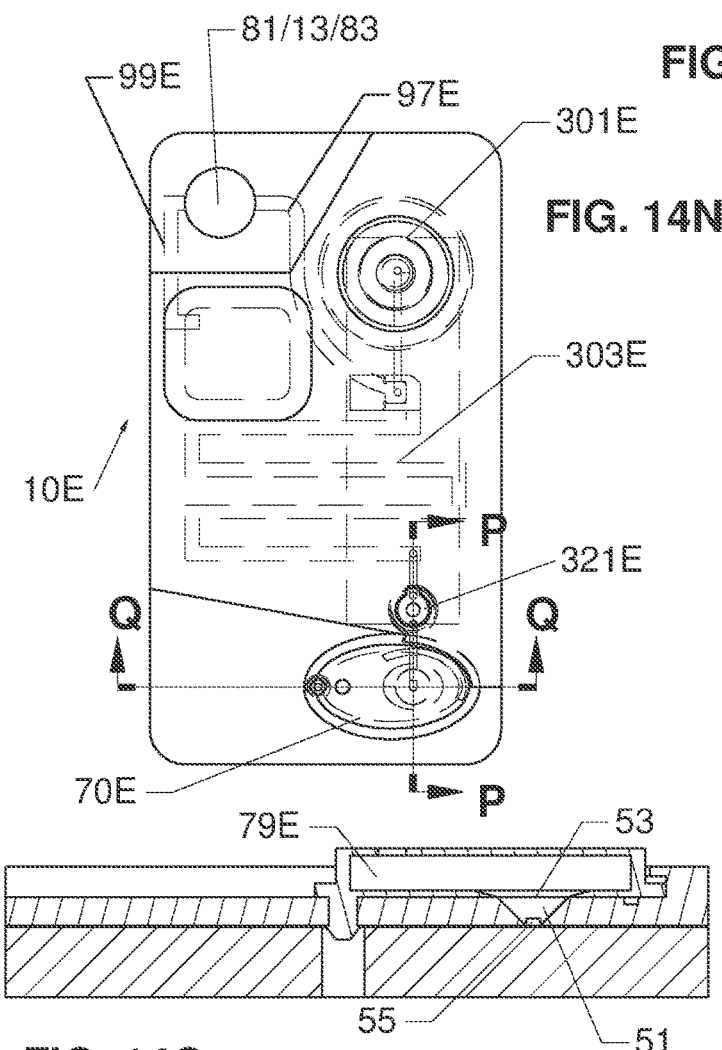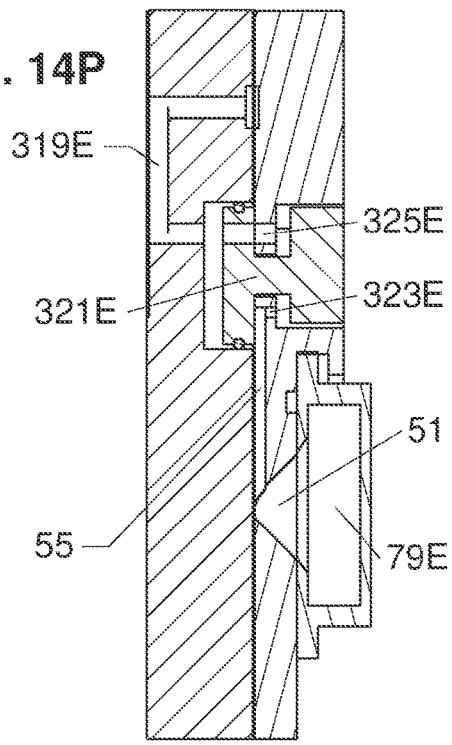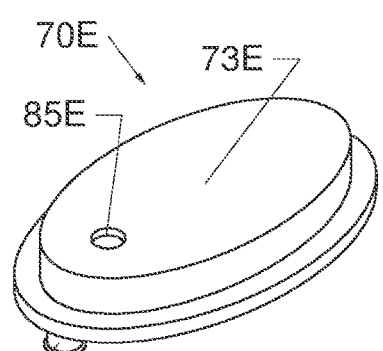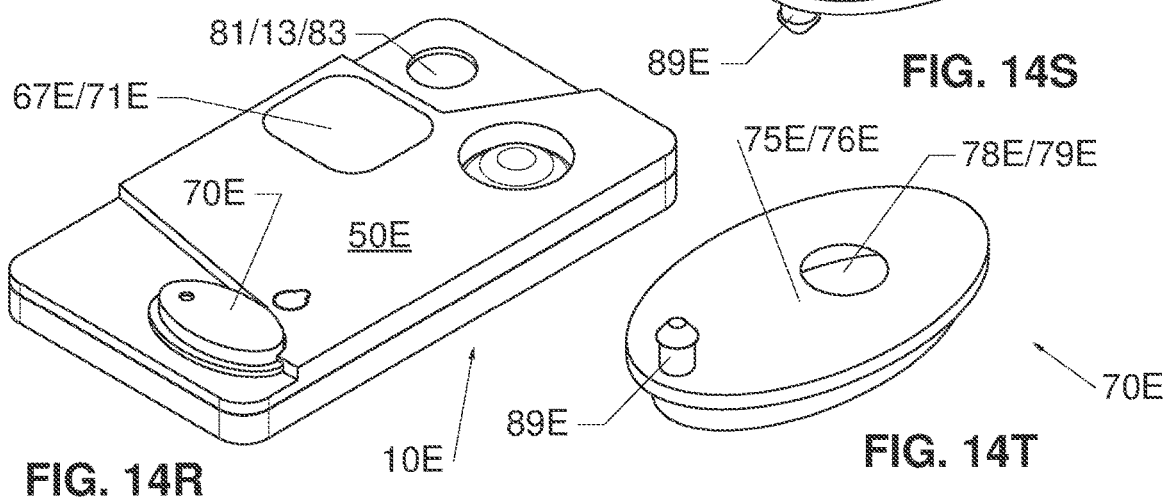

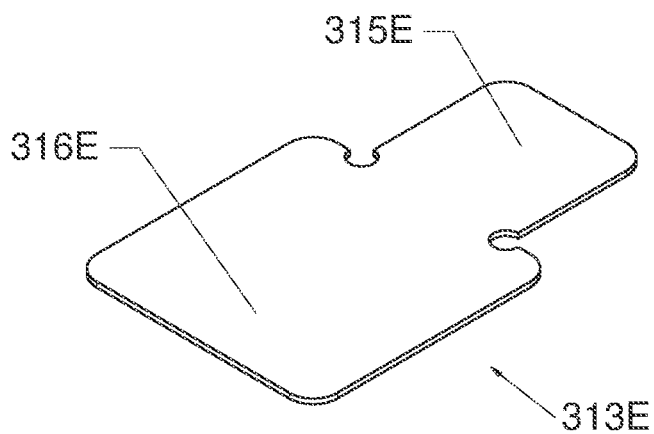
FIG. 14U
FIG. 14V
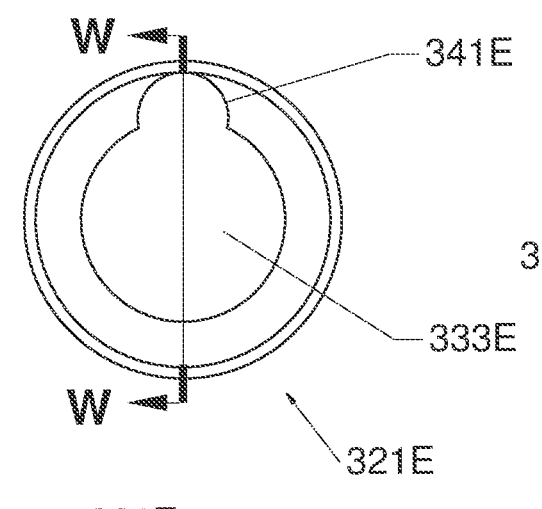
FIG. 14W
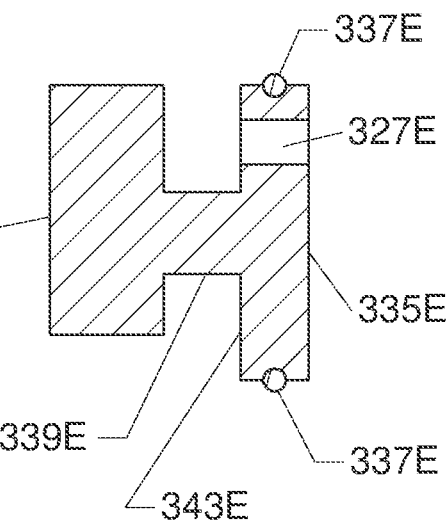
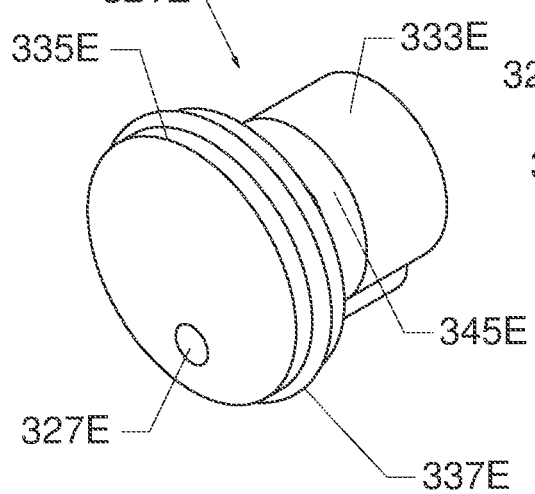
FIG. 14X
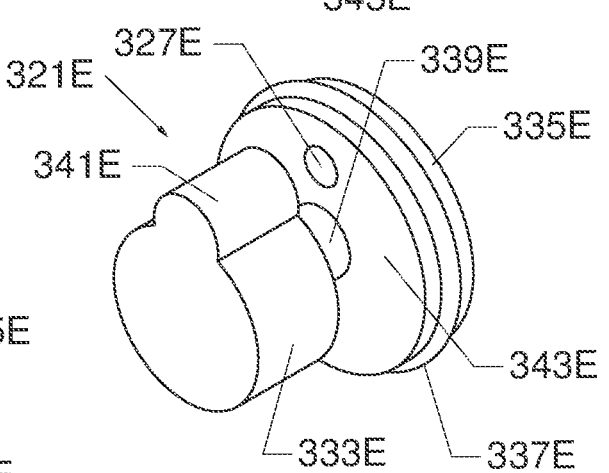
FIG. 14Y

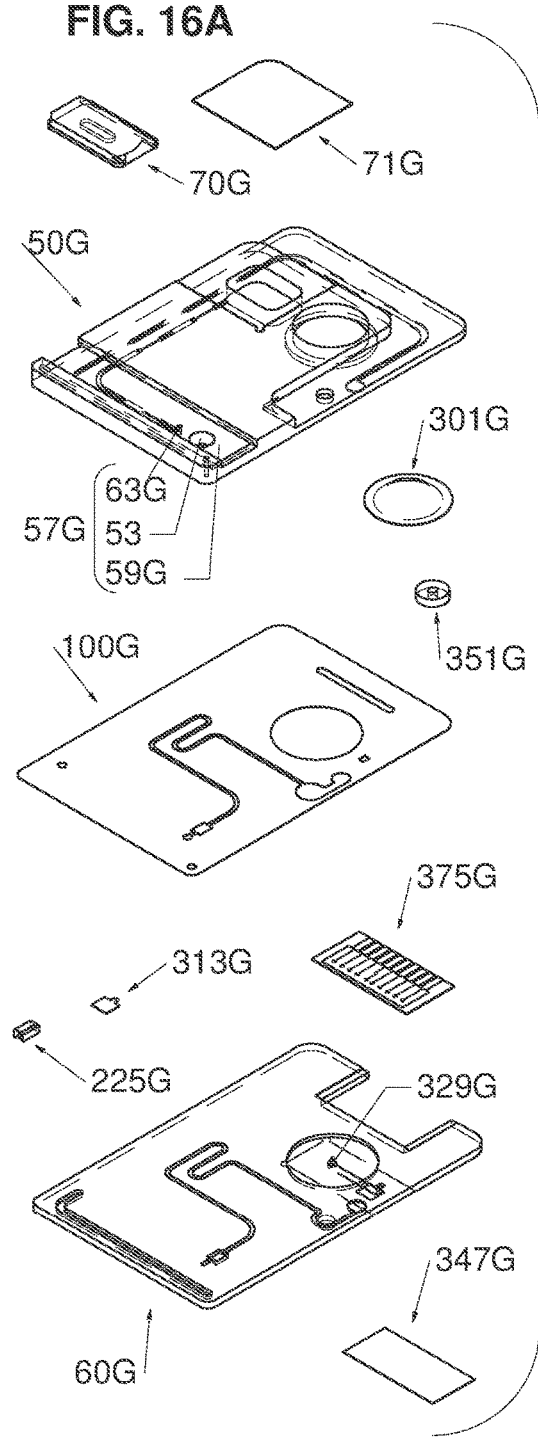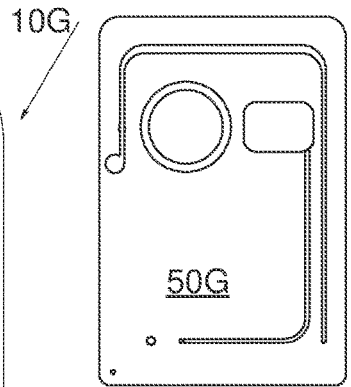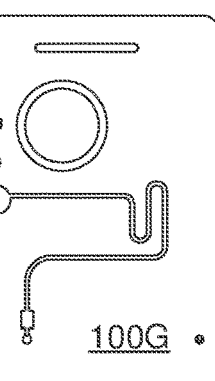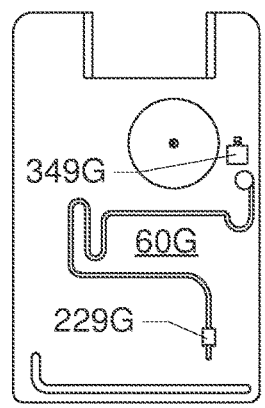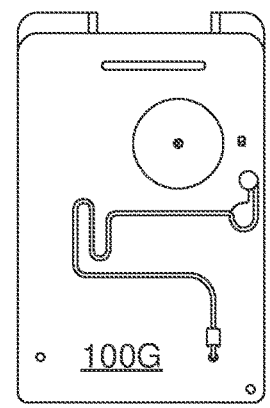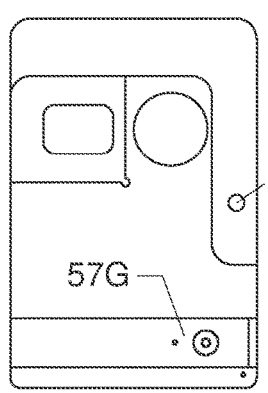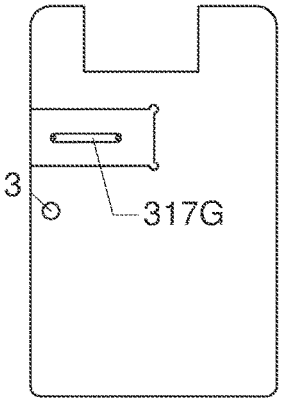

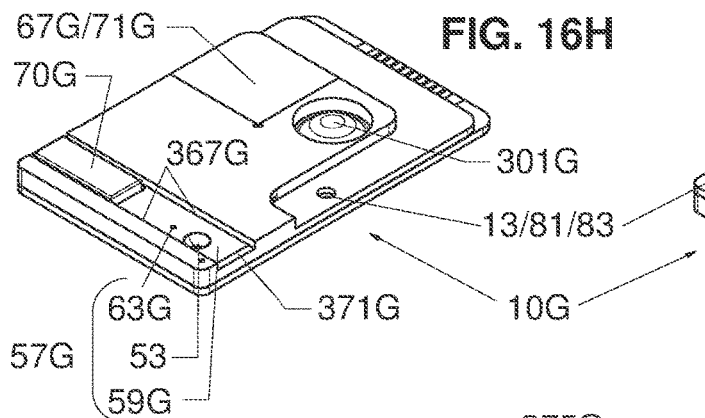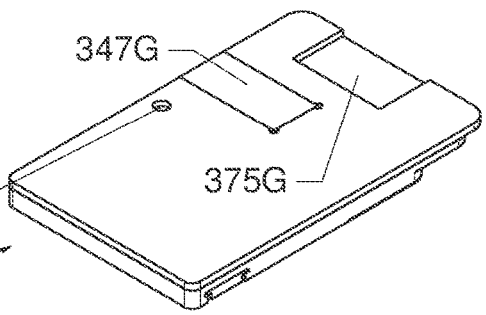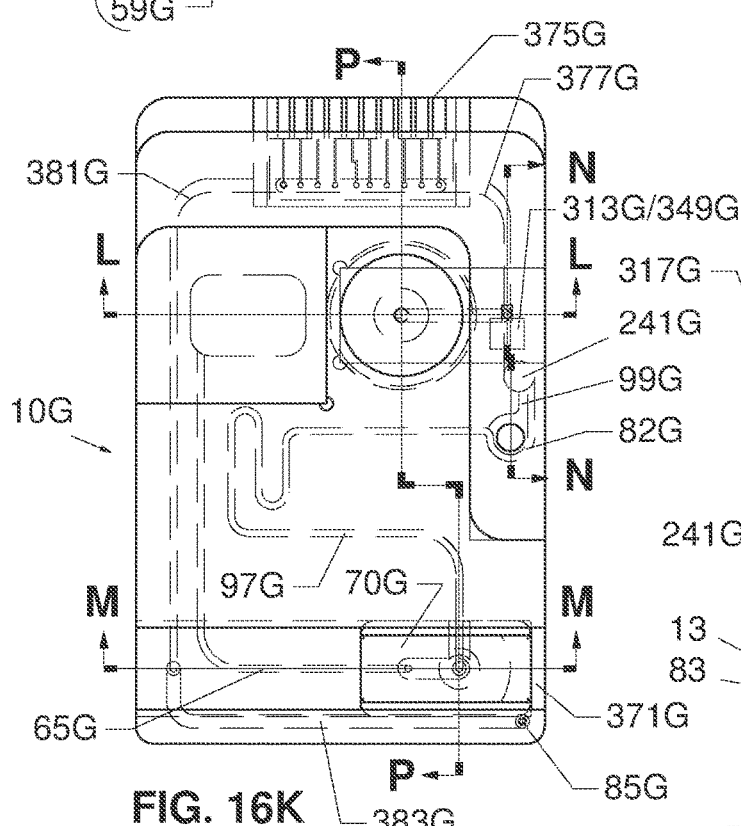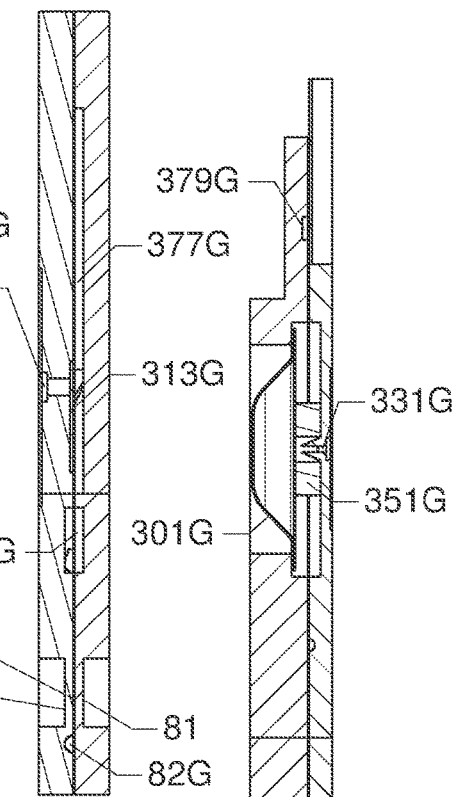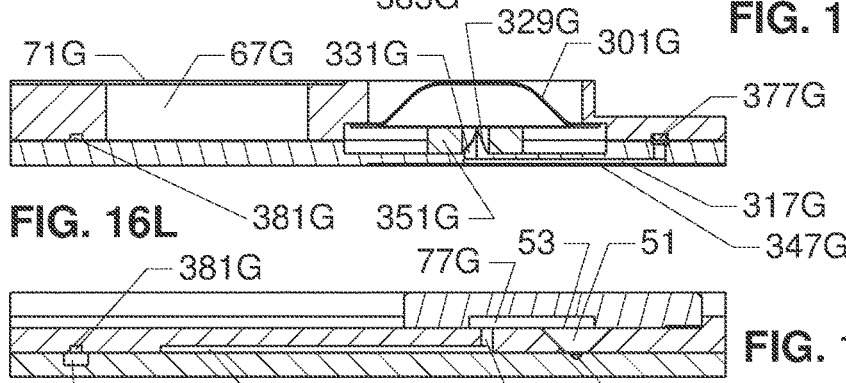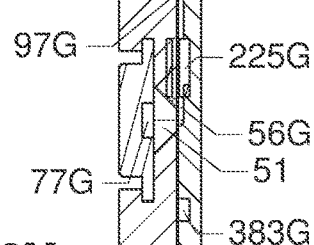

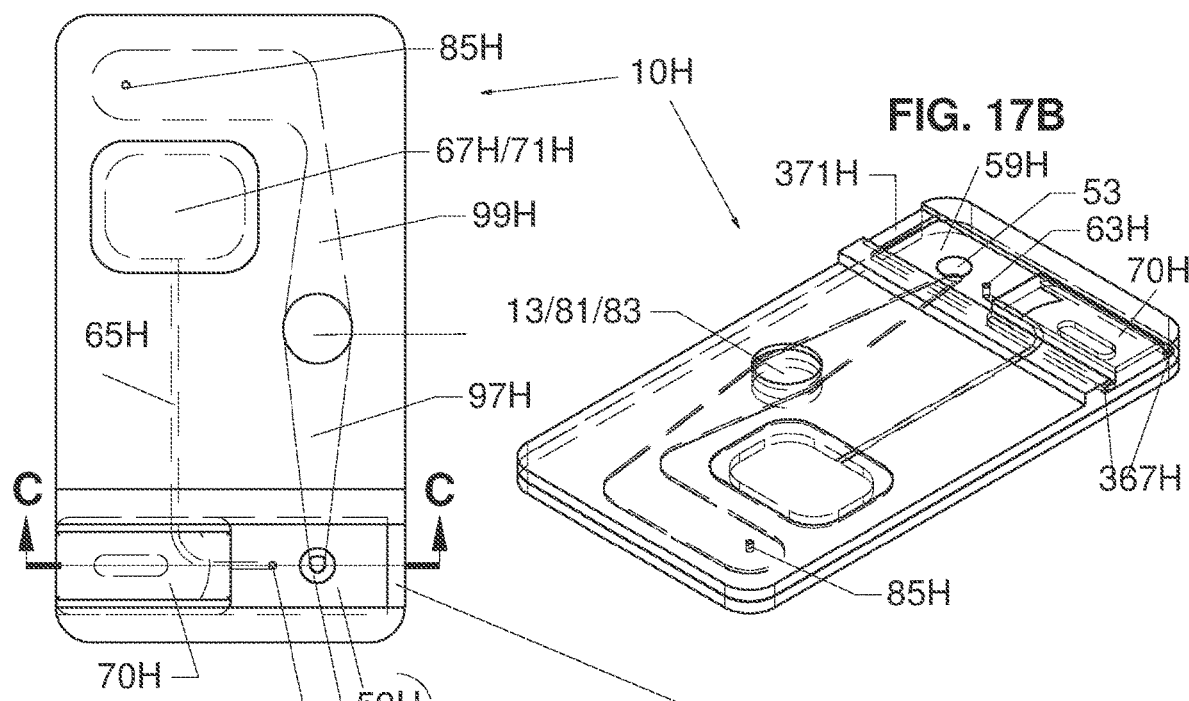
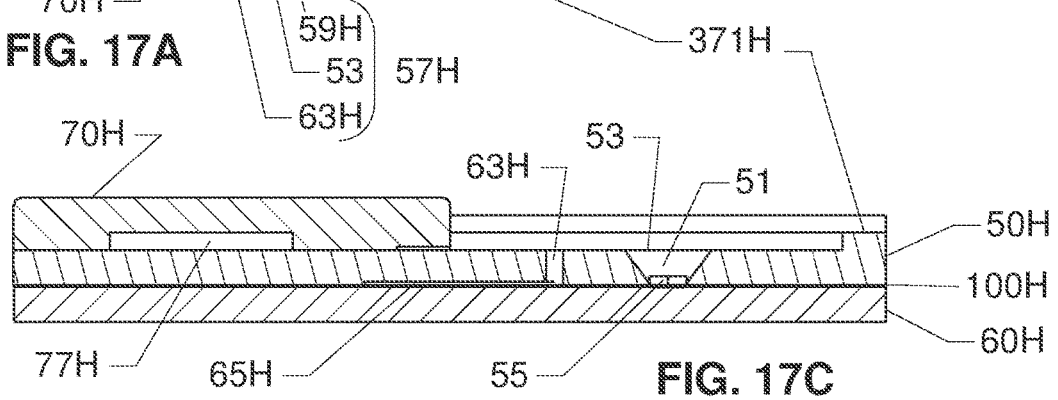
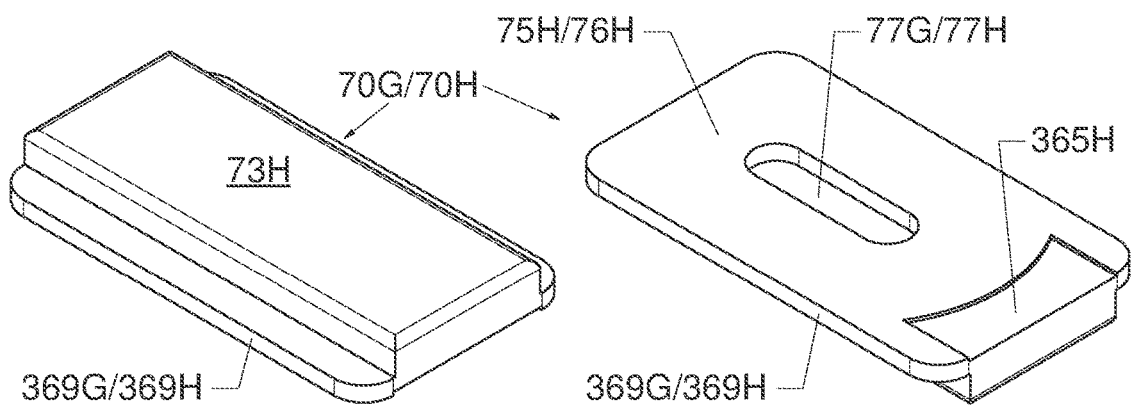
FIG. 17A
FIG. 17B
FIG. 17C
FIG. 17D
FIG. 17E

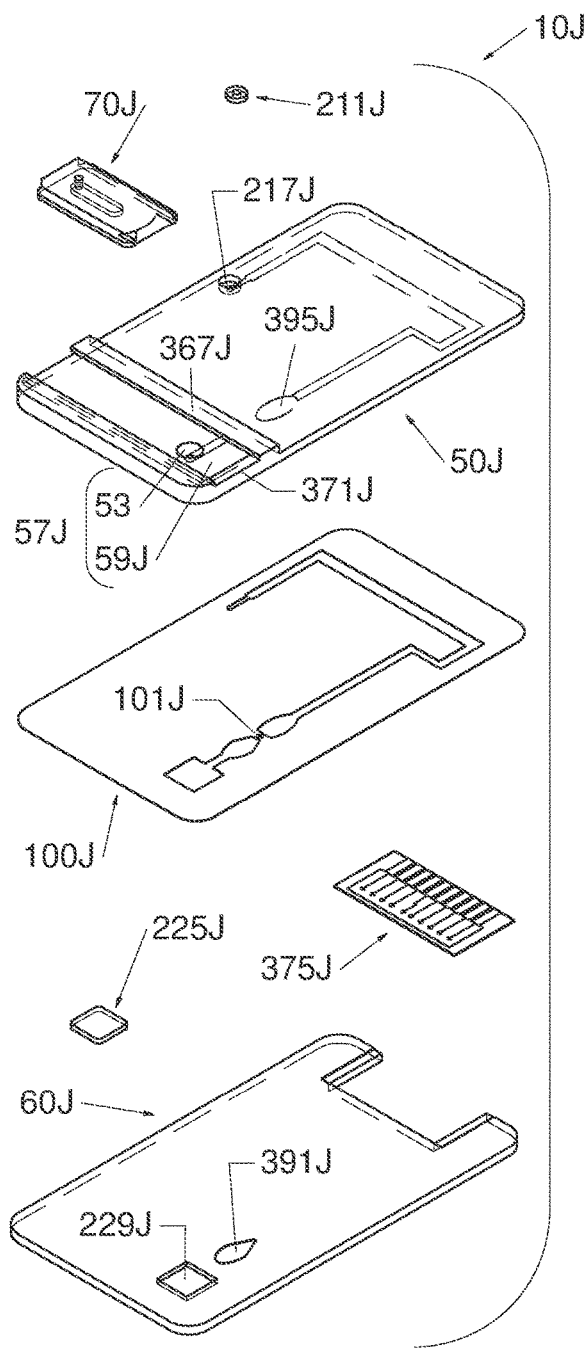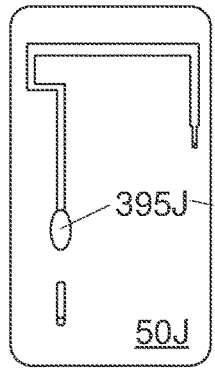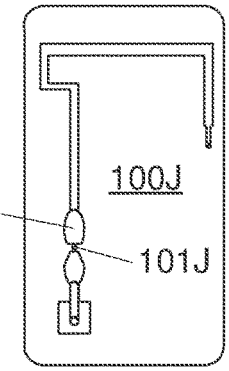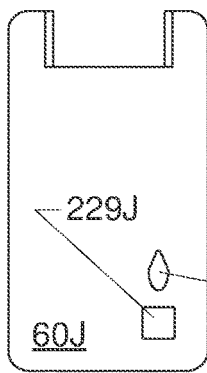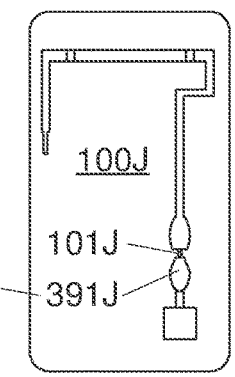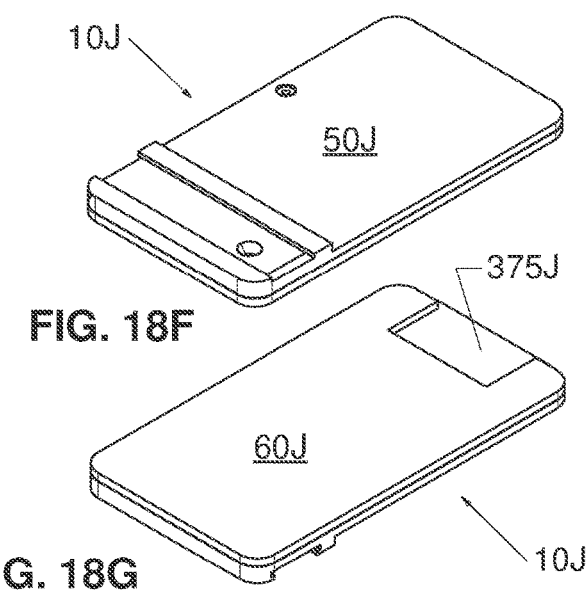

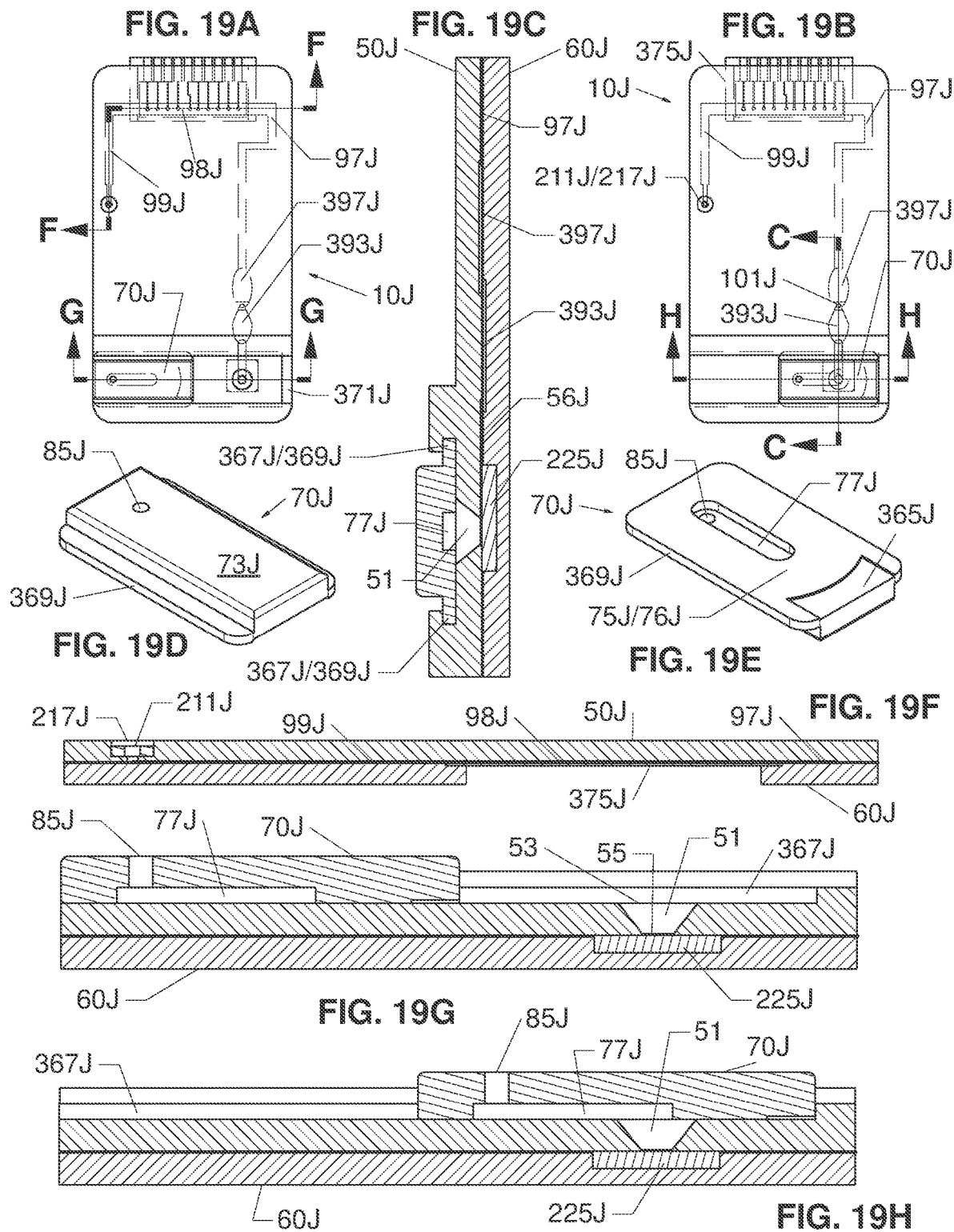

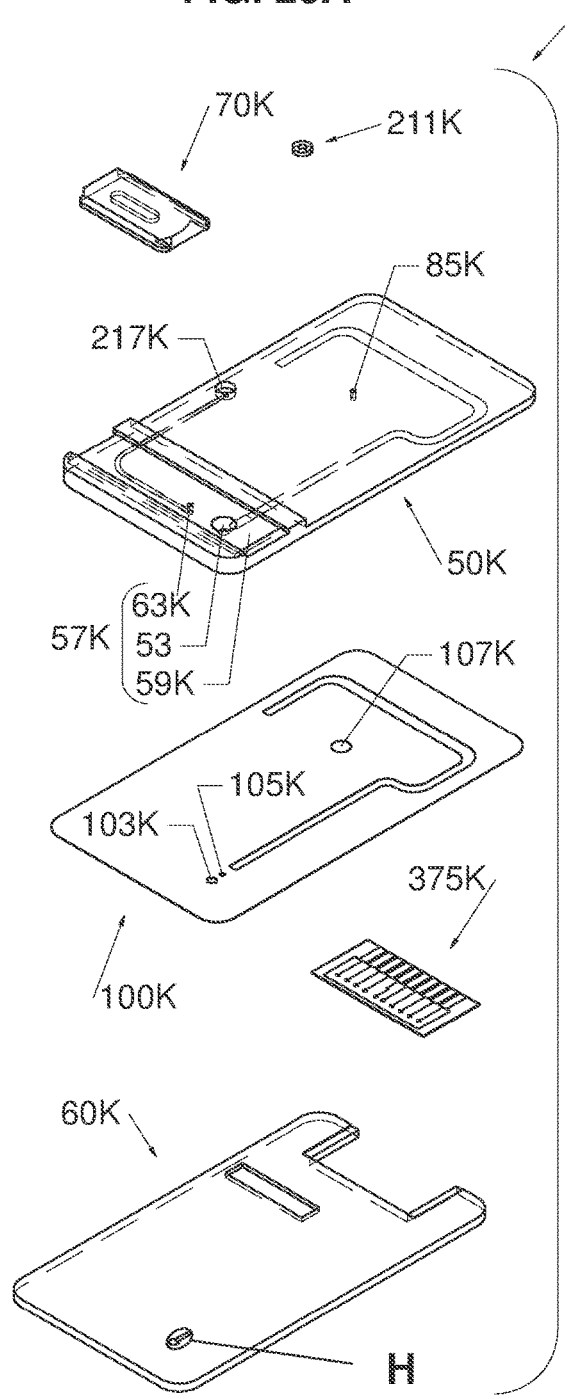
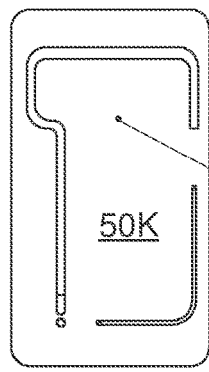
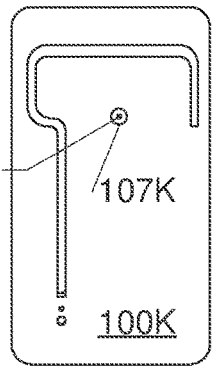
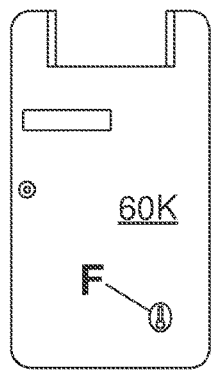
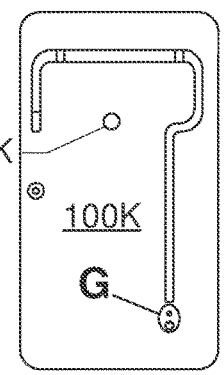
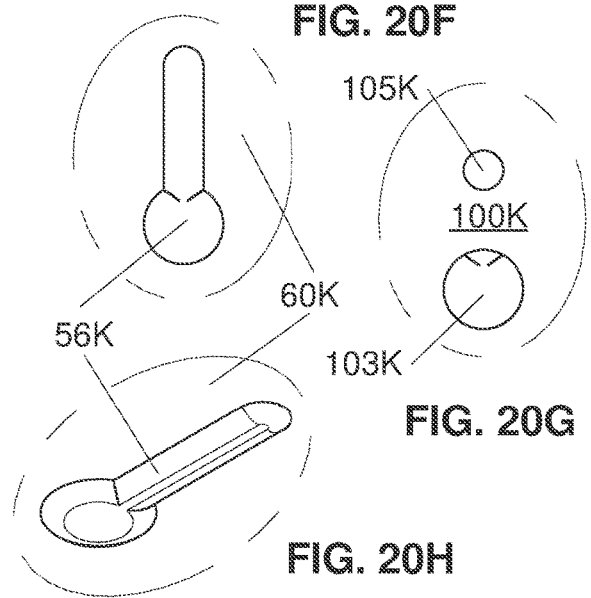

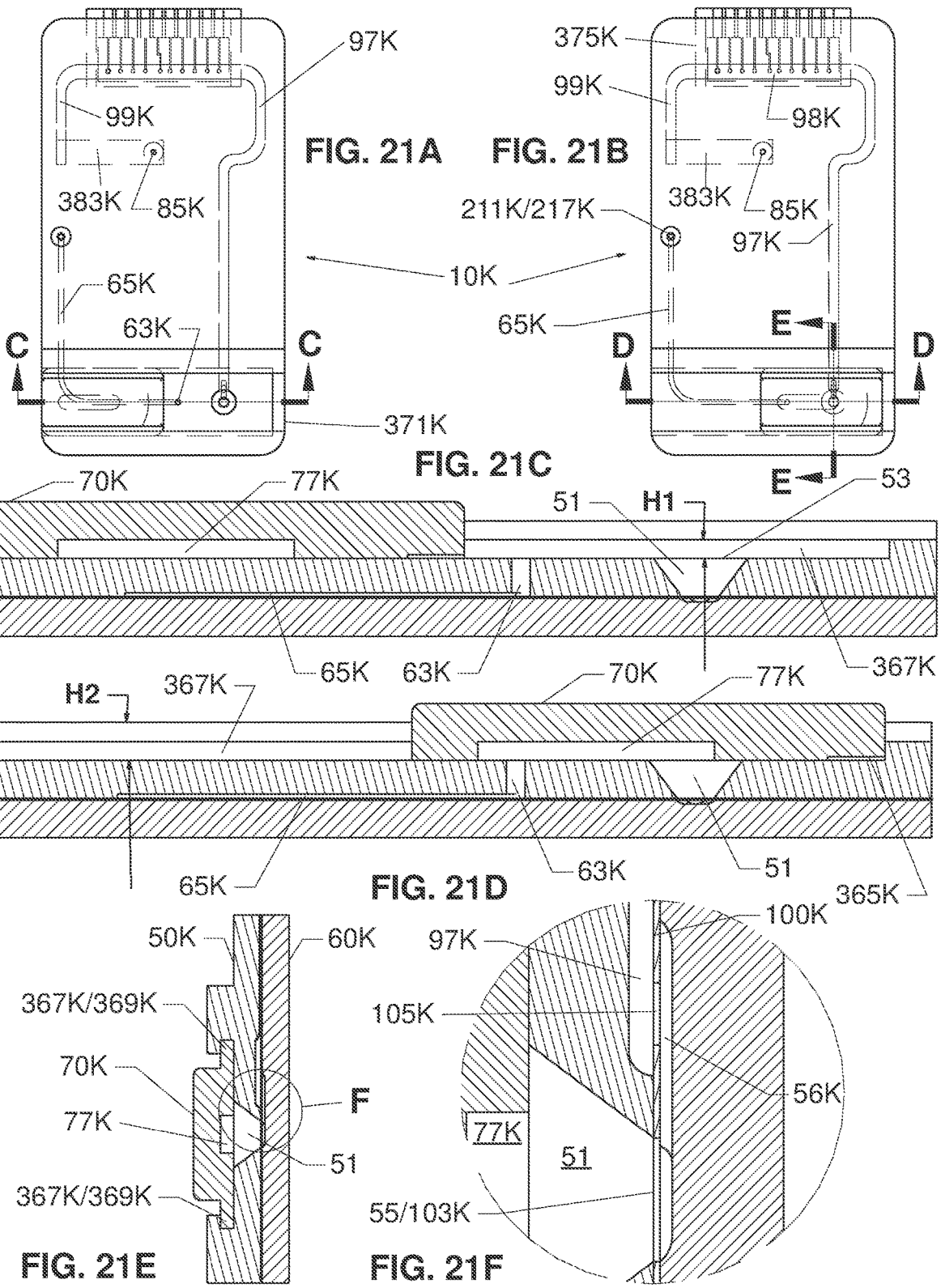

POINT-OF-CARE TESTING CARTRIDGE WITH SLIDING CAP

CROSS-REFERENCE TO RELATED APPLICATIONS

This application claims the benefit of Canadian Application 3,066,133, filed Dec. 23, 2019, which claims the benefit of U.S. application Ser. No. 16/575,645, filed Sep. 19, 2019. This application is a continuation-in-part application of U.S. application Ser. No. 16/575,645, filed Sep. 19, 2019.

FIELD OF THE INVENTION

The invention relates to a point-of-care testing (POCT) system that uses disposable cartridges with sliding caps. The POCT includes hematology, coagulation and biochemistry.

BACKGROUND OF THE INVENTION

The result of reaction between a liquid sample and one or more reagent depends on the quantity of the one or more reagent and the volume of liquid sample. Although any type of liquid sample is implied, serum, plasma and blood (also referred to as whole blood) are samples of particular interest. The reagent is preferably in a dry form, in order to avoid dilution of the sample. When blood is allowed to clot and the sample is centrifuged, the yellow liquid that sits on top of the blood clot is called serum. If the blood is collected in a tube containing an anticoagulant, for example heparin, and the blood centrifuged, the cells and cell fragments, referred to as formed elements, are separated from a yellow liquid called plasma, which sits on top of the formed elements. The plasma is usually about 90 percent water, in which the formed elements are usually suspended, and it transports nutrients as well as wastes throughout the body. Various analytes are dissolved in the plasma for example, glucose, electrolytes, blood gases, drugs, hormones, lipids, enzymes (e.g., ALT, which may be used for assessing liver function), and metabolites (e.g., creatinine which may be used for assessing kidney function, and lactate which may be used for detecting sepsis).

The formed elements are cells and cell fragments suspended in the plasma. Because the formed elements are heavier than the liquid matrix, they are packed in the bottom of the collection tube by the centrifugal force. The plasma accounts for about 55 percent of the blood volume. The volume of the red blood cells is called the hematocrit, or packed cell volume (PCV). The white blood cells and platelets form a thin white layer, called the "buffy coat", disposed between the plasma and the red blood cells. The classes of the formed elements are: erythrocytes (red blood cells or RBCs), leukocytes (white blood cells), and thrombocytes (platelets). Erythrocytes are the most numerous of the formed elements. Erythrocytes are tiny biconcave disks, thin in the middle and thicker around the periphery. A normal erythrocyte has a diameter of about 6-8 micrometers (µm). The shape provides a combination of flexibility for moving through tiny capillaries with a maximum surface area for the diffusion of gases. The primary function of erythrocytes is to transport oxygen to body tissue and, to transport carbon dioxide to the lungs where the carbon dioxide is expelled through the nose and mouth. Since only the erythrocytes contain hemoglobin, total hemoglobin concentration is highly correlated with hematocrit, except in cases of for example, macrocytic anemia where the mean red cell hemoglobin concentration is lower than that of a normal red cell.

Leukocytes, or white blood cells, are generally larger than erythrocytes, but they are fewer in number. An average diameter of a leukocyte is about 12-17 µm. Leukocytes use the blood as a transport medium to other tissues, where they participate in defense against organisms that cause disease and either promote or inhibit inflammatory responses. Some leukocytes are phagocytic, others produce antibodies, and some secrete histamine and heparin. Leukocytes are able to move through the capillary walls into the extravascular tissue spaces, a process called diapedesis.

There are two main groups of leukocytes in the blood. The cells that develop granules in the cytoplasm are called granulocytes (and include neutrophils, eosinophils, and basophils) and those that do not have granules are called agranulocytes (and include monocytes and lymphocytes). This classification depends on whether granules can be distinguished in their cytoplasm, using a light microscope and conventional staining techniques.

Neutrophils are the commonest type of leukocytes found in blood, making up 60-70% of the total amount of leukocytes. The neutrophils are 12-14 µm in diameter. Neutrophils comprise a single nucleus, which is multilobed, and the number of lobes can be between 2 and 5.

Eosinophils make up 1-6% of the total leukocytes. Eosinophils are 12-17 µm in diameter, and the nucleus comprises two lobes. Eosinophils have large acidophilic specific granules that stain bright red, or reddish-purple.

Basophils are the rarest type of leukocytes, making up only 0.5-1% of the leukocytes in blood. Basophil are 14-16 µm in diameter, contain deep blue staining granules (basic) and the nucleus comprises two lobes. The granules contain heparin, histamine, serotonin, prostaglandins and leukotrienes. In the extravascular tissues, they are called mast cells.

Lymphocytes are the second most common leukocytes, making up 20-50% leukocytes in blood. Lymphocytes are agranulocytes that have a special role in immune processes. Some attack bacteria directly, and some produce antibodies. Most of the lymphocytes are 6-9 µm in diameter. About 10% are larger, having a diameter of 10-14 µm. These larger cells have more cytoplasm, more free ribosomes and mitochondria. Lymphocytes can look like monocytes, except that lymphocytes do not have a kidney-bean shaped nucleus like the monocytes, and lymphocytes are usually smaller.

Monocytes are the third most common type of leukocytes, making up about 2-10% of leukocytes in blood. Monocytes are the largest type of leukocytes, and can be 9-20 µm in diameter. They have a large eccentrically placed nucleus, which is kidney bean shaped, and have abundant cytoplasm. Monocytes may differentiate into macrophages, which are cells responsible for engulfing and destroying pathogens.

Thrombocytes, or platelets, are not complete cells, but are small fragments of very large cells called megakaryocytes. Thrombocytes are the smallest formed elements of blood, having a diameter of 2-4 µm. Megakaryocytes develop from hemocytoblasts in the red bone marrow. Thrombocytes become sticky and clump together to form platelet plugs that close breaks and tears in blood vessels. They also initiate the formation of blood clots.

A summary of the reference ranges in cell counts per liter (L) and sizes in micrometers of formed elements of blood are provided in Table 1 (see URL: histology.leeds.ac.uk).

TABLE 1

| Name of<br>Formed Element of Blood | Reference Range<br>(Counts/Liter) | Normal Size<br>(Diameter) |
|---|---|---|
| Erythrocytes<br>(red blood cells) | $4\text{-}6 \times 10^{12}/L$ | 6-8 µm |
| Neutrophils<br>(leukocytes or white blood cells) | 60-70% of<br>$4.5\text{-}10 \times 10^9/L$ | 12-14 µm |
| Eosinophils<br>(leukocytes or white blood cells) | 1-6% of<br>$4.5\text{-}10 \times 10^9/L$ | 12-17 µm |
| Basophils<br>(leukocytes or white blood cells) | 0.5-1% of<br>$4.5\text{-}10 \times 10^9/L$ | 14-16 µm |
| Lymphocytes<br>(leukocytes or white blood cells) | 20-50% of<br>$4.5\text{-}10 \times 10^9/L$ | 6-14 µm |
| Monocytes<br>(leukocytes or white blood cells) | 2-10% of<br>$4.5\text{-}10 \times 10^9/L$ | 9-20 µm |
| Thrombocytes<br>(platelets) | $150\text{-}450 \times 10^9/L$ | 2-4 µm |

In the clinical laboratory, a tissue substance from the body that is undergoing analysis is usually referred to as an analyte or a test. "Point-of-care Testing (POCT) is defined as medical diagnostic testing performed in close proximity to where the patient is receiving care. Point-of-care (POC) is not restricted to laboratory tests but are more common with respect to laboratory tests. POCT is usually performed by non-laboratory personnel and the results are used for clinical decision making. An example of a non-laboratory POC is POC ultrasound or POCUS.

For the sake of convenience and rapid turnaround time, the tissue or sample of choice for POCT is whole blood. Due to the complexity of blood, certain tests can only be performed on serum or plasma. Regardless whether the sample is serum, plasma or whole blood, the quantities of analytes measured are usually measured in the plasma component of whole blood and are usually reported as a mass or molar quantity per unit volume of the whole blood used for analysis. Because the actual volume of plasma present in the blood depends on the hematocrit, some systems attempt to correct the measured values to account for hematocrit.

Hemoglobin is an example of an analyte that is not present in the plasma unless hemolysis has occurred. Hemoglobin is usually present in red blood cells, and the mass or molar concentration of hemoglobin may be measured in unaltered blood, or in hemolyzed blood. Hemolyzed blood may be produced using sound waves or chemicals. Some analyzers measure hematocrit by electrical conductivity and convert the hematocrit measurement to a total hemoglobin concentration, and some analyzers measure total hemoglobin concentration by spectroscopy, and convert the total hemoglobin concentration to a hematocrit value. Spectroscopic calibration algorithms can be developed to measure both hematocrit and total hemoglobin concentration.

Another analyte that resides inside red blood cells is folic acid (~50% localized in red blood cells, the rest is stored mostly in the liver), and the measurement of RBC folate provides useful diagnostic information. Potassium is another analyte that resides in the RBCs, at much greater concentration compared with plasma concentration, however measurement of RBC potassium provides no diagnostic value, whereas plasma potassium is a commonly ordered analyte for aiding in assessing acid-base-electrolyte balance.

POCT involves a range of procedures of varying complexity that may include manual procedures and automated procedures conducted by portable analyzers. POCT is most efficient when the sample of interest can be applied to or loaded onto a test cartridge, the sample inlet of the cartridge capped, and the analytical (testing) steps performed automatically after the loaded and capped test cartridge is inserted into a slot or receptor of an analyzer. Some blood tests, for example coagulation assays and immunoassays require a fixed volume of sample to ensure that when mixed with a reagent, the ratio of the volume of sample to the volume (or mass) of the reagent is held constant. Sample volume must also be considered, for example when determining the lipid content in plasma. Other tests, for example electrolytes, may not require a fixed volume of sample. In the case of electrolytes, sample volume is usually not an issue if the electrolyte concentration is estimated by measuring electrical activity in the sample. Electrical activity is usually measured using electrochemical sensors, also referred to as biosensors. There are other tests that do not require a fixed volume of sample, and cannot be measured using biosensors, for example CO-oximetry and bilirubin. CO-oximetry is a spectroscopic or optical technique that is used to measure the amount of different Hemoglobin (Hb) species present in a blood sample, for example, Oxy-Hb, Deoxy-Hb, Met-Hb, Carboxy-Hb and Total-Hb. Met-Hb and Carboxy-Hb are non-functional hemoglobin, and their measurements are used to assess the oxygenation status of a patient. Billirubin is a degradation product of Hb and is elevated in liver disease and intravascular hemolysis. Billirubin accumulates in the plasma of neonates until the liver develops sufficiently to be able to eliminate the excess bilirubin from the plasma. Very high levels of bilirubin in neonates may cause brain damage.

Although electrolytes and CO-oximetry measurements do not usually require fixed volumes of blood, the distance the blood sample travels along microfluidic channels inside some cartridges may need to be controlled or metered. The term metered blood means that the blood is supplied in a measured or regulated amount. Applying an unmetered sample volume to test strips is well known; some test strips contain absorbing sections that can accommodate a known volume of plasma, after the RBCs are retained in another section of the test strip near the blood application site. In some cases, the hematocrit affects the plasma flow in test strips, and therefore correction for hematocrit may improve accuracy of the analyte measurement.

U.S. Pat. No. 8,206,650 to Samsoondar (the present inventor) teaches the combination of spectroscopy and biosensor technologies in one cartridge, and can therefore provide pH, blood gases and CO-oximetry using a handheld POCT analyzer. The users are provided with the convenience of applying the sample once, as opposed to using a first analyzer that employs biosensor technology alone, and a second analyzer that employs spectroscopy alone.

U.S. Pat. No. 9,470,673 and CA Pat. No. 2,978,737 to Samsoondar, teach cartridges for operation with a joint spectroscopic and biosensor blood analyzer. These publications teach a male-configured cartridge inlet, with the dual purposes of engaging a female-configured cap for sealing the inlet and engaging a capillary adaptor for drawing blood into the cartridge by capillary action. The combination of cap, capillary adaptor and inlet provides for dispensing blood from a syringe into the cartridge, as well as drawing capillary blood from a pin prick drop of blood on a patient's skin into the cartridge, for testing.

U.S. Pat. Nos. 9,821,307, 9,999,884, 10,272,430, and U.S. Pat. Appl'n Pub. No. US 2019/0224667 to Samsoondar teach cartridges having hinged caps for conducting coagulation tests, for example PT-INR (Prothrombin Time-International Normalized Ratio) and ACT (Activated Clotting Time), using a small drop of blood. In U.S. Pat. Appl'n Pub. No. US 2019/0224667, the use of regulated blood flow within a cartridge by applying either a positive or a negative pressure to the sample is described. This publication also discloses the use of liquid reagents located in either the cartridge or the analyzer used in conjunction with the cartridge, with the reagent disposed along a sample storage conduit that is used to transfer the sample from the inlet to the optical chamber so that the blood and a reagent are mixed prior to entering the optical chamber.

Many laboratory analyses of blood samples may be divided into the following three major sections: 1) Biochemistry; 2) Hematology; and 3) Coagulation. Other categories of laboratory tests may include microbiology and molecular biology. Hematology tests are usually measurement of properties of the formed elements of blood. CBC (Complete Blood Count) is one of the most common panel of tests performed in the Emergency Department (ED) of a hospital. A CBC is a hematology blood test used to evaluate a person's overall health and may detect a wide range of disorders, including anemia, infection and leukemia. A CBC measures several properties of a patient's blood, including: number of red blood cells, which carry oxygen; number of leukocytes or white blood cells, which fight infection; hemoglobin, the oxygen-carrying protein in red blood cells; hematocrit, the proportion of red blood cells to the fluid component, or plasma, in blood; and platelets, which help with blood clotting.

Most POCT were developed to include mostly Biochemistry testing (e.g., glucose, electrolytes, blood gases, drugs and cardiac markers). Further development in POCT included coagulation tests (e.g. PT-INR and ACT). Development of POCT for hematology, which includes measuring the quantities of the formed elements of blood (commonly referred to as cell counting) has made little progress, even though there is a great need for POCT for the formed elements of blood. Abnormal increases or decreases in cell counts as revealed in a CBC may indicate an underlying medical condition that calls for further evaluation. Even if a POCT analyzer cannot provide all the CBC measurements, a "partial" CBC is still useful.

Commercial analyzers are available that only measure leukocyte counts. U.S. Pat. No. 7,521,243 to Lindberg et al teaches a sample acquiring device for volumetric enumeration of white blood cells in a blood sample that includes a measurement cavity for receiving a blood sample.

U.S. Pat. Appln. Pub. 2011/0201045 by Levine et al teaches a method and analyzer for analyzing a hematologic sample centrifuged within a capillary tube.

A hemocytometer, along with a microscope, is used for manual cell counting. The hemocytometer comprises a glass slide with grid lines divided into 9 major squares, each measuring 1×1 mm. Except for the central major square, each of the other 8 major squares are subdivided into 16 of 0.25×0.25 mm squares (see FIGS. 1C and 1E). The central square consists of smaller spaced grid lines that can assist in determining the size of a cell (see FIG. 1F). The coverglass for hemocytometers are specifically designed with regards to thickness and size. When the coverglass is placed over the counting area, this leaves a specific area for introducing the cells (suspended in liquid) to be counted. The gap between the top surface of the counting area and the bottom surface of the coverglass is 0.1 mm. Therefore, the volume of each 1×1 mm corner square is 100 nanoliters (nL). After the cell suspension is loaded in the hemocytometer, the number of cells in the corner squares may be counted using a microscope, and averaged. For illustration, a version of a hemocytometer (regarded as prior art), is provided in FIGS. 1A-1F. Some developing countries rely on manual blood cell counting, which is time consuming and errorprone.

U.S. Pat. No. 2,656,508 to Coulter, introduced the "Coulter Principle" that is still in use today for automated cell counting. The "Coulter Principle" refers to the use of an electric field for counting and sizing dilute suspensions of particles in conducting liquids. The "Coulter Principle" is currently applied in several modified procedures to provide more detailed blood cell counting, including red blood cell count, the different types of white cell counts, platelet count, and the mean size of the various cell types. Although the blood cell counting using the "Coulter Principle" is still very popular in clinical labs, the size of the analyzers limits the use of the "Coulter Principle" for POCT.

POCT has improved patient care in several areas including the Emergency Department (ED) of hospitals, but the ED is usually very busy and may have space for implementing one POCT analyzer, and practical issues (physical constraints) may limit implementation of more than one POCT analyzer. In addition to having accurate and reliable POCT in the ED, user friendliness and consolidation of tests is required. Therefore, there is a need to provide POCT analyzers that consolidate certain Hematology tests and certain Biochemistry tests. The present invention is intended to meet this need of consolidation of Hematology and Biochemistry tests in a single POCT system. Furthermore, the present invention may also decrease the volume of blood sample required for POCT.

SUMMARY OF THE INVENTION

The invention relates to a point-of-care testing (POCT) system that uses a disposable cartridge with a sliding cap.

Described herein is a cartridge (A) for measuring one or more properties of a blood sample when the blood sample is present within the cartridge, the cartridge comprising:
  a cartridge body;
  the cartridge body comprising an upper surface and a lower surface, the upper surface defining a sample storage well, and an optical chamber in fluid communication with the sample storage well;
  the sample storage well comprising a top portion for receiving the blood sample and a bottom portion, the bottom portion for releasing at least a portion of the blood sample into the optical chamber, or for receiving a liquid stored within the cartridge or from a system when the cartridge is in fluid communication with the system, the liquid for mixing with the blood sample to produce an altered blood sample and releasing at least a portion of the altered blood sample into the optical chamber;
  the optical chamber comprising at least one of an upper optical window and a lower optical window, the optical chamber for facilitating interrogation of the blood sample, or the altered blood sample by electromagnetic radiation; a post-optical chamber conduit for receiving excess blood from the optical chamber;
  a flat surface located on the upper surface of the cartridge body, the flat surface of the cartridge body surrounding the top portion of the sample storage well;
  one or more tracks that slidingly attach a sliding cap to the cartridge body, the sliding cap having a top side and an underside, wherein the underside of the sliding cap comprises a cap flat surface, the cap flat surface faces, and slides along, the upper surface, the sliding cap slidable from a first position to a second position;
    in the first position the sample storage well is configured to receive the blood sample; and in the second position at least a portion the flat surface of the cartridge body mates with at least a portion of the cap flat surface and the sliding cap is positioned over the sample storage well;

the cartridge further comprising at least one vent defined by a surface in the cap or the at least one vent defined by a surface in the post-optical chamber conduit; and the cartridge comprising a means for moving the blood sample or the altered blood sample out of the sample storage well and into the optical chamber, the means comprising the one of the cap vent and the cartridge vent, the cap configured in the second position, and a pump associated with the cartridge, wherein the pump associated with the cartridge is one of a pump in an analyzer when associated with the cartridge, or an air bladder disposed in the cartridge.

In the cartridge (A) as described above, the at least one vent is defined by the surface of the post-optical chamber conduit, and the flat surface of the cartridge body comprises an air bladder communication port or an associated analyzer pump communication port. So that, when the sliding cap is positioned over the sample storage well, a closed air passage is formed, the closed air passage operatively connecting the air bladder communication port and the associated analyzer pump communication port to the sample storage well. As a result, pressurized air from the air bladder, or the associated analyzer pump, may be transferred to the sample storage well. The closed air passage may be facilitated by a groove set into the upper surface of the cartridge body and aligned with the cap flat surface when the sliding cap is in the second position, a recess set into the underside of the cap, or a combination thereof. So that when the air bladder is squeezed, or the associated analyzer pump is activated, some, or all, of the blood sample is urged from the sample storage well towards the optical chamber, and air within the optical chamber is purged through the at least one vent.

Additionally, in the cartridge (A) described above, the vent may be defined by a surface in the cap, and the cartridge may further comprise a cartridge exit duct operatively connected to the optical chamber. The cartridge exit duct attachable to an analyzer pump so that when the cartridge body is operatively connected to the analyzer pump, negative pressure from the analyzer pump is transferable to the bottom portion of the sample storage well. With this configuration, when the sliding cap is positioned over the sample well, some or all of the blood sample may be urged from the sample storage well towards the optical chamber.

Also described herein is a cartridge (B) for measuring one or more properties of a blood sample when the blood sample is present within the cartridge, the cartridge comprising:
  a cartridge body;
  the cartridge body comprising an upper surface and a lower surface, the upper surface defining a sample storage well, the sample storage well comprising a top portion for receiving the blood sample, and a bottom portion for receiving a liquid for mixing with the blood sample to produce an altered blood sample;
  an optical chamber in fluid communication with the sample storage well, the optical chamber comprising at least one of an upper optical window and a lower optical window, the optical chamber for facilitating sample interrogation by electromagnetic radiation;
  a flat surface located on the upper surface of the cartridge body, the flat surface of the cartridge body surrounding the top portion of the sample storage well;
  a hollow sliding cap, slidably attached to the upper surface, the hollow sliding cap comprising an upper cap wall, a lower cap wall, side walls connecting the upper cap wall with the lower cap wall, the upper cap wall, the lower cap wall and the side walls defining a cap mixing cavity, the upper cap wall defining a cap vent for releasing pressure in the cap mixing cavity, the lower cap wall comprising a lower cap flat surface, the lower cap wall defining a cap inlet leading into the cap mixing cavity, the lower flat cap surface faces and slides along the upper surface, the hollow sliding cap movable from a first position to a second position;
    in the first position the sample storage well is configured to receive the blood sample;
    in the second position at least a portion of the flat surface of the cartridge body mates with at least a portion of the lower cap flat surface, and at least a section of the top portion of the sample storage well and at least a section of the cap inlet are brought into alignment so that the sample storage well is in fluid communication with the cap mixing cavity; and
  the cartridge comprising a means for moving the blood sample and the liquid into the cap mixing cavity, and for moving the altered blood sample into the optical chamber.

The cartridge (B) as described above may further comprises one of:
  one or more tracks that slidingly attach the hollow sliding cap to the cartridge body, the one or more tracks for sliding the hollow sliding cap from the first position to the second position, and
  a pivot that slidingly attaches the hollow sliding cap to the cartridge body, the pivot for rotatably sliding the hollow sliding cap from the first position to the second position.

In the cartridge (B), as described above, the cartridge body may further comprises, a sealed blister containing the liquid, a means for rupturing the sealed blister to produce a ruptured blister, and a liquid holding conduit in communication with the sample storage well, the liquid holding conduit for temporarily holding a metered volume of the liquid after the liquid is released from the ruptured blister. The cartridge body may further comprise a directional valve stem moveable from a first position to a second position wherein, in the first position, the blood sample and the liquid are not in fluid communication, in the second position, a fluid communication between the blood sample and liquid is established; and a means for moving the valve stem from the first position to the second position. For example, when the cartridge is inserted into an analyzer, the means for moving the valve stem from the first position to the second position may be provided by the analyzer. The cartridge body may further comprise a flappable valve element for preventing backflow of the liquid from the liquid holding conduit into the ruptured blister.

Additionally, in the cartridge (B), described above, the post-optical chamber conduit may comprise one or more reagents, the one or more reagents for mixing with the blood sample when present to produce an altered blood sample, and a means for drawing the altered blood sample into the optical chamber for altered blood sample interrogation.

Also described herein is a system (A) for measuring one or more properties of a blood sample when the blood sample is present within a cartridge. The system (A) comprises:
  i) a cartridge body, the cartridge body comprising:
    an upper surface and a lower surface, the upper surface defining a sample storage well, and an optical chamber in fluid communication with the sample storage well;

the sample storage well comprising a top portion for receiving the blood sample and a bottom portion, the bottom portion for releasing at least a portion of the blood sample into the optical chamber, or for receiving a liquid stored in the system, the liquid for mixing with the blood sample to produce an altered blood sample and releasing at least a portion of the altered blood sample into the optical chamber;

the optical chamber comprising at least one of an upper optical window and a lower optical window, the optical chamber for facilitating interrogation of the blood sample, or the altered blood sample by electromagnetic radiation;

a post-optical chamber conduit for receiving excess blood from the optical chamber;

a flat surface located on the upper surface of the cartridge body, the flat surface of the cartridge body surrounding the top portion of the sample storage well;

one or more tracks that slidingly attach a sliding cap to the cartridge body, the sliding cap having a top side and an underside, wherein the underside of the sliding cap comprises a cap flat surface, the cap flat surface faces, and slides along, the upper surface, the sliding cap sildable from a first position to a second position;
  in the first position the sample storage well is configured to receive the blood sample; and
  in the second position at least a portion the flat surface of the cartridge body mates with at least a portion of the cap flat surface and the sliding cap is positioned over the sample storage well;

the cartridge further comprising at least one vent defined by a surface in the cap, or the at least one vent defined by a surface in the post-optical chamber conduit; and the cartridge comprising a means for moving the blood sample, or the altered blood sample, out of the sample storage well and into the optical chamber, and ii) the analyzer comprises:
  a receptor for receiving the cartridge;
  at least one source of interrogating electromagnetic radiation (EMR) for interrogating at least some of the blood sample when the blood sample is positioned within the optical chamber, or for interrogating at least some of the altered blood sample when the altered blood sample is positioned within the optical chamber;
  at least one of a
    one-dimensional multi-channel detector for receiving EMR emerging from one of the blood sample in the optical chamber or the altered blood sample in the optical chamber, via an EMR dispersing element, the EMR dispersing element for providing wavelength-specific EMR and the one-dimensional multi-channel detector for generating wavelength-specific electrical signals, or
    a two-dimensional multi-channel detector for receiving EMR emerging from one of the blood sample in the optical chamber or the blood sample in the optical chamber, and generating detector-specific electrical signals;
  one or more analog to digital converter for receiving one or more of the wavelength-specific electrical signals for generating wavelength-specific digital information, or the detector-specific electrical signals for generating detector-specific digital information; and
  one or more processors for controlling the analyzer and transforming at least one of the wavelength-specific digital information and the detector-specific digital information into the one or more properties of the blood sample; and iii) a means for regulating the flow of the blood sample, the liquid, the altered blood sample, or a combination thereof through the cartridge body.

In the system (A), described above, the system may comprise the one-dimensional multi-channel detector and the two-dimensional multi-channel detector.

Also described herein is a system (B) for measuring one or more properties of a blood sample when the blood sample is present within a cartridge, the system comprising:

i) a cartridge body:
  the cartridge body comprising an upper surface and a lower surface, the upper surface defining a sample storage well, the sample storage well comprising a top portion for receiving the blood sample, and a bottom portion for receiving a liquid for mixing with the blood sample to produce an altered blood sample;
  an optical chamber in fluid communication with the sample storage well, the optical chamber comprising at least one of an upper optical window and a lower optical window, the optical chamber for facilitating sample interrogation by electromagnetic radiation;
  a flat surface located on the upper surface of the cartridge body, the flat surface of the cartridge body surrounding the top portion of the sample storage well;
  a hollow sliding cap, slidably attached to the upper surface, the hollow sliding cap comprising an upper cap wall, a lower cap wall, side walls connecting the upper cap wall with the lower cap wall, the upper cap wall, the lower cap wall and the side walls defining a cap mixing cavity, the upper cap wall defining a cap vent for releasing pressure in the cap mixing cavity, the lower cap wall comprising a lower cap flat surface, the lower cap wall defining a cap inlet leading into the cap mixing cavity, the lower flat cap surface faces and slides along the upper surface, the hollow sliding cap movable from a first position to a second position;
    in the first position the sample storage well is configured to receive the blood sample;
    in the second position at least a portion of the flat surface of the cartridge body mates with at least a portion of the lower cap flat surface, and at least a section of the top portion of the sample storage well and at least a section of the cap inlet are brought into alignment so that the sample storage well is in fluid communication with the cap mixing cavity; and
  the cartridge comprising a means for moving the blood sample and the liquid into the cap mixing cavity, and for moving the altered blood sample into the optical chamber; and ii) the analyzer comprises:
  a receptor for receiving the cartridge;
  at least one source of interrogating electromagnetic radiation (EMR) for interrogating at least some of the altered blood when the altered blood is positioned within the optical chamber;

at least one of a
- one-dimensional multi-channel detector for receiving EMR emerging from the altered blood sample in the optical chamber via an EMR dispersing element, the EMR dispersing element or providing wavelength-specific EMR, and the one-dimensional multi-channel detector for generating wavelength-specific electrical signals, or
- a two-dimensional multi-channel detector for receiving EMR emerging from the altered blood sample in the optical chamber, and generating detector-specific electrical signals;
- one or more analog to digital converter for receiving one or more of the wavelength-specific electrical signals for generating wavelength-specific digital information and the detector-specific electrical signals for generating detector-specific digital information;
- and one or more processors for controlling the analyzer and transforming at least one of the wavelength-specific digital information and the detector-specific digital information into the one or more properties of a blood sample; and iii) a means for regulating the flow of the blood sample, the fluid, the altered blood sample, or a combination thereof.

In the system (B), described above, the system may comprise the one-dimensional multi-channel detector and the two-dimensional multi-channel detector.

Also described herein is a cartridge (C) for measuring one or more properties of a blood sample, the cartridge comprising:

a cartridge body comprising an upper surface and a lower surface, the upper surface defining a sample storage well, and one or more detection chambers in fluid communication with the sample storage well;

the sample storage well comprising a top portion for receiving the blood sample and a bottom portion, the bottom portion for releasing at least a portion of the blood sample into the one or more detection chambers;

a detection chamber exit conduit for receiving excess blood from the one or more detection chambers;

a flat surface located on the upper surface of the cartridge body, the flat surface of the cartridge body surrounding the top portion of the sample storage well;

one or more tracks that slidingly attach a sliding cap to the cartridge body, the sliding cap having a top side and an underside, wherein the underside of the sliding cap comprises a cap flat surface, the cap flat surface faces, and slides along, the upper surface, the sliding cap sildable from a first position to a second position;

in the first position the sample storage well is configured to receive the blood sample; and in the second position at least a portion the flat surface of the cartridge body mates with at least a portion of the cap flat surface and the sliding cap is positioned over the sample storage well;

the cartridge (C) further comprising at least one vent defined by a surface in the cap, or the at least one vent defined by a surface in the detection chamber exit conduit; and the cartridge (C) comprising a means for moving the blood sample out of the sample storage well and into the one or more detection chambers.

Also provided is the cartridge (C), defined above, wherein the means for moving the blood sample comprises an air bladder disposed in the cartridge body, the air bladder in fluid communication with the sample storage well, the one or more detection chambers and the detection chamber exit conduit, or the means for moving the blood sample comprises an analyzer pump attachable to the cartridge body and in fluid communication with the sample storage well, the one or more detection chambers and the detection chamber exit conduit.

Furthermore, in the cartridge (C) as defined above, the one or more detection chambers may comprise, an optical chamber having at least one of an upper optical window and a lower optical window, the optical chamber for facilitating interrogation of the blood sample by electromagnetic radiation, an electrochemical sensor chamber having at least one of an amperometric sensor, a conductivity sensor and a potentiometric sensor. The one or more detection chambers may comprise an optical chamber having at least one of an upper optical window and a lower optical window, the optical chamber for facilitating interrogation of the blood sample by electromagnetic radiation, and an electrochemical sensor chamber having at least one of an amperometric sensor, a conductivity sensor and a potentiometric sensor, and wherein the optical chamber is disposed between the sample storage well and the electrochemical sensor chamber, whereby the electrochemical sensor chamber receives blood flowing out of the optical chamber.

In the cartridge (C) defined above the one or more tracks may be a female track having a first height defined as a height at all points along a first portion of the track, wherein the first portion of the track is a portion of the track occupied by the cap when the cap is in the first position, and a second height defined as a height at one or more points along a second portion of the track, wherein the second portion of the track is a portion of the track occupied by the cap when the cap is in the second position, wherein the first height and the second height are sufficiently high to facilitate movement of the cap along the track, and wherein the second height is sufficiently smaller than the first height in order to provide an airtight seal between the cap and the cartridge when the cap is in the second position.

Other aspects and features of the present invention will become apparent, to those having ordinary skill in the art, upon review of the following description of specific embodiments of the invention, which are provided as examples.

BRIEF DESCRIPTION OF THE DRAWINGS

A better understanding of the novel features and advantages of the present invention will be made by reading the detailed description of the preferred embodiments provided later, in conjunction with the accompanying drawings, in which:

FIG. 1A (Prior Art) a top view illustrating a version of a hemocytometer (a cell counting chamber device) that is used in conjunction with a microscope for manual cell counting;

FIG. 1B (Prior Art) is a cross-sectional view through the hemocytometer shown in FIG. 1A, along line B-B;

FIG. 1C (Prior Art) is an enlarged view of detail C shown in FIG. 1A;

FIG. 1D (Prior Art) is an enlarged view of detail D shown in FIG. 1B;

FIG. 1E (Prior Art) is an enlarged view of the top right square of FIG. 10 as indicated in FIG. 10;

FIG. 1F (Prior Art) is an enlarged view of center square of FIG. 10 as indicated in FIG. 10;

FIG. 2 is a block diagram of an example of a first embodiment of a system 30a (lower panel) for measuring one or more analyte quantities per unit volume of blood and one or more formed element quantities per unit volume of blood, in a blood sample. Output displays of the system (upper left and right panels) are provided as non-limiting examples;

FIG. 10A is an exploded top perspective view of a cartridge 10A for measuring at least one property of blood, according to a first embodiment of the cartridge;

FIG. 10B is a bottom view of the first housing member 50A of the cartridge shown in FIG. 10A;

FIG. 10C is the bottom view of the first housing member 50A of the cartridge shown in FIG. 10B, overlaid by and in alignment with a gasket 100A shown in FIG. 10A;

FIG. 10D is a top view of the second housing member 60A of the cartridge shown in FIG. 10A;

FIG. 10E is the top view of the second housing member 60A shown in FIG. 10D, overlaid by and in alignment with the gasket 100A shown in FIG. 10A;

FIG. 10F is a perspective view of the cartridge 10A shown in FIG. 10A, in a fully open position;

FIG. 10G is a perspective view of the cartridge 10A shown in FIG. 10A, but in a fully closed position;

FIG. 10H is top view of the cartridge 10A shown in FIG. 10G, in the fully closed position;

FIG. 10J is an enlarged cross-sectional view through the cartridge 10A shown in FIG. 10H along line J-J;

FIG. 10K is an enlarged cross-sectional view through the cartridge 10A shown in FIG. 10H along line K-K;

FIG. 11E is a perspective top view of the cartridge 10B shown in FIG. 11A, in a fully open position;

FIG. 11F is a perspective top view of the cartridge 10B shown in FIG. 11A, in a fully closed position;

FIG. 11G is top view of the cartridge 10B shown in FIG. 11E;

FIG. 11H is top view of the cartridge 10B shown in FIG. 11F;

FIG. 11J is an enlarged cross-sectional view through the cartridge 10B shown in FIG. 11G along line J-J;

FIG. 11K is an enlarged cross-sectional view through the cartridge 10B shown in FIG. 11H along line K-K;

FIG. 12D is a perspective top view of the cartridge 10C shown in FIG. 12A, in a fully open position;

FIG. 12E is a perspective top view of the cartridge 10C shown in FIG. 12A, in a fully closed position;

FIG. 12F is top view of the cartridge 10C shown in FIG. 12E;

FIG. 12G is an enlarged cross-sectional view through the cartridge 10C shown in FIG. 12F along line G-G;

FIG. 12H is an enlarged cross-sectional view through the cartridge 10C shown in FIG. 12F along line H-H;

FIG. 12J is an enlarged cross-sectional view through the cartridge 10C shown in FIG. 12F along line J-J;

FIG. 13A is an exploded perspective top view of a cartridge 10D for measuring at least one property of blood, according to a fourth embodiment of a cartridge;

FIG. 13B is a bottom view of the first housing member 50D of the cartridge shown in FIG. 13A;

FIG. 13C is a top view of the second housing member 60D of the cartridge shown in FIG. 13A;

FIG. 13D is top view of the cartridge 10D shown in FIG. 13A, in a closed position;

FIG. 13E is an enlarged cross-sectional view through the cartridge 10D shown in FIG. 13D along line E-E;

FIG. 13F is an enlarged cross-sectional view through the cartridge 10D shown in FIG. 13D along line F-F;

FIG. 14A is an exploded perspective top view of a cartridge 10E for measuring at least one property of blood, according to a fifth embodiment of the cartridge;

FIG. 14B is a bottom view of the first housing member 50E of the cartridge shown in FIG. 14A;

FIG. 14C is the bottom view of the first housing member 50E of the cartridge shown in FIG. 14B, overlaid by and in alignment with a gasket 100E shown in FIG. 14A;

FIG. 14D is a top view of the second housing member 60E of the cartridge shown in FIG. 14A;

FIG. 14E is a top view of the second housing member 60E shown in FIG. 14D, overlaid by and in alignment with the gasket 100E shown in FIG. 14A;

FIG. 14F is a top view of the cartridge 10E shown in FIG. 14A with the cap in an open position;

FIG. 14G is a bottom view of the cartridge 10E shown in FIG. 14A;

FIG. 14H is a top view of the cartridge 10E shown in FIG. 14A with the cap in an open position;

FIG. 14J is an enlarged cross-sectional view through the cartridge 10E shown in FIG. 14H along line J-J;

FIG. 14K is an enlarged cross-sectional view through the cartridge 10E shown in FIG. 14H along line K-K;

FIG. 14L is a detailed view of detail L of the second directional valve shown in FIG. 14J;

FIG. 14M is a perspective top view of the cartridge 10E shown in FIG. 14H;

FIG. 14N is a top view of the cartridge 10E shown in FIG. 14A with the cap in a closed position;

FIG. 14P is an enlarged cross-sectional view through the cartridge 10E shown in FIG. 14N along line P-P;

FIG. 14Q is an enlarged cross-sectional view through the cartridge 10E shown in FIG. 14N along line Q-Q;

FIG. 14R is a perspective top view of the cartridge 10E shown in FIG. 10N,

FIG. 14S is a perspective top view of the cap 70E of cartridge 10E;

FIG. 14T is a perspective bottom view of the cap 70E of cartridge 10E;

FIG. 14U is a perspective view of a first directional valve element 313E (the top and the bottom views are the same);

FIG. 14V is a top view of a second directional valve element 321E;

FIG. 14W is a cross-sectional view of the second directional valve element 321E shown in FIG. 14V along line W-W;

FIG. 14X is a first perspective view of a second directional valve element 321E;

FIG. 14Y is a second perspective view of a second directional valve element 321E;

FIG. 16A is an exploded perspective top view of a cartridge 10G for measuring at least one property of blood, according to a seventh embodiment of the cartridge;

FIG. 16B is a bottom view of the first housing member 50G of the cartridge shown in FIG. 16A;

FIG. 16C is the bottom view of the first housing member 50G of the cartridge shown in FIG. 16B, overlaid by and in alignment with a gasket 100G shown in FIG. 16A;

FIG. 16D is a top view of the second housing member 60G of the cartridge shown in FIG. 16A;

FIG. 16E is the top view of the second housing member 60G shown in FIG. 16D, overlaid by and in alignment with the gasket 100G shown in FIG. 16A;

FIG. 16F is a top view of the cartridge 10G shown in FIG. 16A with the cap and laminate 71G removed;

FIG. 16G is a bottom view of the cartridge 10G shown in FIG. 16A with laminate 347G removed;

FIG. 16H is a perspective top view of the cartridge 10G shown in FIG. 16A with the cap in an open position;

FIG. 16J is a perspective bottom view of the cartridge 10G shown in FIG. 16A;

FIG. 16K is a top view of the cartridge 10G shown in FIG. 16A with the cap in a closed position;

FIG. 16L is an enlarged cross-sectional view through the cartridge 10G shown in FIG. 16K along line L-L;

FIG. 16M is an enlarged cross-sectional view through the cartridge 10G shown in FIG. 16K along line M-M;

FIG. 16N is an enlarged cross-sectional view through the cartridge 10G shown in FIG. 16K along line N-N;

FIG. 16P is an enlarged cross-sectional view through the cartridge 10G shown in FIG. 16K along line P-P;

FIG. 17A is a top view of the cartridge 10H for measuring at least one property of blood, according to an eight embodiment of the cartridge, shown with the cap in an open position;

FIG. 17B is a perspective top view of the cartridge 10H shown in FIG. 17A;

FIG. 17C is an enlarged cross-sectional view through the cartridge 10H shown in FIG. 17A along line C-C;

FIG. 17D is a perspective top view of the caps 70G & 70H of cartridges 10G & 10H respectively;

FIG. 17E is a perspective bottom view of the caps 70G & 70H of cartridges 10G & 10H respectively.

FIG. 18A is an exploded perspective top view of a cartridge 10J for measuring at least one property of blood, according to a ninth embodiment of the cartridge;

FIG. 18B is a bottom view of the first housing member 50J of the cartridge shown in FIG. 18A;

FIG. 18C is the bottom view of the first housing member 50J of the cartridge shown in FIG. 18B, overlaid by and in alignment with a gasket 100J shown in FIG. 18A;

FIG. 18D is a top view of the second housing member 60J of the cartridge shown in FIG. 18A;

FIG. 18E is the top view of the second housing member 60J shown in FIG. 18D, overlaid by and in alignment with the gasket 100J shown in FIG. 18A;

FIG. 18F is a perspective top view of the cartridge 10J shown in FIG. 18A with the cap removed;

FIG. 18G is a perspective bottom view of the cartridge 10J shown in FIG. 18A;

FIG. 19A is a top view of the cartridge 10J shown in FIG. 18A with the cap in an open position;

FIG. 19B is a top view of the cartridge 10J shown in FIG. 18A with the cap in a closed position;

FIG. 19C is an enlarged cross-sectional view through the cartridge 10J shown in FIG. 19B along line C-C;

FIG. 19D is a perspective top view of the cartridge cap 70J shown in FIG. 18A;

FIG. 19E is a perspective bottom view of the cartridge cap 70J shown in FIG. 18A;

FIG. 19F is an enlarged cross-sectional view through the cartridge 10J shown in FIG. 19A along line F-F;

FIG. 19G is an enlarged cross-sectional view through the cartridge 10J shown in FIG. 19A along line G-G;

FIG. 19H is an enlarged cross-sectional view through the cartridge 10J shown in FIG. 19B along line H-H;

FIG. 20A is an exploded perspective top view of a cartridge 10K for measuring at least one property of blood, according to a tenth embodiment of the cartridge;

FIG. 20B is a bottom view of the first housing member 50K of the cartridge shown in FIG. 20A;

FIG. 20C is the bottom view of the first housing member 50K of the cartridge shown in FIG. 20B, overlaid by and in alignment with a gasket 100K shown in FIG. 20A;

FIG. 20D is a top view of the second housing member 60K of the cartridge shown in FIG. 20A;

FIG. 20E is the top view of the second housing member 60K shown in FIG. 20D, overlaid by and in alignment with the gasket 100K shown in FIG. 20A;

FIG. 20F is a detailed top view of detail F of the housing member 60K shown in FIG. 20D;

FIG. 20G is a detailed perspective view of detail H of the housing member 60K shown in FIG. 20E;

FIG. 20H is a detailed top view of detail F of the housing member 60K shown in FIG. 20A;

FIG. 21A is a top view of the cartridge 10K shown in FIG. 20A with the cap in an open position;

FIG. 21B is a top view of the cartridge 10K shown in FIG. 20A with the cap in a closed position;

FIG. 21C is an enlarged cross-sectional view through the cartridge 10K shown in FIG. 21A along line C-C;

FIG. 21D is an enlarged cross-sectional view through the cartridge 10K shown in FIG. 21B along line D-D;

FIG. 21E is an enlarged cross-sectional view through the cartridge 10K shown in FIG. 21B along line E-E; and FIG. 21F is a detailed view of detail F shown in FIG. 21E.

For a better understanding of the present invention, and to show more clearly how it may be carried into effect, reference will now be made, by way of example, to the accompanying drawings, and which are described in the following detailed description of preferred aspects of the invention.

DETAILED DESCRIPTION OF PREFERRED ASPECTS OF THE INVENTION

An analyzer and a system for measuring one or more analyte quantities per unit volume of blood (i.e., the concentration of the analyte) using spectroscopic technique, and one or more formed element quantities per unit volume of blood (i.e., a cell count) using imaging technique, are described. Also described are one or more cartridges for receiving a sample of blood for use within the analyzer.

Cartridges with sliding caps and having one or more detection chambers for measuring one or more properties of a blood sample, are also provided herein. The one or more detection chambers comprise at least one of an optical chamber and an electrochemical sensor chamber also referred to as an electrochemical sensor conduit, electrochemical sensor chamber, or sometimes a biosensor chamber/conduit. The electrochemical sensor chamber/conduit may contain at least one of an amperometric sensor, a conductivity sensor and a potentiometric sensor. It should be understood that an amperometric sensor may comprise for example an enzyme (e.g. a glucose electrode comprising glucose oxidase), the conductivity sensor may comprise conductometric sensor (e.g. a hematocrit sensor or an electrical switch), and a potentiometric sensor may comprise an ion-selective membrane (e.g. a pH electrode), and these are non-limiting examples.

Figure 8:
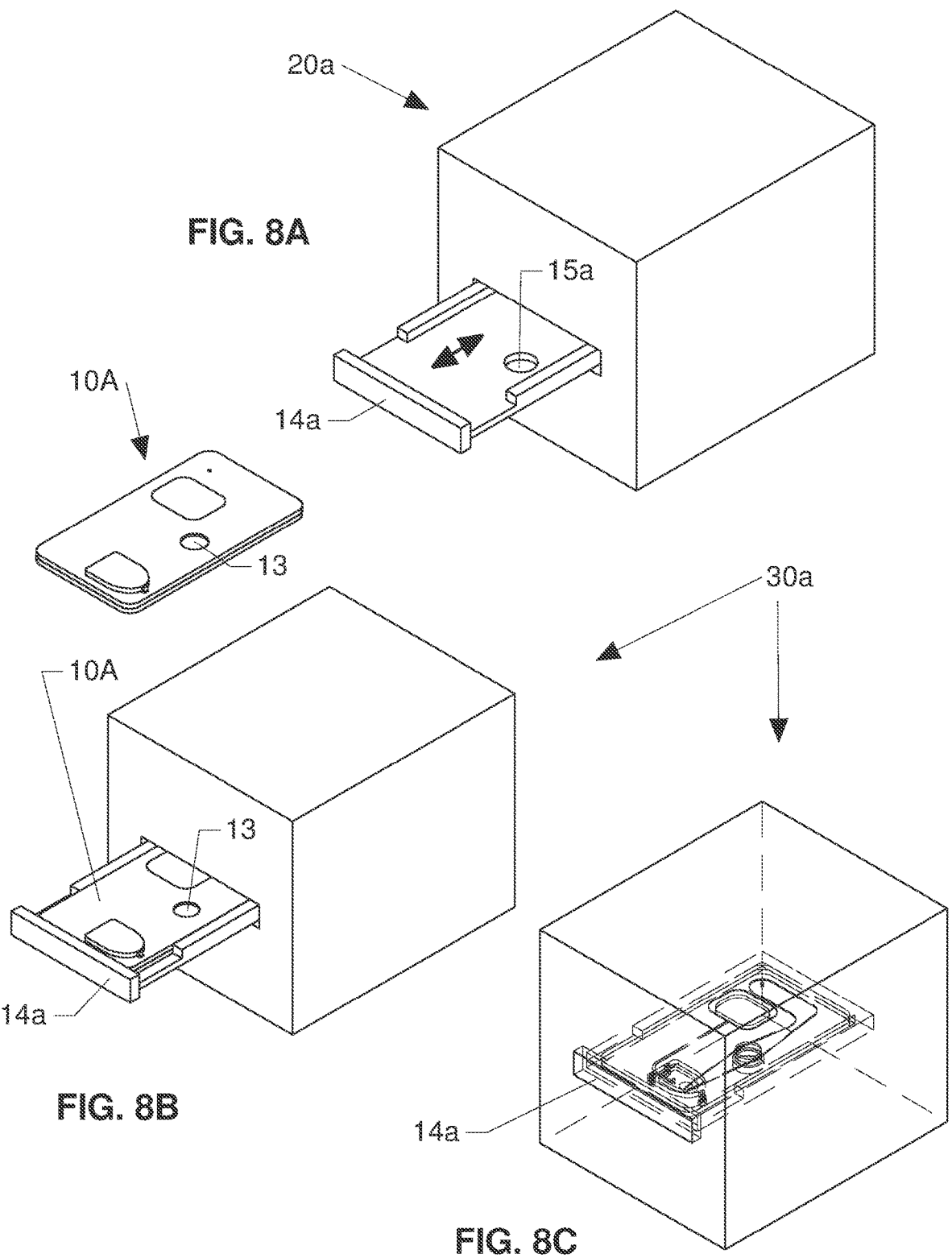
FIG. 8A is perspective view of an example of a first embodiment of a system 30a for measuring one or more analyte quantities per unit volume of blood and one or more formed element quantities per unit volume of blood, in a blood sample, showing a cartridge 10A separate from an analyzer 20a showing a receptor 14a in an open position.
FIG. 8B is perspective view of an example of a first embodiment of a system 30a for measuring one or more analyte quantities per unit volume of blood and one or more formed element quantities per unit volume of blood, in a blood sample, showing the cartridge 10A engaged with the receptor 14a, with the receptor in an open position.
FIG. 8C is perspective view of an example of a first embodiment of a system 30a for measuring one or more analyte quantities per unit volume of blood and one or more formed element quantities per unit volume of blood, in a blood sample, showing the cartridge 10A engaged with the receptor 14a, with the receptor in a closed position.

By way of example, the system 30a comprises a cartridge 10A and an analyzer 20a (see FIGS. 8A-8C). The cartridge 10A comprises at least one optical chamber 13 for interrogating or illuminating at least some of a blood sample with electromagnetic radiation (EMR) via an aperture 15a shown in FIG. 8A. The EMR transmitted through the blood in the optical chamber and/or reflected from the blood in the optical chamber is used to measure the analyte concentration by spectroscopy and the cell count by imaging.

An example of a system described herein comprises at least one cartridge having at least one optical chamber (see 13 in cartridge 10A, used as an example, shown in FIG. 8A), and an analyzer (see 20a shown in FIG. 8A).

As described herein the analyzer typically comprises:

a) at least one receptor (see 14a shown in FIGS. 8A-8C) for receiving the cartridge. A person having skill in the art should appreciate that the receptor may come in different forms, for example, a pull-out tray as illustrated in FIGS. 8A-8C, a hinged tray that swivels in and out of the body of the analyzer, a simple slot for inserting the cartridge, or a stationary tray that can be accessed by opening a door in the body of the analyzer. Any type of cartridge with an optical chamber may be used, or adapted for use (i.e. to ensure alignment of the optical chamber with the path of EMR that is used to interrogate a sample), with the analyzer. Non limiting examples of cartridges that may be used include those shown in FIGS. 10A-17E as described herein; and those as described in U.S. Pat. Nos. 8,206,650, 9,470, 673, 9,821,307, 9,999,884, 10,272,430, and U.S. Pat. Appl'n Pub. No. US 2019/0224667, and CA Pat. No. 2,978,737 (each of which are incorporated herein by reference).

b) at least one source of EMR (the source of EMR may also be termed interrogating EMR, and these terms are used interchangeably) for interrogating or illuminating at least some of the blood sample in the optical chamber (see optical chamber 13 in FIG. 8A, as an example), and producing a first set of emerging EMR and a second set of emerging EMR. One or more, of the at least one source of interrogating EMR should be a polychromatic source of EMR. A person having skill in the art would realize that polychromatic EMR could be the combination of a plurality of monochromatic EMR. The polychromatic source of EMR may encompasses wavelengths within a range of about 300-2,500 nanometers, for example, or within a range of about 400-800 nanometers. Some embodiments of the analyzer may also comprise a collimation or collimating system (e.g., see 46a in FIG. 2) for providing substantially parallel illuminating or emerging rays of EMR, and some embodiments may comprise a focusing system (e.g., see 48f in FIG. 7) having one or more focusing lenses for projecting a real image of the blood sample on to a two-dimensional multi-channel detector. In some embodiments the collimation system may be disposed between the source of EMR and receptor of the analyzer, and in other embodiments the collimation system may be disposed between the receptor of the analyzer and the two-dimensional multi-channel detector. Embodiments of a system having an area of the blood sample being interrogated by the EMR significantly smaller than the area of the two-dimensional multi-channel detector may comprise a magnification system in order to magnify the image to occupy a substantial area of the two-dimensional multi-channel detector, for increasing the resolution of the formed elements of blood. Optional magnification systems are shown as 18b in FIG. 3, 18c in FIG. 4, 18d in FIG. 5, 18e in FIG. 6, and 18g in FIG. 9. Electronic magnification of the image after the image is formed on two-dimensional multi-channel detector is another option for increasing the space between formed elements of blood that are imaged. In some embodiments, the area of the optical chamber may be similar to the area of the two-dimensional multi-channel detector, and no magnification may be required, depending on the size of the formed elements being observed. The depth of field provided by a magnification system is preferably approximately equal to the depth of the optical cavity, in order to keep formed elements at different levels in the optical chamber in focus. Some embodiments may comprise a magnification system that provides a plurality of magnification settings for optimizing the image formed on the two-dimensional multi-channel detector;

c) a means for directing each of the first set of emerging EMR and the second set of emerging EMR to one of a one-dimensional multi-channel detector and a two-dimensional multi-channel detector. The one-dimensional multi-channel detector may be a photodiode linear array or a charge-coupled device (CCD) linear array. The two-dimensional multi-channel detector may be a CCD camera or a complementary metal oxide semiconductor (CMOS) camera. The pixel pitch of the CCD camera and the CMOS camera is preferably between one quarter and one half the size of the formed elements being observed, in order to resolve the formed elements (see Table 1 for the sizes of formed elements of blood). Due to the rapid development in detection and imaging technologies, the examples provided should not limit the present invention in any way;

d) a dispersing element for receiving and dispersing the first set of emerging EMR into its component wavelengths, to produce dispersed EMR;

e) the one-dimensional multi-channel detector for receiving the dispersed EMR and generating wavelength-specific electrical signals;

f) an analog to digital converter for receiving the wavelength-specific electrical signals and generating wavelength-specific digital information;

g) the two-dimensional multi-channel detector for receiving the second set of emerging EMR and generating detector-specific electrical signals;

h) the analog to digital converter or a second analog to digital converter for receiving the detector-specific electrical signals and generating detector-specific digital information; and i) one or more processors integrated in the analyzer or separate processor modules electrically connected to the analyzer. The one or more processors may be used to: 1) control the analyzer; 2) transform the wavelength-specific digital information into the one or more analyte quantities per unit volume of blood; and 3) transform the detector-specific digital information into the one or more formed element quantities per unit volume of blood. Examples of output displays from processors are provided as 37a and 39a in FIG. 2. It should be understood by a person skilled in the art, that the digital information used to create displays 37a and 39a may be used in several different ways. For example, instead of an absorbance spectrum 39a, a transmission or reflection spectrum may be displayed, and instead of the outline of formed elements of blood, the formed elements may appear as black spots against a white background, if staining is employed. Moreover, it is the actual digital data (or information) that are used, for example, digital absorbance data, digital transmission data or digital reflection data that are used in conjunction with pre-developed calibration algorithms to predict one or more analyte concentration or one or more cell count.

Due to the multi-functional aspects of the cartridges described, some analyzers for measuring one or more properties of a blood sample may comprise the aforementioned features minus the two-dimensional multi-channel detector, and consequently, means for directing emerging EMR to the two-dimensional multi-channel detector. A block diagram of an example of a system comprising the analyzers just described may be envisioned in FIG. 2, absent both the beam splitter 16a and the two-dimensional multi-channel detector 22a (30a, lower panel); the output display for such a system may be envisioned as 39a (upper right panel).

The source of EMR (interrogating EMR) in the system described may be a single source or multiple sources of EMR, and at least one or a combination of sources must produce polychromatic EMR for spectral or spectroscopic analysis of the blood. A second source of EMR may be polychromatic, a laser (monochromatic), a light emitting diode (LED). The polychromatic source of EMR may be one of an incandescent lamp, a white LED, a ring of LEDs, and a bundle of LEDs. The source(s) of EMR may be arranged to operate in reflection mode, transmission mode, or a combination thereof. Additionally, a dispersing element is required for receiving and dispersing a set of emerging EMR into its component wavelengths, to produce dispersed EMR. The dispersing element may be a grating (diffraction grating) or a dispersion prism (see 28*a* in FIG. 2), and the grating may be a reflecting grating (see 28*c* in FIGS. 4 and 28*d* in FIG. 5) or a transmission grating (see 28*b* in FIGS. 3 and 28*e* in FIG. 6). As described below, the cartridges of the present invention may contain staining reagents that may selectively stain the nucleus of leukocytes. Therefore, a person having skill in the art should realize that by choosing a source of EMR of a wavelength or wavelengths that is/are absorbed by a particular stain(s) (or dye) taken up by the nucleus of leukocytes, and using transmission mode, the stained leukocytes will transmit less EMR than the surrounding plasma. In other words, leukocytes that are stained by the particular dye may appear as black dots when the incident wavelength corresponds to the wavelength of absorbance maximum of the dye. In transmission mode, even without the use of staining reagents, formed elements are expected to attenuate more EMR (mono- or polychromatic EMR) than the surrounding plasma, producing images having various shades of grey. The attenuation of EMR may be the result of absorbance, scattering, or a combination thereof. In reflectance mode, and using a black surface on the side opposite to the side of the source of EMR, even without the use of staining reagents, formed elements are expected to reflect more EMR (mono- or polychromatic EMR) than the surrounding plasma, producing lighter images on a darker background; the EMR passing through the plasma is expected to be absorbed by the black surface. These are just examples of how images of formed elements of blood may be created. The systems used for measuring one or more formed element quantities per unit volume of blood, as describe previously, may not all be suitable for measuring one or more analyte quantities per unit volume of blood, therefore both measurements are to be considered when designing a system according to the present invention.

Figure 5:
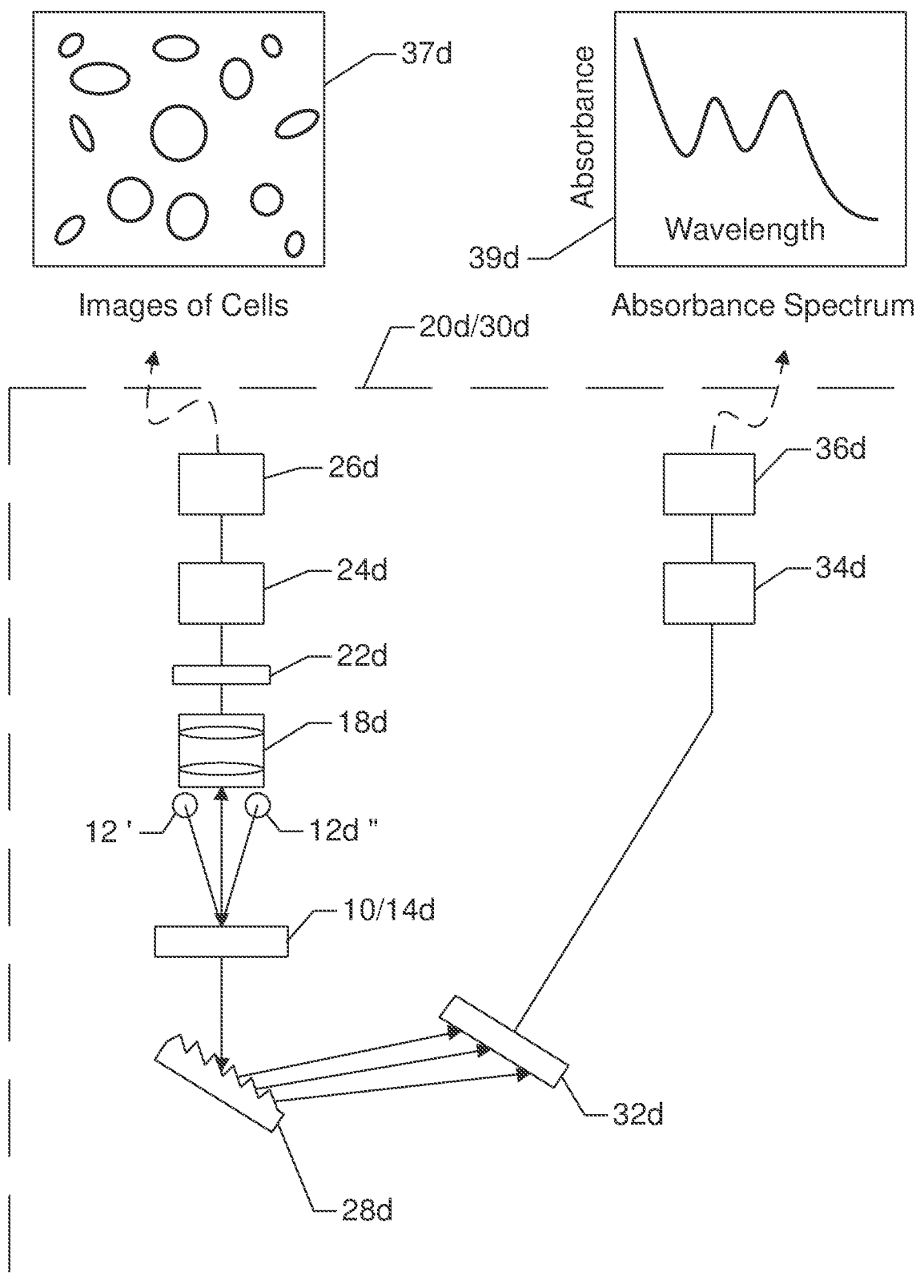
FIG. 5 is a block diagram of an example of a fourth embodiment of a system 30d (lower panel) for measuring one or more analyte quantities per unit volume of blood and one or more formed element quantities per unit volume of blood, in a blood sample. Output displays of the system (upper left and right panels) are provided as non-limiting examples.
Figure 6:
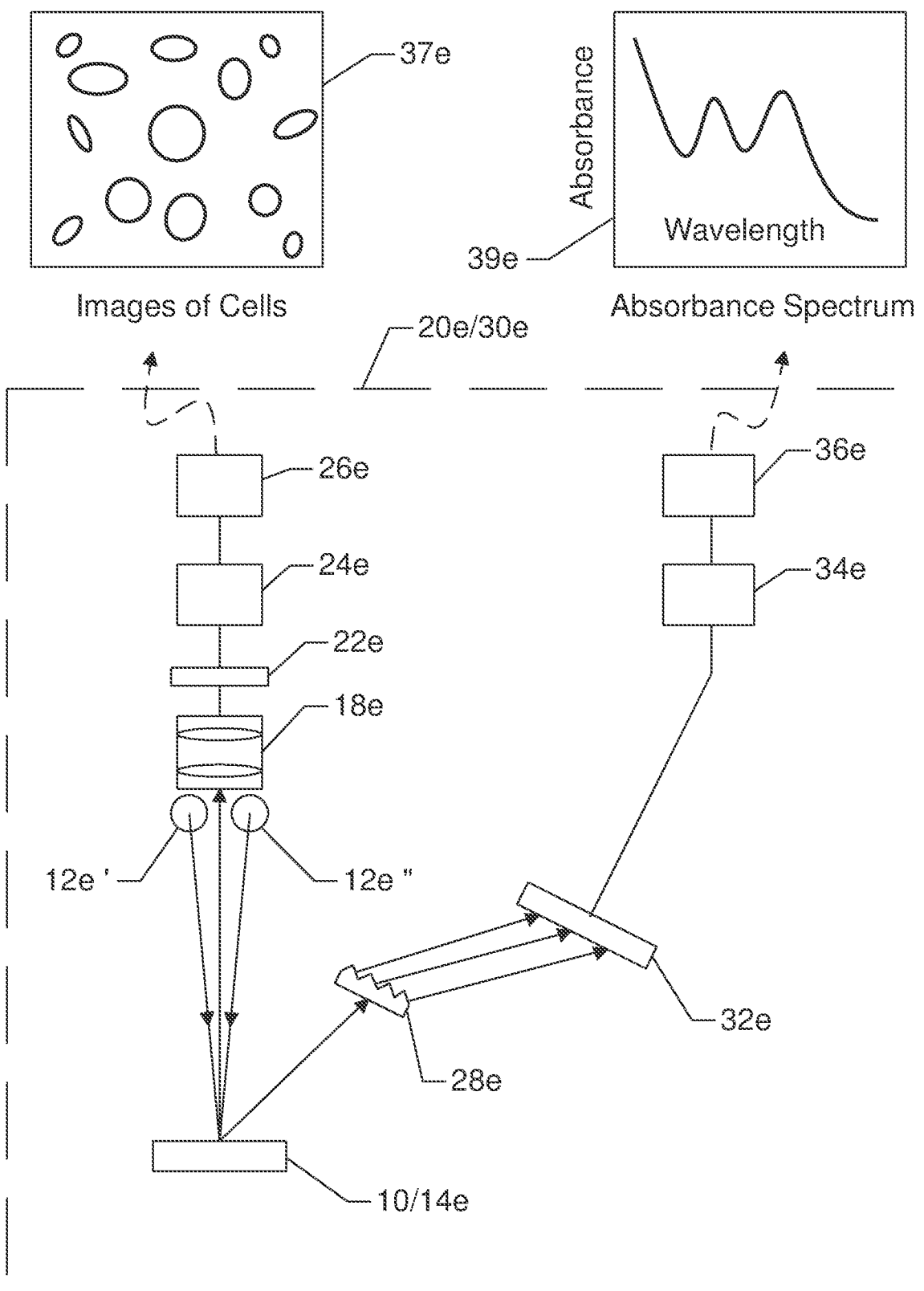
FIG. 6 is a block diagram of an example of a fifth embodiment of a system 30e (upper panel) for measuring one or more analyte quantities per unit volume of blood and one or more formed element quantities per unit volume of blood, in a blood sample. Output displays of the system (upper left and right panels) are provided as non-limiting examples.
Figure 9:
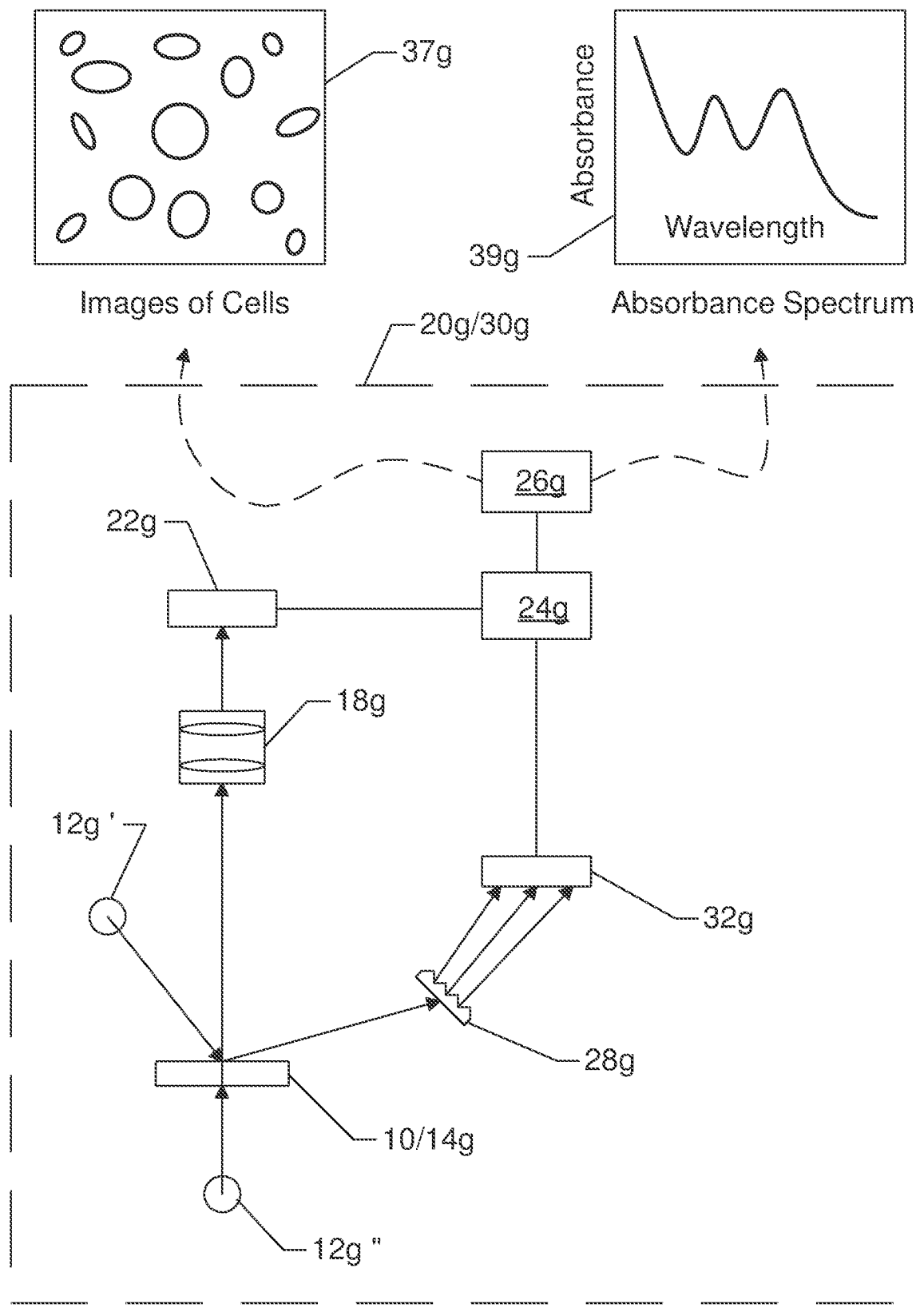
FIG. 9 is a block diagram of an example of a seventh embodiment of a system 30g (lower panel) for measuring one or more analyte quantities per unit volume of blood and one or more formed element quantities per unit volume of blood, in a blood sample. Output displays of the system (upper left and right panels) are provided as non-limiting examples.

In the system described, the means for directing the first and second sets of EMR emerging from the blood sample to the one-dimensional multi-channel detector and the two-dimensional multi-channel detector may involve the use of: 1) a beam splitter (see 16*a* in FIG. 2, 16*c* in FIG. 4, and 16*f* in FIG. 7); 2) a pivotal mirror (see 17*b* in FIG. 3); 3) a combination of transmitted emerging EMR and reflected emerging EMR (see system 30*d* in FIG. 5); or 4) the first set of emerging EMR is transmitted through the sample and the second set of emerging EMR is reflected from the sample; 5) the first set of emerging EMR is reflected from the sample and the second set of emerging EMR is transmitted through the sample; and 6) the first set of emerging EMR and the second set of emerging EMR are reflected from the sample, wherein the general direction of the first set of emerging EMR and the general direction of the second set of emerging EMR define an angle less than 90 degrees (see system 30*e* in FIG. 6 where the source/sources of EMR has/have the same location, and see system 30*g* in FIG. 9 where the sources of EMR have different locations). The beam splitter may be a bifurcated optical fiber (see 16*c* in FIG. 4), a plate comprising a partially silvered coating or a dielectric coating (see 16*f* in FIG. 7), and a partially reflecting prism (see 16*a* in FIG. 2). Beam splitters may be designed to split the incoming EMR into pre-selected ratios of outgoing EMR as required to optimize the outputs (for example, outputs illustrated as 37*a*-37*g* and 39*a*-37*g*).

The EMR detection techniques used for biochemistry are usually referred to as spectroscopic techniques or spectroscopy. Some Biochemistry tests include for example, blood gases (pH, $pO_2$, i.e., partial pressure of oxygen, and $pCO_2$, i.e., partial pressure of carbon dioxide). These tests usually use biosensor or electrochemical sensor measuring techniques. Therefore, in order to further expand the POCT menu, the cartridge of the present invention may also comprise a biosensor chamber having one or more biosensors for providing additional one or more analyte quantities per unit volume of blood. U.S. Pat. Nos. 8,206,650, 9,470,673 and CA Pat. No. 2,978,737 (hereby incorporated by reference), teach the combination of spectroscopy and biosensor technologies in one cartridge. These patents describe cartridges that use the combination of spectroscopy and biosensor technologies. Additionally, U.S. Pat. Nos. 9,821,307, 9,999,884, 10,272,430, and U.S. Pat. Appl'n Pub. No. US 2019/0224667 (hereby incorporated by reference), teach the combination of spectroscopy and biosensor technologies in one cartridge for conducting coagulation tests, for example PT-INR and ACT. These documents describe cartridges that use the combination of spectroscopy and biosensor technologies, cartridges capable of measuring blood gases and electrolytes (examples of Biochemistry tests, using biosensors), bilirubin and full CO-oximetry (examples of Biochemistry tests using spectroscopy), and PT-INR and ACT (examples of Coagulation tests using spectroscopy). An example of a similar cartridge having advantageous features not disclosed in the prior art is provided in FIGS. 16A-16P (cartridge 10G).

Some of the cartridges used in the system described herein, comprise an optical chamber having a cavity for containing some of the blood sample, sandwiched between two optical windows, wherein at least one of the optical windows is transparent or translucent. Some other examples of an optical chamber may comprise a cavity for containing some of the blood sample, sandwiched between two optical windows, wherein at least one of the optical windows comprise a reflecting surface for reflecting EMR after the illuminating EMR has penetrated the sample, or a surface for absorbing EMR not reflected by formed elements of blood. The two optical windows are substantially parallel to each other, and the depth of the cavity is preferably about 50-200 micrometers. The area of the transparent or translucent optical window in contact with the blood sample is preferably about 1-100 square millimeters. An example of a similar cartridge having advantageous features not disclosed in the prior art is provided in FIGS. 17A-17E (cartridge 10H).

Any type of cartridge with an optical chamber may be used, or modified as required to ensure alignment of the optical chamber with the path of EMR that is used to interrogate a sample. Non-limiting examples of suitable cartridges that may be used include those shown in FIGS. 10A-17E described herein; and those as described in U.S. Pat. Nos. 8,206,650, 9,470,673, 9,821,307, 9,999,884, 10,272,430, and U.S. Pat. Appl'n Pub. No. US 2019/0224667, and CA Pat. No. 2,978,737 (each of which are incorporated herein by reference). Cartridges may be made of any suitable material, for example, but not limited to a clear polymeric material, a clear plastic, for example, polymethyl methacrylate (PMMA, plexiglass) or polyethylene terephthalate (PET), a material that is transparent to a wavelength of electromagnetic radiation used to interrogate the sample, or a combination thereof. A list of suitable polymers is provided in Table 2 of U.S. Pat. No. 10,272,430 (which is incorporated herein by reference). The optical chamber may be made from the same, or a different, material from that of the cartridge body, provided that the material used for the optical chamber is transparent to a wavelength of electromagnetic radiation used to interrogate the sample, or translucent.

Still regarding the system described herein, the cartridges may comprise at least one reagent, for example but not limited to, a hemolyzing reagent (for example but not limited to deoxycholate), an anticoagulant (for example but not limited to heparin), a reagent used to measure PT-INR (for example, but not limited to thromboplastin), and a staining reagent (for example but not limited to eosin), preferably in dry form. The at least one reagent may be lyophilized, heat-dried or vacuum dried, and disposed anywhere between the top opening of the sample storage well and one of a vent and a cartridge exit. In some cartridge embodiments, the at least one dry reagent may be disposed in the post-optical chamber conduit. Some of the cartridges may comprise a sealed blister containing a liquid reagent or a diluent, for example FIGS. 14A-14Y (cartridge 10E), FIGS. 15A-15X (cartridge 10F) and FIGS. 16A-16P (cartridge 10G. Some systems may further comprise means for releasing the liquid reagent and diluent and means for mixing the blood and the liquid reagent or diluent. In some embodiments of cartridges, release of liquid reagents and diluents are metered. By way of example, which should not be considered limiting in any way, cartridge 10E (see FIGS. 14A-14Y) and 10F (FIGS. 15A-15X) describe metering systems for liquids contained in blister pouches (also referred to as blisters). As shown in Table 1, the red cell count is about one thousand times the white cell count, therefore in order to avoid over sampling of the red cells, dilution of the sample may be preferred. Although diluting the blood sample is one way of performing red blood cell count using the "Coulter Principle" and the manual hemocytometer, another method may be magnifying a small area of the optical chamber in order to decrease the number of red blood cells counted and at the same time increasing the spaces between the red blood cells, and using a high resolution camera having a pixel pitch between one quarter and one half the size of the red blood cell. Therefore, a preferable pixel pitch for counting red blood cells is less than 4 µm, and a preferable pixel pitch for at least counting white blood cells is 1-10 µm (see Table 1 for nominal sizes of formed elements of blood). Another aspect of the invention described herein is electronic magnification of the image after the image is formed on a two-dimensional multi-channel detector.

As used herein, the terms "comprising," "having," "including" and "containing," and grammatical variations thereof, are inclusive or open-ended and do not exclude additional, un-recited elements and/or method steps. The term "consisting essentially of" when used herein in connection with a use or method, denotes that additional elements and/or method steps may be present, but that these additions do not materially affect the manner in which the recited method or use functions. The term "consisting of" when used herein in connection with a use or method, excludes the presence of additional elements and/or method steps. A use or method described herein as comprising certain elements and/or steps may also, in certain embodiments consist essentially of those elements and/or steps, and in other embodiments consist of those elements and/or steps, whether or not these embodiments are specifically referred to. In addition, the use of the singular includes the plural. The term "plurality" as used herein means more than one, for example, two or more, three or more, four or more, and the like. Unless otherwise defined herein, all technical and scientific terms used herein have the same meaning as commonly understood by one of ordinary skill in the art. As used herein, the term "about" refers to an approximately +/−25% variation from a given value. It is to be understood that such a variation is always included in any given value provided herein, whether or not it is specifically referred to. The use of the word "a" or "an" when used herein in conjunction with the term "comprising" may mean "one," but it is also consistent with the meaning of "one or more," "at least one" and "one or more than one."

The terms "operatively connected", "in operative communication", "in fluid communication", "in fluid connection" or "fluidly connected" and the like, describe elements of the cartridge, for example, channels, ducts, conduits, tunnels, passageways, that permit either fluid flow, gas flow, or both fluid and gas flow between the various compartments or elements within the cartridge that are connected by the channels, ducts, conduits, tunnels, passageways and the like.

Detailed description of features of examples of the invention is described with reference to the accompanying drawings. These examples are to be considered non-limiting, and a person having ordinary skill in the art should understand that variations are within the scope of the invention, even though they are not explicitly illustrated. The same reference numerals are used for similar elements in different examples; in some cases, letters are appended to the end of the reference numerals to denote the embodiment of the invention illustrated. For example, the letters (lowercase) "a" (FIG. 2), "b" (FIG. 3), "c" (FIG. 4), "d" (FIG. 5), "e" (FIG. 6), "f" (FIG. 7) and "g" (FIG. 9), are used to refer to the $1^{st}$, $2^{nd}$, $3^{rd}$, $4^{th}$, $5^{th}$, $6^{th}$ and $7^{th}$ embodiments or examples of the invention (system), respectively; and the letters (uppercase) "A" (FIGS. 10A-10K), "B" (FIGS. 11A-11K), "C" (FIGS. 12A-12J), "D" (FIGS. 13A-13E), "E" (FIGS. 14A-14Y), "F" (FIGS. 15A-15X), "G" (FIGS. 16A-16P), "H" (FIGS. 17A-17E), "J" (FIGS. 18A-19H) and "K" (FIGS. 20A-21F) are used to refer to the $1^{st}$, $2^{nd}$, $3^{rd}$, $4^{th}$, $5^{th}$, $6^{th}$, $7^{th}$, $8^{th}$ 9th and $10^{th}$ embodiments or examples of the invention (cartridge), respectively. It should be noted that absence of a letter after a reference numeral may refer to multiple examples of the invention, for example, 13 refers to an optical chamber in all the examples of cartridges (10A-10H). For easy reference, Table 2 provides a list of the reference numerals used, and a brief description of the corresponding structural features.

TABLE 2

Description of Structural Features.

| Reference Numerals | Description of Structural Features |
|---|---|
| 10 | A generic cartridge for use with analyzers 20a, 20b, 20c, 29d, 20e, 20f and 20g |
| 10A | A first embodiment of a cartridge |
| 10B | A second embodiment of a cartridge |
| 10C | A third embodiment of a cartridge |
| 10D | A fourth embodiment of a cartridge |
| 10E | A fifth embodiment of a cartridge |
| 10F | A sixth embodiment of a cartridge |
| 10G | A seventh embodiment of a cartridge |
| 10H | An eight embodiment of a cartridge |
| 10J | A ninth embodiment of a cartridge |
| 10K | A tenth embodiment of a cartridge |
| 12a | Source of electromagnetic radiation (EMR) in system 30a |
| 12b | Source of EMR in system 30b |
| 12c | Source of EMR in system 30c |
| 12d' & 12d" | Sources (e.g. a circular array of LEDs, which may comprise white LEDs and small band pass LEDs) of EMR in system 30d |
| 12e' & 12e" | Sources (e.g. a circular array of LEDs, which may comprise white LEDs and small band pass LEDs) of EMR in system 30e |
| 12f | Source of EMR in system 30f |
| 12g' & 12g" | Source of EMR in system 30g |
| 13 | An optical chamber of cartridge 10A, 10B, 10C, 10D, 10E, 10F, 10G and 10H |
| 14a | A receptor in analyzer 20a for receiving a cartridge 10 |
| 14b | A receptor in analyzer 20b for receiving a cartridge 10 |
| 14c | A receptor in analyzer 20c for receiving a cartridge 10 |
| 14d | A receptor in analyzer 20d for receiving a cartridge 10 |
| 14e | A receptor in analyzer 20e for receiving a cartridge 10 |
| 14f | A receptor in analyzer 20f for receiving a cartridge 10 |
| 14g | A receptor in analyzer 20g for receiving a cartridge 10 |
| 15a | An opening or aperture in receptor 14a for illuminating optical chamber 13 with EMR |
| 16a | A beam splitter (e.g. a partially reflecting prism) of system 30a |
| 16c | A beam splitter (e.g. a bifurcated optical fiber comprising one or more strands of optical fiber) of system 30c |
| 16f | A beam splitter (e.g. a plate comprising a partially silvered coating, or a plate comprising a dielectric coating) of system 30f |
| 17b | A pivotal mirror of system 30b for directing EMR transmitted through the blood sample, to either detector 22b or detector 32b, depending on the position of the mirror |
| 18b | A magnifying system of system 30b |
| 18c | A magnifying system of system 30c |
| 18d | A magnifying system of system 30d |
| 18e | A magnifying system of system 30e |
| 18g | A magnifying system of system 30g |
| 19b | A pivot for pivotal mirror 17b |
| 20a | A first embodiment of an analyzer of system 30a |
| 20b | A second embodiment of an analyzer of system 30b |
| 20c | A third embodiment of an analyzer of system 30c |
| 20d | A fourth embodiment of an analyzer of system 30d |
| 20e | A fifth embodiment of an analyzer of system 30e |
| 20f | A sixth embodiment of an analyzer of system 30f |
| 20g | A seventh embodiment of an analyzer of system 30g |
| 22a | A two-dimensional multi-channel detector of system 30a |
| 22b | A two-dimensional multi-channel detector of system 30b |
| 22c | A two-dimensional multi-channel detector of system 30c |
| 22d | A two-dimensional multi-channel detector of system 30d |
| 22e | A two-dimensional multi-channel detector of system 30e |
| 22f | A two-dimensional multi-channel detector of system 30f |
| 22g | A two-dimensional multi-channel detector of system 30g |
| 24a | An analog to digital converter of system 30a |
| 24b | An analog to digital converter of system 30b |
| 24c | An analog to digital converter of system 30c |
| 24d | An analog to digital converter of system 30d |
| 24e | An analog to digital converter of system 30e |
| 24f | An analog to digital converter of system 30f |
| 24g | An analog to digital converter of system 30g |
| 26a | A processor of system 30a |
| 26b | A processor of system 30b |
| 26c | A processor of system 30c |
| 26d | A processor of system 30d |
| 26e | A processor of system 30e |
| 26f | A processor of system 30f |
| 26g | A processor of system 30g |

TABLE 2-continued

Description of Structural Features.

| Reference Numerals | Description of Structural Features |
|---|---|
| 28a | An EMR dispersing element (e.g., a dispersion prism) of system 30a for providing dispersed EMR or wavelength-dependent EMR |
| 28b | An EMR dispersing element (e.g., a transmission grating) of system 30b for providing dispersed EMR or wavelength-dependent EMR |
| 28c | An EMR dispersing element (e.g., a reflecting or reflection grating) of system 30c for providing dispersed EMR or wavelength-dependent EMR |
| 28d | An EMR dispersing element (e.g., a reflecting or reflection grating) of system 30d for providing dispersed EMR or wavelength-dependent EMR |
| 28e | An EMR dispersing element (e.g., a transmission grating) of system 30e for providing dispersed EMR or wavelength-dependent EMR |
| 28f | An EMR dispersing element (e.g., a prism) of system 30f for providing dispersed EMR or wavelength-dependent EMR |
| 28g | An EMR dispersing element (e.g., a transmission grating) of system 30g for providing dispersed EMR or wavelength-dependent EMR |
| 30a | A first embodiment of a system comprising an analyzer 20a and a cartridge 10 |
| 30b | A second embodiment of a system comprising an analyzer 20b and a cartridge 10 |
| 30c | A third embodiment of a system comprising an analyzer 20c and a cartridge 10 |
| 30d | A fourth embodiment of a system comprising an analyzer 20d and a cartridge 10 |
| 30e | A fifth embodiment of a system comprising an analyzer 20e and a cartridge 10 |
| 30f | A sixth embodiment of a system comprising an analyzer 20f and a cartridge 10 |
| 30g | A sixth embodiment of a system comprising an analyzer 20g and a cartridge 10 |
| 32a | A one-dimensional multi-channel detector of system 30a |
| 32b | A one-dimensional multi-channel detector of system 30b |
| 32c | A one-dimensional multi-channel detector of system 30c |
| 32d | A one-dimensional multi-channel detector of system 30d |
| 32e | A one-dimensional multi-channel detector of system 30e |
| 32f | A one-dimensional multi-channel detector of system 30f |
| 32g | A one-dimensional multi-channel detector of system 30g |
| 34b | An analog to digital converter of system 30b |
| 34c | An analog to digital converter of system 30c |
| 34d | An analog to digital converter of system 30e |
| 34e | An analog to digital converter of system 30d |
| 34f | An analog to digital converter of system 30f |
| 36b | A processor of system 30b |
| 36c | A processor of system 30c |
| 36d | A processor of system 30d |
| 36e | A processor of system 30e |
| 36f | A processor of system 30f |
| 37a | An example of a display of digital information output of a two-dimensional multi-channel detector of system 30a. In this example, the outline of cells is shown. The cells can be counted using commercially available or public access software. |
| 37b | An example of a display of digital information output of a two-dimensional multi-channel detector of system 30b. In this example, the outline of cells is shown. The cells can be counted using commercially available or public access software. |
| 37c | An example of a display of digital information output of a two-dimensional multi-channel detector of system 30c. In this example, the outline of cells is shown. The cells can be counted using commercially available or public access software. |
| 37d | An example of a display of digital information output of a two-dimensional multi-channel detector of system 30d. In this example, the outline of cells is shown. The cells can be counted using commercially available or public access software. |
| 37e | An example of a display of digital information output of a two-dimensional multi-channel detector of system 30e. In this example, the outline of cells is shown. The cells can be counted using commercially available or public access software. |
| 37f | An example of a display of digital information output of a two-dimensional multi-channel detector of system 30f. In this example, the outline of cells is shown. The cells can be counted using commercially available or public access software. |
| 37g | An example of a display of digital information output of a two-dimensional multi-channel detector of system 30g. In this example, the outline of cells is shown. The cells can be counted using commercially available or public access software. |
| 39a | An example of a display of digital information output of a one-dimensional multi-channel detector of system 30a. In this |

TABLE 2-continued

Description of Structural Features.

| Reference Numerals | Description of Structural Features |
|---|---|
| | example, the absorbance spectrum of blood is shown. The digital information is used to develop calibration algorithms for one or more blood analytes (e.g. bilirubin and various hemoglobin species), and subsequently, the calibration algorithms can be used to predict the one or more analyte quantities in other blood samples. |
| 39b | An example of a display of digital information output of a one-dimensional multi-channel detector of system 30b. In this example, the absorbance spectrum of blood is shown. The digital information is used to develop calibration algorithms for one or more blood analytes (e.g. bilirubin and various hemoglobin species), and subsequently, the calibration algorithms can be used to predict the one or more analyte quantities in other blood samples. |
| 39c | An example of a display of digital information output of a one-dimensional multi-channel detector of system 30c. In this example, the absorbance spectrum of blood is shown. The digital information is used to develop calibration algorithms for one or more blood analytes (e.g. bilirubin and various hemoglobin species), and subsequently, the calibration algorithms can be used to predict the one or more analyte quantities in other blood samples. |
| 39d | An example of a display of digital information output of a one-dimensional multi-channel detector of system 30d. In this example, the absorbance spectrum of blood is shown. The digital information is used to develop calibration algorithms for one or more blood analytes (e.g. bilirubin and various hemoglobin species), and subsequently, the calibration algorithms can be used to predict the one or more analyte quantities in other blood samples. |
| 39e | An example of a display of digital information output of a one-dimensional multi-channel detector of system 30e. In this example, the absorbance spectrum of blood is shown. The digital information is used to develop calibration algorithms for one or more blood analytes (e.g. bilirubin and various hemoglobin species), and subsequently, the calibration algorithms can be used to predict the one or more analyte quantities in other blood samples. |
| 39f | An example of a display of digital information output of a one-dimensional multi-channel detector of system 30f. In this example, the absorbance spectrum of blood is shown. The digital information is used to develop calibration algorithms for one or more blood analytes (e.g. bilirubin and various hemoglobin species), and subsequently, the calibration algorithms can be used to predict the one or more analyte quantities in other blood samples. |
| 39g | An example of a display of digital information output of a one-dimensional multi-channel detector of system 30g. In this example, the absorbance spectrum of blood is shown. The digital information is used to develop calibration algorithms for one or more blood analytes (e.g. bilirubin and various hemoglobin species), and subsequently, the calibration algorithms can be used to predict the one or more analyte quantities in other blood samples. |
| 46a | A collimation system for producing substantially parallel rays of EMR |
| 48f | A focusing system for projecting a real image of the blood sample on to the two-dimensional multi-channel detector |
| 50A | A first housing member of cartridge 10A |
| 50B | A first housing member of cartridge 10B |
| 50C | A first housing member of cartridge 10C |
| 50D | A first housing member of cartridge 10D |
| 50E | A first housing member of cartridge 10E |
| 50F | A first housing member of cartridge 10F |
| 50G | A first housing member of cartridge 10G |
| 50H | A first housing member of cartridge 10H |
| 50J | A first housing member of cartridge 10J |
| 50K | A first housing member of cartridge 10K |
| 51 | A sample storage well of cartridges 10A, 10B, 10C, 10D, 10E, 10F, 10G, 10H, 10J and 10K |
| 53 | A top opening (or top portion) of a sample storage well 51 |
| 55 | A bottom opening (or bottom portion) of a sample storage well 51 |
| 56F | Extension of the bottom opening 55 of sample storage well 51 of cartridge 10F, disposed between bottom opening 55 and valve stem 321F |

TABLE 2-continued

Description of Structural Features.

| Reference Numerals | Description of Structural Features |
|---|---|
| 56G | Extension of the bottom opening 55 of sample storage well 51, of cartridge 10G, disposed between bottom opening 55 and hydrophobic insert 225G |
| 56J | Extension of the bottom opening 55 of sample storage well 51 of cartridge 10J |
| 56K | Extension of the bottom opening 55 of sample storage well 51 of cartridge 10K |
| 57A | A sample inlet portion of cartridge 10A, which comprises some elements of the cartridge that interacts with the cap 70A |
| 57B | A sample inlet portion of cartridge 10B, which comprises some elements of the cartridge that interacts with the cap 70B |
| 57C | A sample inlet portion of cartridge 10C, which comprises some elements of the cartridge that interacts with the cap 70C |
| 57D | A sample inlet portion of cartridge 10D, which comprises some elements of the cartridge that interacts with the cap 70D |
| 57E | A sample inlet portion of cartridge 10E, which comprises some elements of the cartridge that interacts with the cap 70E |
| 57F | A sample inlet portion of cartridge 10F, which comprises some elements of the cartridge that interacts with the cap 70F |
| 57G | A sample inlet portion of cartridge 10G, which comprises some elements of the cartridge that interacts with the cap 70G |
| 57H | A sample inlet portion of cartridge 10H, which comprises some elements of the cartridge that interacts with the cap 70H |
| 57J | A sample inlet portion of cartridge 10J, which comprises some elements of the cartridge that interacts with the cap 70J |
| 57K | A sample inlet portion of cartridge 10K, which comprises some elements of the cartridge that interacts with the cap 70K |
| 59A | A flat surface of inlet portion 57A |
| 59B | A flat surface of inlet portion 57B |
| 59C | A flat surface of inlet portion 57C |
| 59D | A flat surface of inlet portion 57D |
| 59E | A flat surface of inlet portion 57E |
| 59F | A flat surface of inlet portion 57F |
| 59G | A flat surface of inlet portion 57G |
| 59H | A flat surface of inlet portion 57H |
| 59J | A flat surface of inlet portion 57J |
| 59K | A flat surface of inlet portion 57K |
| 60A | A second housing member of cartridge 10A |
| 60B | A second housing member of cartridge 10B |
| 60C | A second housing member of cartridge 10C |
| 60D | A second housing member of cartridge 10D |
| 60E | A second housing member of cartridge 10E |
| 60F | A second housing member of cartridge 10F |
| 60G | A second housing member of cartridge 10G |
| 60H | A second housing member of cartridge 10H |
| 60J | A second housing member of cartridge 10J |
| 60K | A second housing member of cartridge 10K |
| 63A | An air bladder communication port of a sample inlet portion 57A of cartridge 10A |
| 63B | An air bladder communication port of a sample inlet portion 57B of cartridge 10A |
| 63D | An analyzer pump communication port of a sample inlet portion 57D of cartridge 10D |
| 63G | An air bladder communication port of a sample inlet portion 57G of cartridge 10G |
| 63H | An air bladder communication port of a sample inlet portion 57H of cartridge 10H |
| 63K | An analyzer pump communication port of a sample inlet portion 57K of cartridge 10K |
| 65A | An air bladder duct for providing fluid connection between an air bladder 67A and an air bladder communication port 63A |
| 65B | An air bladder duct for providing fluid connection between an air bladder 67B and an air bladder communication port 63B |
| 65D | An analyzer pump duct for providing fluid connection between an analyzer pump and an analyzer pump communication port 63D |
| 65G | An air bladder duct for providing fluid connection between an air bladder 67G and an air bladder communication port 63G |
| 65H | An air bladder duct for providing fluid connection between an air bladder 67H and an air bladder communication port 63H |
| 65K | An analyzer pump duct for providing fluid connection between an analyzer pump and an analyzer pump communication port 63K |
| 67A | An air bladder of cartridge 10A |
| 67B | An air bladder of cartridge 10B |
| 67E | An air bladder of cartridge 10E |
| 67F | An air bladder of cartridge 10F |

TABLE 2-continued

Description of Structural Features.

| Reference Numerals | Description of Structural Features |
|---|---|
| 67G | An air bladder of cartridge 10G |
| 67H | An air bladder of cartridge 10H |
| 70A | A cap for closing inlet portion 57A of cartridge 10A |
| 70B | A cap for closing inlet portion 57B of cartridge 10B |
| 70C | A cap for closing inlet portion 57B of cartridge 10C |
| 70D | A cap for closing inlet portion 57D of cartridge 10D |
| 70E | A cap for closing inlet portion 57E of cartridge 10E |
| 70F | A cap for closing inlet portion 57F of cartridge 10F |
| 70G | A cap for closing inlet portion 57G of cartridge 10G |
| 70H | A cap for closing inlet portion 57H of cartridge 10H |
| 70J | A cap for closing inlet portion 57J of cartridge 10J |
| 70K | A cap for closing inlet portion 57K of cartridge 10K (cap 70K is same as cap 70G/70H illustrated in FIGS. 17D & 17E) |
| 71A | A flexible member of air bladder 67A |
| 71B | A flexible member of air bladder 67B |
| 71E | A flexible member of air bladder 67E |
| 71F | A flexible member of air bladder 67F |
| 71G | A flexible member of air bladder 67G |
| 71H | A flexible member of air bladder 67H |
| 73A | A top side of cap 70A |
| 73B | A top side of cap 70B |
| 73E | A top side of cap 70E |
| 73F | A top side of cap 70F |
| 73H | A top side of cap 70H |
| 73J | A top side of cap 70J |
| 75A | An underside of cap 70A, having a cap flat surface 76A and a cap recess 77A |
| 75B | An underside of cap 70B, having a cap flat surface 76B and a cap recess 77B |
| 75D | An underside of cap 70D, having a cap flat surface 76D and a cap recess 77D |
| 75E | An underside of cap 70E, having a cap flat surface 76E and a cap inlet 78E |
| 75F | An underside of cap 70F, having a cap flat surface 76E and a cap inlet 78F |
| 75H | An underside of cap 70H, having a cap flat surface 76H and a cap recess 77H |
| 75J | An underside of cap 70J, having a cap flat surface 76J and a cap recess 77J |
| 76A | A cap flat surface disposed at the underside 75A of cap 70A |
| 76B | A cap flat surface disposed at the underside 75B of cap 70B |
| 76C | A cap flat surface disposed at the underside of cap 70C |
| 76D | A cap flat surface disposed at the underside 75D of cap 70D |
| 76E | A cap flat surface disposed at the underside 75E of cap 70E |
| 76F | A cap flat surface disposed at the underside 75F of cap 70F |
| 76H | A cap flat surface disposed at the underside 75H of cap 70H |
| 76J | A cap flat surface disposed at the underside 75J of cap 70J |
| 77A | A cap recess in the underside 75A of cap 70A |
| 77B | A cap recess in the underside 75B of cap 70B |
| 77D | A cap recess in the underside 75D of cap 70D |
| 77G | A cap recess in the underside of cap 70G |
| 77H | A cap recess in the underside 75H of cap 70H |
| 77J | A cap recess in the underside 75J of cap 70J |
| 77K | A cap recess in the underside of cap 70K (cap 70K is same as cap 70G/70H illustrated in FIGS. 17D & 17E) |
| 78E | A cap inlet to cap mixing chamber 79E |
| 78F | A cap inlet to cap mixing chamber 79F |
| 79E | A cap mixing chamber or cavity of cap 70E for mixing unaltered blood and a liquid to make altered blood. The liquid may a diluent for diluting the blood or may comprise one or more reagents. When the liquid is a diluent, the altered blood is diluted blood. The liquid may be stored in a sealed blister in the cartridge or may be stored in an associated analyzer. |
| 79F | A cap mixing chamber or cavity of cap 70F for mixing unaltered blood and a liquid to make altered blood. The liquid may a diluent for diluting the blood or may comprise one or more reagents. When the liquid is a diluent, the altered blood is diluted blood. The liquid may be stored in a sealed blister in the cartridge or may be stored in an associated analyzer. |
| 81 | A first optical window of optical chamber 13 |
| 82G | A blood shunt for bypassing optical chamber 13 of cartridge 10G |
| 83 | A second optical window of optical chamber 13 |
| 85A | A cartridge vent of cartridge 10A |
| 85B | A cartridge vent of cartridge 10B |
| 85D | A cartridge vent of cartridge 10D |

TABLE 2-continued

Description of Structural Features.

| Reference Numerals | Description of Structural Features |
|---|---|
| 85E | A cap vent on cartridge cap 70E of cartridge 10E |
| 85F | A cap vent on cartridge cap 70F of cartridge 10F |
| 85G | A cartridge vent of cartridge 10G |
| 85H | A cartridge vent of cartridge 10H |
| 85J | A cap vent on cartridge cap 70J of cartridge 10J |
| 85K | A cartridge vent of cartridge 10K |
| 87A' & 87A" | Hinges for hingedly attaching cap 70A to body of cartridge 10A |
| 88B' | A hole in the first housing member 50B of cartridge 10B for receiving pivot 89B |
| 88E' | A hole in the first housing member 50E of cartridge 10E for receiving pivot 89E |
| 88B" | A hole in the second housing member 60B of cartridge 10B for receiving pivot 89B |
| 88E" | A hole in the second housing member 60E of cartridge 10E for receiving pivot 89E |
| 89B | A pivot for hingedly attaching cap 70B to body of cartridge 10B |
| 89E | A pivot for hingedly attaching cap 70E to body of cartridge 10E |
| 91A | A cap latch of cap 70A |
| 91B | A cap latch of cartridge 10B |
| 91E | A cap latch of cartridge 10E |
| 92B | A recess in cap latch 91B for engaging cap 70B |
| 92E | A recess in cap latch 91E for engaging cap 70E |
| 93A' & 93A" | Holes for anchoring hinges 87A' & 87A" |
| 94B | Groove disposed at the underside 75B and at the sweeping portion of cap 70B for storing excess sample |
| 94E | Groove disposed at the inlet portion 57E of cartridge 10E for storing excess sample |
| 95A | A cap latch catch for engaging cap latch 91A |
| 97A | An optical chamber inlet conduit, or pre-optical chamber conduit, of cartridge 10A |
| 97B | An optical chamber inlet conduit, or pre-optical chamber conduit, of cartridge 10B |
| 97C | An optical chamber inlet conduit, or pre-optical chamber conduit, of cartridge 10C |
| 97D | An optical chamber inlet conduit, or pre-optical chamber conduit, of cartridge 10D |
| 97E | An optical chamber inlet conduit, or pre-optical chamber conduit, of cartridge 10E |
| 97F | An optical chamber inlet conduit, or pre-optical chamber conduit, of cartridge 10F |
| 97G | An optical chamber inlet conduit, or pre-optical chamber conduit, of cartridge 10G |
| 97H | An optical chamber inlet conduit, or pre-optical chamber conduit, of cartridge 10H |
| 97J | A detection chamber inlet conduit of cartridge 10J; in cartridge 10J the detection chamber comprises an electrochemical/biosensor chamber/conduit |
| 97K | A detection chamber inlet conduit of cartridge 10K; in cartridge 10K the detection chamber comprises an electrochemical/biosensor chamber/conduit |
| 98J | A detection chamber or conduit of cartridge 10J; in cartridge 10J the detection chamber comprises an electrochemical/biosensor chamber/conduit |
| 98K | A detection chamber or conduit of cartridge 10K; in cartridge 10K the detection chamber comprises an electrochemical/biosensor chamber/conduit |
| 99A | An optical chamber exit conduit, or post-optical chamber conduit, of cartridge 10A |
| 99B | An optical chamber exit conduit, or post-optical chamber conduit, of cartridge 10B |
| 99C | An optical chamber exit conduit, or post-optical chamber conduit, of cartridge 10C |
| 99D | An optical chamber exit conduit, or post-optical chamber conduit, of cartridge 10D |
| 99E | An optical chamber exit conduit, or post-optical chamber conduit, of cartridge 10E, which provides fluid connection between the optical chamber 13 and the air bladder 67E |
| 99F | An optical chamber exit conduit, or post-optical chamber conduit, of cartridge 10F |
| 99G | An optical chamber exit conduit, or post-optical chamber conduit, of cartridge 10G |
| 99H | An optical chamber exit conduit, or post-optical chamber conduit, of cartridge 10H |

TABLE 2-continued

Description of Structural Features.

| Reference Numerals | Description of Structural Features |
|---|---|
| 99J | A detection chamber exit conduit of cartridge 10J; in cartridge 10J the detection chamber comprises an electrochemical/biosensor chamber/conduit |
| 99K | A detection chamber exit conduit of cartridge 10K; in cartridge 10K the detection chamber comprises an electrochemical/biosensor chamber/conduit |
| 100A | A double-sided sticky gasket of cartridge 10A |
| 100B | A double-sided sticky gasket of cartridge 10B |
| 100C | A double-sided sticky gasket of cartridge 10C |
| 100D | A double-sided sticky gasket of cartridge 10D |
| 100E | A double-sided sticky gasket of cartridge 10E |
| 100F | A double-sided sticky gasket of cartridge 10F |
| 100G | A double-sided sticky gasket of cartridge 10G |
| 100H | A double-sided sticky gasket of cartridge 10H |
| 100J | A double-sided sticky gasket of cartridge 10J |
| 100K | A double-sided sticky gasket of cartridge 10K |
| 101J | An orifice in double-sided sticky gasket 100J for establishing fluid communication between primary mixing chamber 393J and secondary mixing chamber 397J |
| 103K | A hole in double-sided sticky gasket 100K (see FIGS. 20A, 20G & 21F) aligned with the bottom opening 55 of the sample storage well 51 of cartridge 10K |
| 105K | An orifice in double-sided sticky gasket 100K (see FIGS. 20A, 20G & 21F) that functions as a capillary break (also referred to as a capillary stop) |
| 107K | A hole in double-sided sticky gasket 100K (see FIGS. 20A & 20C) aligned with cartridge vent 85K of cartridge 10K |
| 200 | A conductivity sensor comprising a pair of conductivity electrodes (also referred to as probes), for performing several functions, e.g., controlling air bladder stepper motor; and measuring hematocrit. |
| 201' & 201" | Ends of sensor 200 having applied voltage via a relay, exposed in optical chamber exit conduit 99B. The ends function as an open switch when the conduit is not occupied by blood, and function as a closed switch when blood bridges the gap between the ends. When the switch is closed, a current travels to the relay in the analyzer, and the relay could control a stepper motor, for example. |
| 203' & 203" | Ends (pins) of sensor 200 projecting out of cartridge 10B. When the cartridge is properly inserted in the analyzer receptor, the sensor could develop electrical communication with relay, for example. The relay is used to apply a voltage across sensor ends 201' and 201", and activate/deactivate air bladder stepper motor, for example, and could also be used to measure hematocrit. |
| 211C | A sealing member installed in cartridge exit duct 217C in cartridge 10C, for frictionally engaging the outer surface of an analyzer pump hollow needle; an example of an analyzer pump probe. |
| 211D | A sealing member installed in cartridge air inlet duct 217D in cartridge 10D, for frictionally engaging the outer surface of an analyzer pump hollow needle; an example of an analyzer pump probe. |
| 211J | A sealing member installed in cartridge exit duct 217J in cartridge 10J, for frictionally engaging an analyzer pump probe |
| 211K | A sealing member installed in cartridge air inlet duct 217K in cartridge 10K, for frictionally engaging an analyzer pump probe |
| 217C | A cartridge exit duct for housing sealing member 211C |
| 217D | A cartridge air inlet duct for housing sealing member 211D |
| 217J | A cartridge exit duct for housing sealing member 211J |
| 217K | A cartridge air inlet duct for housing sealing member 211K |
| 219C | A cartridge exit, a portion of cartridge exit duct 217C of cartridge 10C, for establishing operative communication with an analyzer pump |
| 219D | A cartridge air inlet, a portion of cartridge air inlet duct 217D of cartridge 10D, for establishing operative communication with an analyzer pump |
| 221C | A sample storage well boss of cartridge 10C for increasing the sample storage well storage capacity. |
| 223C | A cap breathable plug of cartridge 10C, an example of a cap vent; may also be referred to as a cap vent |
| 225C | A hydrophobic insert disposed close to the junction of the bottom opening 55 of the sample storage well 51 and the optical chamber inlet conduit 97C of cartridge 10C, for providing means for minimizing, mitigating, or modifying blood flow out of the sample storage well 51 |

TABLE 2-continued

Description of Structural Features.

| Reference Numerals | Description of Structural Features |
|---|---|
| 225G | A hydrophobic insert disposed close to the junction of the bottom opening 55 of the sample storage well 51 and the optical chamber inlet conduit 97G of cartridge 10G, for providing means for minimizing, mitigating, or modifying blood flow out of the sample storage well 51 |
| 225J | A hydrophobic insert disposed close to the bottom opening 55 of the sample storage well 51 of cartridge 10J, for providing means for minimizing, mitigating, or modifying blood flow out of the sample storage well 51 |
| 227C | Recess in first housing member 50C of cartridge 10C for installing hydrophobic insert 225C |
| 229C | Recess in second housing member 60C of cartridge 10C for installing hydrophobic insert 225C |
| 229G | Recess in second housing member 60G of cartridge 10C for installing hydrophobic insert 225G |
| 229J | Recess in second housing member 60J of cartridge 10J for installing hydrophobic insert 225J |
| 231F | A hole in the first housing member 50F for partial protrusion of valve stem 321F |
| 233F | A hole in the second housing member 60F for accessing valve stem 321F |
| 235F | Spring, as an example of a means for keeping valve stem 321F in an up position |
| 241G | An enlarged cavity between optical chamber 13 and biosensor chamber inlet 377G |
| 301E | A sealed blister for storing a liquid, for example a diluent for diluting blood or a liquid reagent |
| 301F | A sealed blister for storing a liquid, for example a diluent for diluting blood or a liquid reagent |
| 301G | A sealed blister for storing a calibration liquid |
| 303E | A diluent holding conduit for temporarily holding the diluent released from the blister 301E |
| 303F | A diluent holding conduit for temporarily holding the diluent released from the blister 301F |
| 305E | A blister window in the first housing member 50E for accessing the sealed blister 301E |
| 305F | A blister window in the first housing member 50F for accessing the sealed blister 301F |
| 313E | A first directional valve element of cartridge 10E, which for example, could be an elastomeric flap |
| 313F | A first directional valve element of cartridge 10F, which for example, could be an elastomeric flap |
| 313G | A first directional valve element of cartridge 10G, which for example, could be an elastomeric flap |
| 315E | A smaller section of the first directional valve element 313E that is flappable for closing of junction where the diluent holding conduit 303E intersects with the blister outlet conduit 317E |
| 316E | A larger section of the first directional valve element 313E that is used to anchor element 313E in receptor 349E (see FIG. 14A) |
| 317E | A blister outlet conduit for transferring blister fluid from blister 301E after it is ruptured, to the diluent holding conduit 303E |
| 317F | A blister outlet conduit for transferring blister fluid from blister 301F after it is ruptured, to the diluent holding conduit 303F |
| 317G | A blister outlet conduit for transferring blister fluid from blister 301G after it is ruptured, to the biosensor conduit 379G |
| 319E | A transfer conduit for transferring blister fluid from the diluent holding conduit 303E to the second directional valve 321E |
| 321E | A second directional valve stem for: 1) fluidly connecting bottom opening 55 of sample storage well 51 and a blood vent 323E; 2) fluidly connecting diluent holding conduit 303E and diluent vent 325E; and 3) fluidly connecting the diluent holding conduit 303E and the bottom opening 55 of sample storage well 51 |
| 321F | A second directional valve stem for: 1) fluidly connecting bottom opening 55 of sample storage well 51 and a blood vent 323E; and 2) fluidly connecting diluent holding conduit 303E and diluent vent 325E, when the stem is in an up position; and 3) fluidly connecting the diluent holding conduit 303E and the bottom opening 55 of sample storage well 51 via conduit 361F when the stem is in a down position. |
| 323E | A blood vent for facilitating filling of the sample storage well 51 |
| 323F | A blood vent for facilitating filling of the sample storage well 51 |
| 325E | A diluent vent for facilitating filling of the diluent holding conduit 303E |
| 325F | A diluent vent for facilitating filling of the diluent holding conduit 303F |

TABLE 2-continued

Description of Structural Features.

| Reference Numerals | Description of Structural Features |
|---|---|
| 327E | A hole in the second directional valve 321E for providing direct fluid connection between the transfer conduit 319E and the diluent vent 325E |
| 329E | A spike for rupturing the sealed blister 301E |
| 329F | A spike for rupturing the sealed blister 301F |
| 329G | A spike for rupturing the sealed blister 301G |
| 331E | A hole in spike 329E for draining diluent from the ruptured blister 301E |
| 331F | A hole in spike 329F for draining diluent from the ruptured blister 301F |
| 331G | A hole in spike 329G for draining diluent from the ruptured blister 301G |
| 333E | A top flange of the second directional valve stem 321E Note: A space exists between the outer portion of the top flange 333E and the first housing member 50E, unlike bottom flange 335E which comprises an O-ring 337E |
| 335E | A bottom flange of the second directional valve stem 321E |
| 337E | An O-ring around the bottom flange 325E of the second directional valve stem 321E for sealing the bottom flange against the cavity in the second housing member 60E |
| 339E | A neck for joining the top flange 333E and the bottom flange 335E |
| 341E | A locating element in the top flange 333E for aligning the hole 327E with a portion of the transfer conduit 319E |
| 343E | A sealing surface of the bottom flange 335E |
| 345E | A sealing surface of the top flange 333E |
| 347E | A bottom laminate for covering the blister outlet conduit 317E and the transfer conduit 319E |
| 347F | A bottom laminate for covering the blister outlet conduit 317F |
| 347G | A bottom laminate for covering the blister outlet conduit 317G |
| 349E | A cavity (or receptor) for housing the first directional valve element 313E |
| 349F | A cavity (or receptor) for housing the first directional valve element 313F |
| 349G | A cavity (or receptor) for housing the first directional valve element 313G |
| 351E | Compressible member for supporting blister 301E over spike 329E |
| 351F | Compressible member for supporting blister 301F over spike 329F |
| 351G | Compressible member for supporting blister 301G over spike 329G |
| 353F | Surface on valve stem 321F for frictionally engaging surface 355F of cartridge 10F |
| 355F | Surface on cartridge 10F for frictionally engaging surface 353F of valve stem 321F |
| 357F | Projection on valve stem 321F for preventing rotation of valve stem 321F and facilitating alignment of valve stem conduit 361F with bottom opening 55 of sample storage well 51 and diluent holding conduit 303F; this alignment allows diluent to flow from diluent holding conduit 303F into blood held in sample storage well 51. |
| 358F | Boss in valve stem 321F, exposed at top of first housing member 50F of cartridge 10F |
| 359F | Recess in valve stem 321F for housing portion of spring 235F |
| 361F | A conduit in valve stem 321F for fluidly connecting the diluent holding conduit 303F and the bottom opening 55 of sample storage well 51 |
| 363F | A common vent for use by blood vent 323F and diluent vent 325F |
| 365F | Groove in cap 70F for storing excess sample |
| 365H | Groove in cap 70H for storing excess sample |
| 365J | Groove in cap 70J for storing excess sample; a groove disposed at the inlet portion 57J (like 94E illustrated in FIG. 14A) is an alternative for storing excess sample |
| 365K | Groove in cap 70K (see FIG. 21D) for storing excess sample; a groove disposed at the inlet portion 57K (like 94E illustrated in FIG. 14A) is an alternative for storing excess sample |
| 367F | One of one or more female cartridge tracks for guiding linear motion of cap 70F. In this non-limiting example, two female tracks are shown. In some embodiments, the one or more tracks may be configured as male cartridge tracks. Some embodiments may comprise one male and one female track, and if desired, the cap motion may be non-linear (i.e. curved). |
| 367G | One of one or more female cartridge tracks for guiding linear motion of cap 70G. In this non-limiting example, two female tracks are shown. In some embodiments, the one or more tracks may be configured as male cartridge tracks. Some embodiments may comprise one male and one female track, and if desired, the cap motion may be non-linear (i.e. curved). |

TABLE 2-continued

Description of Structural Features.

| Reference Numerals | Description of Structural Features |
|---|---|
| 367H | One of one or more female cartridge tracks for guiding linear motion of cap 70H. In this non-limiting example, two female tracks are shown. In some embodiments, the one or more tracks may be configured as male cartridge tracks. Some embodiments may comprise one male and one female track, and if desired, the cap motion may be non-linear (i.e. curved). |
| 367J | One of one or more female cartridge tracks for guiding linear motion of cap 70J. In this non-limiting example, two female tracks are shown. In some embodiments, the one or more tracks may be configured as male cartridge tracks. Some embodiments may comprise one male and one female track, and if desired, the cap motion may be non-linear (i.e. curved). |
| 367K | One of one or more female cartridge tracks for guiding linear motion of cap 70K. In this non-limiting example, two female tracks are shown. In some embodiments, the one or more tracks may be configured as male cartridge tracks. Some embodiments may comprise one male and one female track, and if desired, the cap motion may be non-linear (i.e. curved). |
| 369F | One of one or more male cap tracks for frictionally engaging with one or more female cartridge tracks 367F. In this non-limiting example, two male cap tracks are shown for engaging the two female cartridge tracks 367F. In some embodiments comprising male cartridge tracks, the cap tracks may be configured as female cap tracks. Some embodiments may comprise one male and one female track, and if desired, the cap motion may be non-linear (i.e. curved). |
| 369G | One of one or more male cap tracks for frictionally engaging with one or more female cartridge tracks 367G. In this non-limiting example, two male cap tracks are shown for engaging the two female cartridge tracks 367G. In some embodiments comprising male cartridge tracks, the cap tracks may be configured as female cap tracks. Some embodiments may comprise one male and one female track, and if desired, the cap motion may be non-linear (i.e. curved). |
| 369H | One of one or more male cap tracks for frictionally engaging with one or more female cartridge tracks 367H. In this non-limiting example, two male cap tracks are shown for engaging the two female cartridge tracks 367H. In some embodiments comprising male cartridge tracks, the cap tracks may be configured as female cap tracks. Some embodiments may comprise one male and one female track, and if desired, the cap motion may be non-linear (i.e. curved). |
| 369J | One of one or more male cap tracks for frictionally engaging with one or more female cartridge tracks 367J. In this non-limiting example, two male cap tracks are shown for engaging the two female cartridge tracks 367J. In some embodiments comprising male cartridge tracks, the cap tracks may be configured as female cap tracks. Some embodiments may comprise one male and one female track, and if desired, the cap motion may be non-linear (i.e. curved) |
| 369K | One of one or more male cap tracks for frictionally engaging with one or more female cartridge tracks 367K. In this non-limiting example, two male cap tracks are shown for engaging the two female cartridge tracks 367J. In some embodiments comprising male cartridge tracks, the cap tracks may be configured as female cap tracks. Some embodiments may comprise one male and one female track, and if desired, the cap motion may be non-linear (i.e. curved). |
| 371F | A cap stop for aligning cap inlet (shown as 78F in FIG. 15S for cap 70F) and cartridge top opening 53 of sample storage well 51 in cartridge 10F |
| 371G | A cap stop for aligning cap recess (shown as 77G in FIG. 17E for cap 70F) and cartridge top opening 53 of sample storage well 51 in cartridge 10G |
| 371H | A cap stop for aligning cap recess (shown as 77H in FIG. 17E for cap 70F) and cartridge top opening 53 of sample storage well 51 in cartridge 10H |
| 371J | A cap stop for aligning cap recess (shown as 77J in FIG. 19E) and cartridge top opening 53 of sample storage well 51 in cartridge 10J |
| 371K | A cap stop for aligning cap recess 77K and cartridge top opening 53 of sample storage well 51 in cartridge 10K |
| 375G | An electrochemical sensor array of cartridge 10G having at least one of an amperometric sensor, a conductivity sensor and a potentiometric sensor |

TABLE 2-continued

Description of Structural Features.

| Reference Numerals | Description of Structural Features |
|---|---|
| 375J | An electrochemical sensor array of cartridge 10J having at least one of an amperometric sensor, a conductivity sensor and a potentiometric sensor. |
| 375K | An electrochemical sensor array of cartridge 10K having at least one of an amperometric sensor, a conductivity sensor and a potentiometric sensor. |
| 377G | An electrochemical sensor chamber inlet conduit of cartridge 10G |
| 379G | An electrochemical sensor chamber of cartridge 10G |
| 381G | An electrochemical sensor chamber exit conduit of cartridge 10G |
| 383G | A waste receptacle of cartridge 10G |
| 383K | A waste receptacle of cartridge 10K |
| 385F | A valve stem stop for keeping the valve stem 321F in the down position |
| 387F | A trough surrounding valve stem 385F for collecting any excess diluent or blood |
| 391J | A cavity in second housing member 60J for forming a primary mixing chamber 393J |
| 393J | A primary mixing chamber of cartridge 10J |
| 395J | A cavity in first housing member 50J for forming a secondary mixing chamber 397J |
| 397J | A secondary mixing chamber of cartridge 10J |

Overview of System 30a as a Non-Limiting Example

The first embodiment of a system 30a for measuring one or more analyte quantities per unit volume of blood (i.e., the concentration of the analyte) using spectroscopic technique, and one or more formed element quantities per unit volume of blood (i.e., a cell count) using an imaging technique, is illustrated in FIG. 2. System 30a comprises a source of EMR 12a, which may represent a polychromatic source of EMR or a plurality of monochromatic EMR. Depending on the source of EMR, a collimation system 46a may be used to produce substantially parallel rays of EMR for interrogating or illuminating the blood sample in an optical chamber 13 (see FIGS. 10H, 11G, 12F, 13D, 14H, 15K, 16N & 17A of cartridges 10A, 10B, 100, 10D, 10E, 10F, 10G & 10H respectively, or a similar cartridge described in the prior art). Cartridge 10A in a receptor 14a of an analyzer 20a is shown in FIGS. 8A-8C for illustration.

The EMR transmitted through the blood sample in the optical chamber 13 of a cartridge 10 is referred to as emerging EMR. The emerging EMR is split using a partially reflective prism 16a, into a first set (or first portion) of emerging EMR that is directed on to a one-dimensional multi-channel detector 32a, and a second set (or second portion) of emerging EMR that is directed on to a two-dimensional multi-channel detector 22a. Other embodiments described later will illustrate the use of other means for directing the path of emerging EMR. Prior to directing the first set of emerging EMR to detector 32a, the first set of emerging EMR is directed to a dispersing element 28a for dispersing the first set of emerging EMR into its component wavelengths, to produce dispersed EMR. The dispersing element 28a in this embodiment is a dispersing prism. However, other dispersing elements for example a grating (e.g. a diffraction, transmission or reflective grating), may be used, as shown in other embodiments. The dispersed EMR is then projected on to a wavelength-calibrated one-dimensional multi-channel detector for receiving the dispersed EMR and generating wavelength-specific electrical signals. The one-dimensional multi-channel detector may comprise photodiodes or charge-coupled devices. The wavelength-specific electrical signals generated in the one-dimensional multi-channel detector are digitized using an analog to digital converter 24a, to produce wavelength-specific digital information or data. Subsequently, the processor 26a applies analyte-specific calibration algorithms (installed in the processor) to the wavelength-specific digital information to produce one or more analyte quantities per unit volume of blood. An example of a display of digital information output of the one-dimensional multi-channel detector of system 30a is shown as 39a. In this example, an absorbance spectrum of the blood is shown. Prior to testing unknown blood samples, digital information and the analyte concentrations from a set of known samples are used to develop calibration algorithms for one or more blood analytes (e.g. bilirubin and various hemoglobin species). Subsequently, the calibration algorithms can be used to predict the one or more analyte quantities in other blood samples (unknown samples). An example of a spectroscopic method that may be used as described above is provided in U.S. Pat. No. 6,651,015 to Samsoondar (incorporated herein by reference). Additional information on spectroscopic measurement is also provided below under the title "Spectroscopic Measurement".

To produce a plurality of wavelengths, the source of EMR 12a may be a tungsten lamp (other lamps may be used), white light-emitting diodes (LEDs), one or more lasers, one or more LEDs, and any combination thereof, as is well known in the art. An optional collimation system 46a is shown between the source of EMR 12a and the receptor 14a for producing substantially parallel rays of EMR, but other embodiments may have a collimation system installed between the receptor 14a and the detector 22a.

Although cartridge 10A is provided as an example for system 30a illustrated in FIGS. 8A-8C, any suitable cartridge may be used. In addition to an optical chamber 13, the cartridges may contain, for example, conductivity sensors (see FIGS. 11A & 11G) and one or more biosensors (see FIGS. 16A & 16K), preferably downstream of the optical chamber. Biosensors, also referred to as electrochemical sensors, may be used to measure, for example, electrolytes and blood gases. An array of electrochemical sensors is shown as 375G in FIG. 16A. In the case of blood gases, the results are given as the partial pressure of oxygen or carbon dioxide, measured in mm mercury. A patient's hematocrit may be measured using optical measurement of the unclotted or clotted blood at one or more wavelengths, and the hematocrit measurement may be used to correct a PT-INR measurement for the patient's hematocrit. Hematocrit may also be measured using for example, a cartridge comprising a conductivity sensor 200 illustrated in FIGS. 11A, 11B, 11G and 11H. If the cartridge contains a hemolysing reagent in the post-optical chamber conduit (discussed below), the conductivity sensor must be disposed in the cartridge where unlysed blood can come in contact with the sensor. Cartridge 10A shown in FIG. 8A is further illustrated in FIGS. 10A-10J. Other cartridges included in this application, which may be used instead of cartridge 10A are as follows: cartridge 10B, illustrated in FIGS. 11A-11K, cartridge 110, illustrated in FIGS. 12A-12J; and cartridge 10D, illustrated in FIGS. 13A-13E; cartridge 10E, illustrated in FIGS. 14A-14Y; cartridge 10F, illustrated in FIGS. 15A-15X; cartridge 10G, illustrated in FIGS. 16A-16P; and cartridge 10H, illustrated in FIGS. 17A-17E. Other examples of cartridges, which may be used instead of cartridge 10A are described in U.S. Pat. No. 9,470,673, CA Pat. No. 2,978,737, and U.S. Pat. Appl'n Pub. No. US 2019/0224667 (each of which is hereby incorporated by reference). These publications describe threaded as well as hinged caps, and although examples of hinged caps are provided in this application, cartridges that use threaded caps are considered to be within the scope of the present invention.

Still referring to FIG. 2, the second portion of emerging EMR is directed on to the two-dimensional multi-channel detector 22a. In this embodiment, the EMR transmitted through a beam splitter 16a is directed to a two-dimensional multi-channel detector 22a and the reflected portion is directed on to the one-dimensional multi-channel detector 32a via a dispersing prism 28a. In other embodiments, the EMR transmitted through the beam splitter 16a may be directed to detector 32a via the dispersing prism 28a, and the reflected portion may be directed to detector 22a. Whereas polychromatic EMR is required for the spectroscopy, either monochromatic or polychromatic EMR may be used for cell image formation. Therefore, the source of EMR 12a may comprise a combination of monochromatic and polychromatic EMR. Moreover, the beam splitter 16a may be designed to selectively transmit EMR and reflect EMR in different wavelength ranges. 0213. Still referring to FIG. 2, the signals generated after the second portion of emerging EMR is directed on to the two-dimensional detector 22a is digitized using the analog to digital converter 24a, and the digital information may be displayed as shown in 37a, providing the outline of cells. Cells may also be observed as colored spots, dark spots against a lighter background, and lighter spots against a dark background depending on the type of stain used if any, and the wavelength of EMR used as would be know to one of skill in the art. For example, congo red has a strong absorbance band at 340 nm in the near-ultraviolet region and another at 500 nm near the blue-green transition region of the visible spectrum (about 450 nm to about 700 nm), and transmits red wavelengths above 560 nanometers and thus appears red to the eye; malachite green has a strong absorbance band centered at 600 nm near the yellow-red transition region, with a wide transmission band between 400 nm and 550 nm of the visible spectrum, and appears green to the eye; methylene blue has a strong absorbance band centered at 660 nanometers, in the red region of the visible spectrum, and transmits wavelengths below 600 nanometers, and appears blue to the eye.

Some embodiments may comprise separate analog to digital converters, for example, system 30b (see FIG. 3) comprises analog to digital converters 24b and 34b for detectors 22d and 32b respectively.

The cells can be counted, and their distribution characterized using commercially available or public access software which may be installed in the processor 26a. An example of public domain imaging software, from the U.S. National Institute of Health may be found at URL: rsb.info.nih.gov/nih-image/. Although one processor is shown (26a), the system 30a may comprise one or more processors and the one or more processors may be an integral part of the analyzer 20a or a separate module in electrical communication with the analyzer 20a.

The two-dimensional multi-channel detector 22a may be a CCD (charge-coupled device) camera or a CMOS (complementary metal oxide semiconductor) camera. The pixels in the CCD camera and the CMOS camera may, for example, may have a pixel pitch between one quarter and one half the size of the formed elements being observed, in order to resolve the formed elements. The magnitude of the sizes of formed elements of blood are provided in Table 1, above.

Spectroscopic Measurement

An embodiment of a system for performing spectroscopic measurement for testing of whole blood comprises an analyzer and a cartridge is included herein. A block diagram of an example of such an analyzer, which provides spectroscopic measurement and does not provide imaging, may be envisioned in FIG. 2 (see 20a), absent the beam splitter 16a and the two-dimensional multichannel detector 22a, whereby the electromagnetic radiation (EMR) emerging from the sample in 10/14a goes directly to the dispersion prism 28a. Other terms like spectrophotometric, photometric or optical measurement are sometimes used instead of spectroscopic measurement. With respect to the spectroscopic measurement alone, the analyzer may comprise a source of EMR (represented by 12a) and one or more photodetectors (represented by 32a) for measuring the EMR reflected from the sample in an optical chamber of the cartridge, or EMR transmitted through the sample in the optical chamber of the cartridge. The source of EMR, which impinges upon, illuminates or interrogates the contents of the optical chamber, may be a tungsten lamp (other lamps may be used), one or more lasers, and one or more light-emitting diodes (LEDs) across a range of wavelengths as is well known in the art, and without being limited in any way. The analyzer may also include a spectrometer, which may comprise multichannel detectors such as a photodiode array (PDA) or a charge-coupled device (CCD), for example, without being limited in any way. The spectrometer may also comprise a prism, a transmission grating or a reflecting (or reflection) grating for dispersing EMR reflected from a sample (i.e., reflectance, denoted by R) or EMR transmitted through a sample (i.e. transmittance, denoted by T), into component wavelengths.

Preferably the spectrometer comprises a multichannel photodetector arranged as a linear PDA detector installed in the spectrometer, for example, a linear repetitive installation of discrete photodiodes on an integrated circuit chip. For measuring transmittance, the source of EMR and the PDA detector should be on opposite sides of the optical chamber, and for measuring reflectance, both the source of EMR and the PDA detector should be on the same side of the optical chamber. For reflectance measurement, the distal optical window of the optical chamber may be used as a reflecting member. Alternatively, a reflecting member may be installed in the cartridge receptor of the analyzer, and in close proximity to the optical window distal to the source of EMR.

For illustration of a method for performing spectroscopic measurement of whole blood, and by way of example which is not to be considered limiting, the PDA detector may have a pixel dispersion of 2 nanometers per pixel (i.e., the pixel or digital resolution), and the PDA detector is calibrated (i.e., wavelength calibration) to read from wavelengths 300 nanometers to 812 nanometers. Two laser beams may be used to conduct wavelength calibration, which is well known by persons having knowledge in the art (see for example U.S. Pat. Nos. 6,372,503, and 6,711,516, which are incorporated herein by reference). In this example, the center of pixel 1 is assigned a wavelength of 300 nanometers (laser #1), and the center of pixel 256 is assigned a wavelength of 812 nanometers (laser #2), thereby providing a wavelength range of 300-812 nanometers. For clarity, since the center of pixel 1 is assigned 300 nanometers, the center of pixel 2 will be assigned 302 nanometers, the center of pixel 3 will be assigned 304 nanometers and so on in increments of 2 nanometers per pixel (the pixel dispersion). The two lasers may emit EMR at any wavelength within the range of 300-812 nanometers, having sufficient spacing so that linear interpolation and linear extrapolation of wavelengths can be conducted. A person skilled in spectroscopy should appreciate that the wavelength range and spectral resolution of the PDA detector depends on several factors, for example, the semiconductor material used to construct the PDA, and diffraction grating (transmission or reflective/reflection grating) and the orientation of the grating relative to the PDA detector. The source of EMR is a major determinant of the wavelength range. Each pixel is typically scanned in microseconds, which provides sufficient time to accumulate sufficient charge on the photodiode, for example to distinguish a signal from noise and dark current, without saturating the photodiode.

Saturation, or "saturating the photodiode", means that the photodiode has reached a maximum response in current and any additional photons impinging upon the photodiode is usually converted to heat instead of current. Because the scanning time is so short, it is reasonable to say that all the photodiodes in the PDA detector are scanned simultaneously. The photons are converted to electrical current, which is measured and digitized. In this present example, absorbance (sometimes referred to as absorption, denoted by A) may be determined, where $A = -\log_{10} T$.

It is well known that transmittance is defined as the fraction of incident light which is transmitted or passes through a sample. Thus:

$T = I/I_0$, where $I_0$=the intensity of light (or EMR) impinging upon or interrogating the sample (i.e. the incident light) and I=the intensity of light (or EMR) emerging from the sample after passing through the sample.

For calculating transmittance, the amount of EMR impinging upon the optical chamber, $I_0$, may be measured by interrogating an optical chamber containing air. The EMR impinging upon the optical chamber, $I_0$, may be measured before or after every sample measurement, or less frequently and stored in the processor for later use.

As an example, spectroscopic measurements are used to estimate prothrombin time (PT; usually reported as PT-INR; PT-International Normalized Ratio), activated partial thromboplastin time (aPTT), or thrombin time (TT), and since a normal PT is about 10-14 seconds, a normal ACT is about 70-130 seconds, and a normal TT is about 15-19 seconds, the measurements are performed every second. An aspect of the invention with respect to coagulation measurements, e.g. PT, ACT and TT, is to use the absorbance at one or more wavelengths or pattern recognition using absorbances at a plurality of wavelengths. Techniques of pattern recognition, combined with spectroscopy are known by those having skill in the art. An example where spectroscopy, combined with pattern recognition algorithms are used and that may be applied to the methods described herein, is provided in Zhang et. Al. (Mid-Infrared Spectroscopy for Coffee Variety Identification: Comparison of Pattern Recognition Methods", J. of Spectroscopy, Volume 2016, Article ID 7927286, the contents of which are incorporated herein by reference). As blood coagulates, the blood changes from various liquid varieties to various gel varieties, with corresponding changes in spectroscopic patterns, allowing one to use similar techniques as those used by Zhang et. al. to identify different variety of coffee beans. The specific blood coagulation time measured depends on the reagents included in the cartridge. For example, thromboplastin may be used for PT, celite or kaolin may be used for ACT, and thrombin may be used for TT.

Typically, blood coagulation time is measured using mechanical methods. For spectroscopic-based assays, citrated plasma is usually used in place of whole blood, because with whole blood, a much larger fraction of the incident EMR is scattered and absorbed by the blood cells, compared with the change in emerging EMR due to gelling of the plasma. However, separating out the plasma from the whole blood requires time and centrifugation equipment. It is well known that as plasma clots or coagulates, the absorbance at a single wavelength increases. By way of example, G. O. Gogstad et. al. (1986, "Turbidimetric Determination of Prothrombin Time by Clotting in a Centrifugal Analyzer" Clin. Chem. 32/10, 1857-1862; the contents of which are incorporated herein by reference), describe the change in absorbance spectra of plasma during coagulation. However, measurement of coagulation time using whole blood instead of plasma is more representative of in vivo coagulation. Therefore, there is a need for spectroscopic measurement of the blood coagulation time employing whole blood. In order to improve the signal to noise ratio when whole blood is used with the devices as described herein, the depth of the optical chamber should be relatively small, for example about 100 micrometers. The use of absorbance, reflectance or transmittance at a single wavelength to generate a clotting reaction curve (for example as shown in FIG. 1 of Gogstad et. al. 1986, using absorbance), and the calculations used to compute clotting time, are considered to be within the scope of the present invention. Gogstad et. al. also provided examples of calculations use to compute clotting time that may be used according to the methods described herein.

As an example, the source of EMR may be a tungsten lamp. U.S. Pat. No. 6,651,015 (to Samsoondar, the contents of which are incorporated herein by reference) describes how spectrophotometric apparatus are calibrated for measuring properties of blood, using multi-wavelength analysis. With the use of a source of EMR like a tungsten lamp, which provides multiwavelength EMR (the tungsten lamp is polychromatic, whereas a laser is monochromatic), and the use of a linear PDA detector, the analyzer has the capacity to generate full absorbance spectra in milliseconds. Several spectra may be collected over milliseconds and the absorbances averaged to minimize noise. Mathematical smoothing techniques, which are covered extensively in the literature, may be used to minimize noise. Other mathematical techniques like the use of an order derivative of absorbance are also discussed in U.S. Pat. No. 6,651,015. Even though full absorbance spectra are obtained, selected portions of the absorbance spectra, a wavelength range of the absorbance spectra, or the full absorbance spectra, may be used in order to determine a concentration of one or more than one analyte of interest. Examples of absorbance spectra are provided in FIGS. 2-7 & 9 (see 39*a-f* and 39*g* respectively).

Cell Counting

Manual cell counting uses a microscope and a hemocytometer. A version of a prior art hemocytometer is provided in FIGS. 1A-1F, comprising a 4-mm (millimeter) thick glass slide with grid lines ground in the slide (one of two counting chambers is shown as C in FIGS. 1A & 10), and a cover glass. The grid C is divided into 9 major squares measuring 1×1 mm as shown in FIG. 10. Except for the central major square, each of the other 8 major squares are subdivided into 16 of 0.25×0.25 mm squares (see FIG. 1E). The central square consists of smaller spaced grid lines that can assist in determining the size of a cell (see FIG. 1F). With a coverglass in place over the counting chamber, two sample introduction ports may be used to introduce the cells (in a liquid suspension) to be counted (see FIG. 1A). An enlarged cross-sectional view through the glass slide and cover glass shown in FIG. 1A along line B-B is presented in FIG. 1B. A view of detail D shown in FIG. 1B, showing a 0.1 mm gap between the top surface of the counting area and the bottom surface of the coverglass is provided in FIG. 1D. The volume of each 1×1 mm corner square is 100 nanoliters. After the cell suspension is loaded in the hemocytometer, the number of cells in the corner squares are counted using a microscope, and averaged.

U.S. Pat. No. 7,521,243 to Lindberg et al teaches a sample acquiring device for volumetric enumeration of white blood cells in a blood sample that includes a measurement cavity for receiving a blood sample. Lindberg's method includes acquiring a blood sample into an optical chamber holding a reagent comprising a hemolyzing agent and a staining agent for staining white blood cells. Some embodiments of cartridges, for example cartridges 10A-10C illustrated in FIGS. 10A-13E, comprise one or more reagents disposed in the post-optical chamber conduit, sufficiently far enough from the optical chamber and the one of a vent and a cartridge exit. Disposing the one or more reagents outside of the optical chamber, and specifically in the post-optical chamber conduit, enables the first sample interrogation to be performed on unaltered blood, and subsequently enables the second sample interrogation to be performed on altered blood, wherein altered blood is a mixture of blood and at least some of the one or more reagents.

Lindberg's system is incapable of jointly interrogating a blood sample free of reagents (sometimes referred to as an unaltered blood sample) and interrogating a mixture of blood sample and reagent(s) (sometimes referred to as an altered blood sample) in the same sample holder or cartridge.

Figure 3:
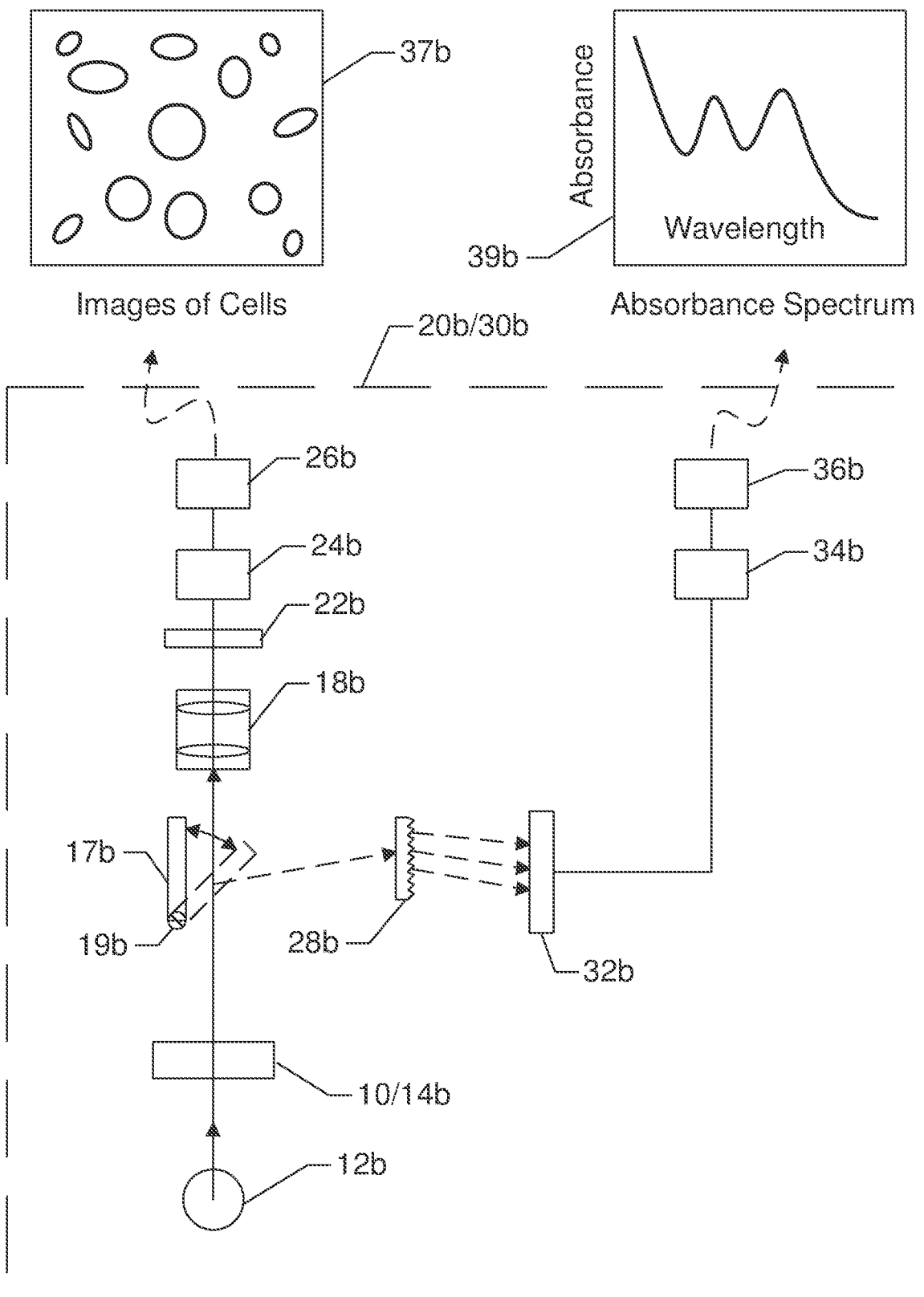
FIG. 3 is a block diagram of an example of a second embodiment of a system 30b (lower panel) for measuring one or more analyte quantities per unit volume of blood and one or more formed element quantities per unit volume of blood, in a blood sample. Output displays of the system (upper left and right panels) are provided as non-limiting examples.

Overview of Systems 30*b*, 30*c*, 30*d*, 30*e*, 30*f* and 30*g* as Non-Limiting Examples A second embodiment of a system 30*b* for measuring one or more analyte quantities per unit volume of blood (i.e., the concentration of the analyte) using a spectroscopic technique, and one or more formed element quantities per unit volume of blood (i.e., a cell count) using an imaging technique is illustrated in FIG. 3. The most significant differences when compared with system 30*a* are:

1) instead of using a beam splitter 16*a*, a pivotal mirror 17*b* is used to direct EMR transmitted through the blood sample, to either detector 22*b* or detector 32*b*, depending on the position of the mirror;

2) system 30*b* comprises a magnification system 18*b* for projecting a real enlarged image on to the detector 22*b*; and 3) instead of a prism 28*a*, the EMR dispersing element is a transmission grating 28*b*.

The differences between the first set of emerging EMR and the second set of emerging EMR are: a) each set emerges from the sample at a different time, depending on the position of the pivotal mirror 17*b*; b) the first set of emerging EMR is reflected off the pivotal mirror 17*b*; and c) the second set of emerging EMR bypasses the pivotal mirror 17*b*. In some embodiments, the second set of emerging EMR may be reflected off the pivotal mirror and the first set of emerging EMR may bypass the pivotal mirror.

Figure 4:
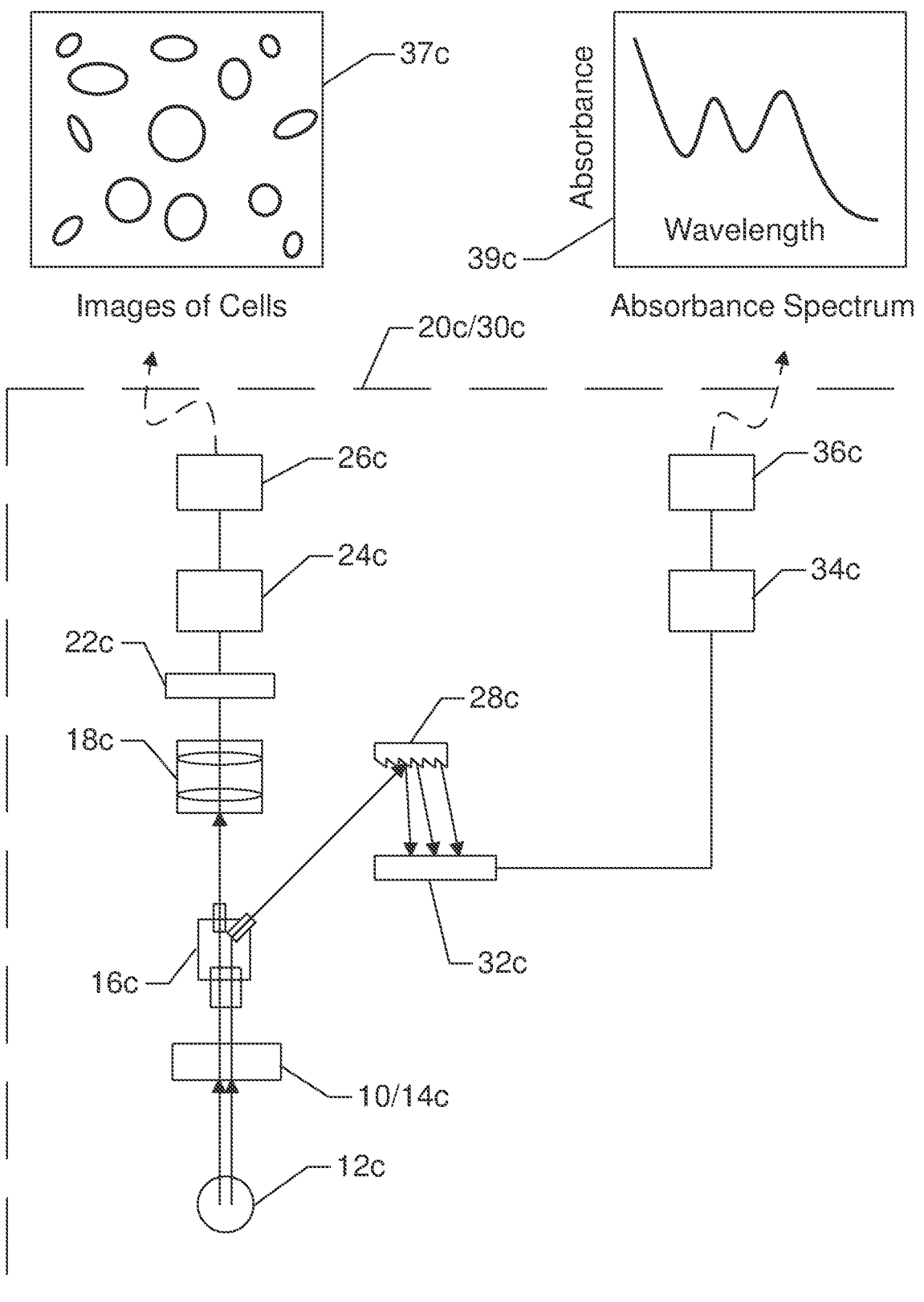
FIG. 4 is a block diagram of an example of a third embodiment of a system 30c (lower panel) for measuring one or more analyte quantities per unit volume of blood and one or more formed element quantities per unit volume of blood, in a blood sample. Output displays of the system (upper left and right panels) are provided as non-limiting examples.

A third embodiment of a system 30*c* is illustrated in FIG. 4. The most significant differences when compared with system 30*b* are:

1) a bifurcated optical fiber 16C comprising one or more strands of optical fiber is used as a beam splitter; and 2) instead of a transmission grating 28*b*, the EMR dispersing element is a reflecting grating 28*c*.

The bifurcated optical fiber may be designed so that the magnitude of the first set of emerging EMR and the magnitude of the second set of emerging EMR are optimized to produce accurate measurements of the one or more cell counts and the one or more analyte concentrations.

A fourth embodiment of a system 30*d* is illustrated in FIG. 5. The most significance differences when compared to the first three embodiments 30*a*, 30*b* and 30*c* illustrated in FIGS. 2, 3 and 4 respectively are:

1) multiple sources of EMR (12' and 12*d*" are shown as examples, but others may be arranged in a circular manner, with respect to an axis represented by the direction of reflected and transmitted EMR) are used to interrogate the sample;

2) EMR reflected from the sample is projected on to the detector 22*d* (i.e., the second set of emerging EMR is reflected EMR);

3) EMR transmitted through the sample is projected on to the detector 32*d* (i.e., the first set of emerging EMR is transmitted EMR), via a reflecting grating 28*d*; and 4) no beam splitter or pivotal mirror is required.

A fifth embodiment of a system 30*e* is illustrated in FIG. 6. The most significance difference when compared to the fourth embodiment 30*d* illustrated in FIG. 5 is that EMR reflected from the sample is projected on to both detectors 22*e*, and 32*e* (via a transmission grating 28*e*, wherein the general direction of first set of emerging EMR (reflected EMR) and the general direction of the second set of emerging EMR (also reflected EMR) define an angle less than 90 degrees.

Figure 7:
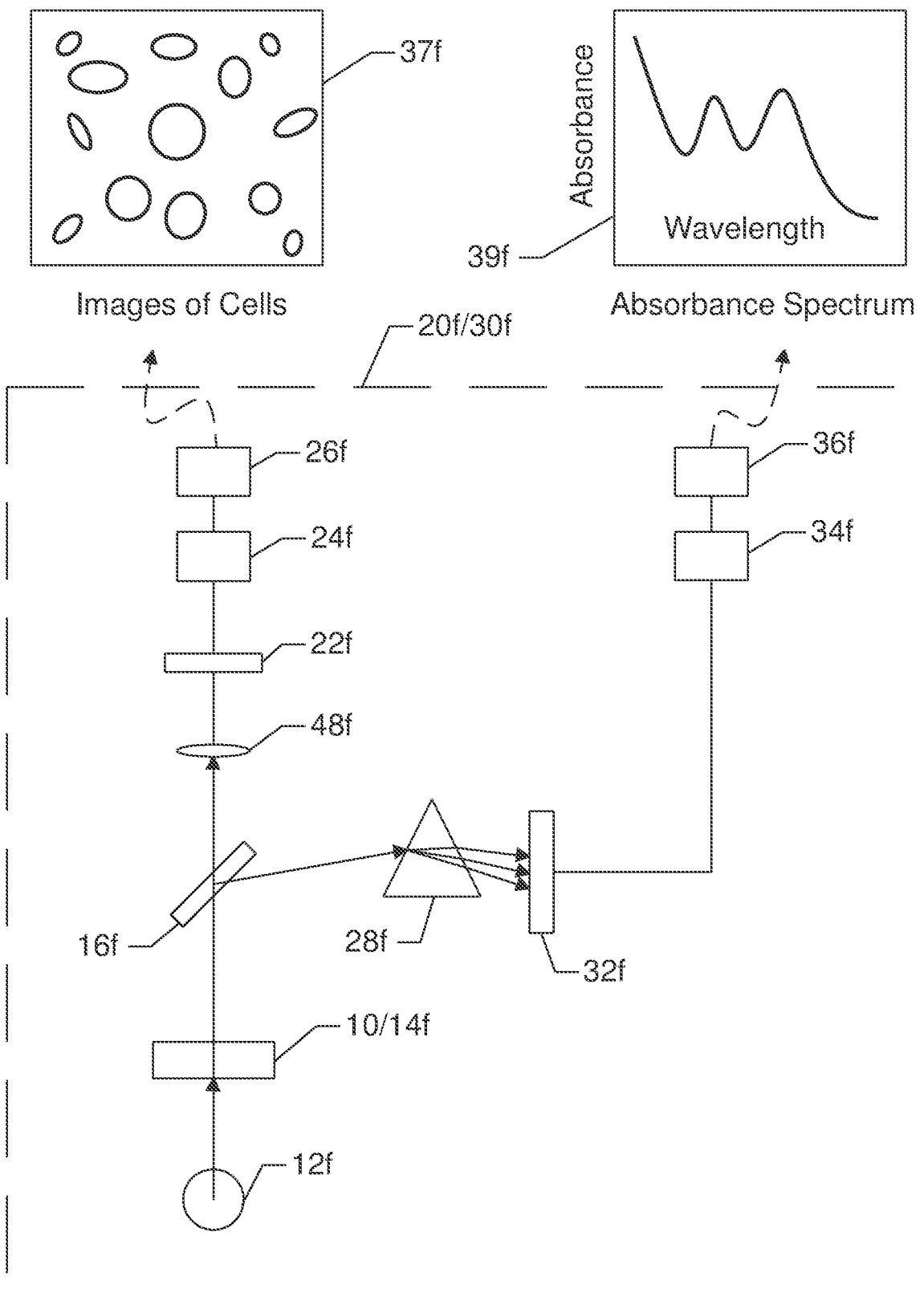
FIG. 7 is a block diagram of an example of a sixth embodiment of a system 30f (lower panel) for measuring one or more analyte quantities per unit volume of blood and one or more formed element quantities per unit volume of blood, in a blood sample. Output displays of the system (upper left and right panels) are provided as non-limiting examples.

A sixth embodiment of a system 30*f* is illustrated in FIG. 7. This embodiment is similar to the first embodiment 30*a* (see FIG. 2), with the following differences:

1) the beam splitter 16*f* is a plate comprising a partially silvered coating, or a plate comprising a dielectric coating;

2) no collimator is present (compared with a collimator 46*a* in system 30*a*);

3) a focusing system 48*f* is provided to focus the EMR transmitted through the sample on to the detector 22*f*;

4) two analog to digital converters 24*f* and 34*f* are shown; and 5) two processor systems 26*f* and 36*f* are shown.

In some embodiments, the beam splitter 16f is designed to transmit EMR at different wavelengths when compared to the wavelengths of the EMR that are reflected from the beam splitter 16f. For example, which is not to be considered limiting, methylene blue has a strong absorbance band centered at 660 nm, in the red region of the visible spectrum, and transmits wavelengths below 600 nm, appearing blue to the eye. On the other hand, hemoglobin appears red and can function as a red dye for tracking erythrocytes since erythrocytes are the only formed elements containing hemoglobin. As described in URL: ncbi.nlm.nih.gov/pmc/articles/PMC3005160/, hemoglobin has strong absorbance bands below 600 nm, and transmits wavelengths above 600 nm. Therefore in an embodiment of a system, for example, 30f (see FIG. 7, herein), the source of EMR 12f may be white light (and includes the visible spectrum: about 450-700 nm), a reagent, for example, methylene blue may be used to selectively stain the leukocytes, and the beam splitter 16f may be designed to transmit a range of red wavelengths and reflect a range of blue wavelengths. In this configuration, the red light will be absorbed by the stained leukocytes, and the blue light will be absorbed by the hemoglobin; leukocytes will appear as dark spots on the two-dimensional multichannel detector 22f, and the blue light will be absorbed by the hemoglobin in erythrocytes, providing electrical signals on the one-dimensional multi-channel detector 32f, which could yield an absorbance spectrum like 39f having a wavelength range of about 450 nm to about 600 nm. This may also be applied to beam splitter 16a in system 30a (see FIG. 2).

A seventh embodiment of a system 30g is illustrated in FIG. 9. This embodiment is similar to the previously described embodiments, and the most significant difference is that two sources of EMR (12g' and 12g") are used, wherein source 12g' is on one side of cartridge 10 and source 12g" is on the opposite side of the cartridge 10. Consequently, the first set of emerging EMR is mostly reflected EMR with mostly 12g' as the illuminating source, and the second set of emerging EMR is mostly transmitted EMR with mostly 12g" as the illuminating source.

Simplified Perspective View of System 30a as a Non-Limiting Example

An example of a system 30a comprising an analyzer 20a and a cartridge 10A is illustrated in FIGS. 8A-8C, in a simplified form. Shown in FIG. 8A is perspective view of a first embodiment of a system 30a for measuring one or more analyte quantities per unit volume of blood and one or more formed element quantities per unit volume of blood, in a blood sample, showing the analyzer 20a, with the analyzer receptor 14a in an open position, and also showing the cartridge 10A outside the analyzer 20a. Shown in FIG. 8B is perspective view of a first embodiment of a system 30a showing the cartridge 10A engaged with the analyzer receptor 14a, with the analyzer receptor 14a in an open position. Shown in FIG. 8C is perspective view of a first embodiment showing the cartridge 10A engaged with the analyzer receptor 14a, with the analyzer receptor 14a in a closed position. Although cartridge 10A is used for illustration, several embodiments of cartridges may be used. Detail of eight examples of cartridges are provided below, which should not be considered limiting in any way. The differences between the cartridges are highlighted.

Overview of Cartridges 10A, 10B, 10C and 10D as Non-Limiting Examples

As mentioned previously, uppercase letters ("A", "B", "C" and "D") are sometimes used to refer to cartridge features, whereas the lowercase letters ("a", "b" etc.) are sometimes are used to refer to system features. Table 2 (above) provides a list of the reference numerals used, and a description of the corresponding structural features.

Cartridge 10A (see FIGS. 10A-10J) is a first embodiment of a cartridge used with a system for measuring one or more analyte quantities per unit volume of blood and one or more formed element quantities per unit volume of blood, in a blood sample. However, this and the other embodiments of cartridges provided in this application may also be used for measuring one or more properties of a blood sample, for example, but not limited to, the concentration of bilirubin or hemoglobin, and a leukocyte count. The cartridge comprises a cartridge body having an upper surface and a lower surface. Shown in FIG. 10A is an exploded top perspective view of cartridge 10A. In this example, the upper surface is the top surface of a first housing member 50A, and the lower surface is the bottom surface of a second housing member 60A. In FIG. 10A, details of the upper surface are shown but the bottom surface is not shown. The bottom surface is a plain surface having an optical window 83 (see FIG. 10K). The housing members 50A and 60A are held together by a double-sided sticky gasket 100A. However, this is just one non-limiting example illustrating how the cartridge (comprising a cartridge body having an upper surface and a lower surface) may be manufactured and assembled. For example, the cartridge may comprise a plurality of members and gaskets, the cartridge may be 3-D printed, or the cartridge may be 3-D printed in combination with a plurality of members and gaskets.

Shown in FIG. 10B is a bottom view of the first housing member 50A of the cartridge shown in FIG. 10A, and shown in FIG. 10C is the bottom view of the first housing member 50A of the cartridge shown in FIG. 10B overlaid by and in alignment with the gasket 100A shown in FIG. 10A. Shown in FIG. 10D is a top view of the second housing member 60A of the cartridge shown in FIG. 10A, and shown in FIG. 10E is the top view of the second housing member 60A shown in FIG. 10D overlaid by and in alignment with the gasket 100A shown in FIG. 10A. The cutouts in the gasket 100A are not labeled because FIGS. 10C-10E illustrate how the gasket cutouts are aligned with the first and second housing members 50A and 60A respectively, and a person having ordinary skill in the art should appreciate that the gasket cutouts could be designed differently without affecting the functionality of the cartridge in any significant way.

Shown in FIG. 10F is a perspective top view of the cartridge 10A shown in FIG. 10A, in a fully open position, i.e., the cap 70A is in an open position (sometimes referred to as a first position) or unsealed configuration. Shown in FIG. 10G is a perspective top view of the cartridge 10A shown in FIG. 10A, in a fully closed position (sometimes referred to as a second position) or a sealed configuration, i.e., the cap 70A is in a closed position. Shown in FIG. 10H is top view of the cartridge 10A shown in FIG. 10G, in the fully closed position. Shown in FIG. 10J is an enlarged cross-sectional view through the cartridge 10A shown in FIG. 10H along line J-J. Shown in FIG. 10K is an enlarged cross-sectional view through the cartridge 10A shown in FIG. 10H along line K-K.

The sample inlet portion 57A comprises some elements of the cartridge that interact with cap 70A, for example a top portion 53 of a sample storage well 51 for receiving the blood sample, a flat surface 59A, and an air bladder communication port 63A (see FIGS. 10A, 10F, 10J and 10K). The sample inlet portion may also be described as comprising a sample storage well 51, a flat surface 59A, and an air bladder communication port 63A. The sample storage well 51 also comprises a bottom portion (or bottom opening) 55 for releasing at least a portion of the blood sample into an optical chamber inlet conduit or pre-optical chamber conduit 97A (see FIGS. 10H-10K). Depending on the relative hydrophilicity of the sample storage well 51 and the relative hydrophobicity of the pre-optical chamber conduit 97A, the blood may stop at the bottom opening 55 of the sample storage well 51. However in some embodiments, a hydrophobic insert (for example, 225C shown in FIGS. 12F, 12H and 12J) disposed close to the junction of the bottom opening 55 of the sample storage well 51 and the optical chamber inlet conduit 97A for providing means for minimizing, mitigating, or modifying blood flow out of the sample storage well 51. In other embodiments, an enlarged cavity (an example is shown as 241G in FIG. 16K) may replace the hydrophobic insert, and the enlarged cavity may function as a capillary break. An example of an enlarged cavity that may function as a capillary break or capillary stop is illustrated in U.S. Pat. Appl'n Pub. No. US 2019/0224667 to Samsoondar (hereby incorporated by reference), e.g. see 46 in FIG. 15E. In other embodiments, the sample storage well may be in the form of an insert made from hydrophilic (i.e. wettable) material, and the optical chamber inlet conduit 97A may be made from less hydrophilic material (i.e., less wettable). The use of a hydrophobic insert like 225C may provide greater manufacturing flexibility whereby the rest of the cartridge may be manufactured from a less hydrophobic or more hydrophilic material. Another example of a capillary break (also referred to as a capillary stop) is an orifice 105K in the gasket 100K (see FIG. 21F).

In addition to an enlarged cavity, a relatively small orifice fluidly connecting two conduits, a hydrophobic insert and a sample storage well insert, other structural features that provide means for minimizing, mitigating, or modifying blood flow out of the sample storage well except when either positive pressure is applied to the surface of the blood sample in the sample storage well (e.g. in cartridges 10A, 10B and 10D), or negative pressure is applied to the leading edge of the blood sample (e.g., in cartridges 100). The leading edge of the blood sample refers to the front end of the sample, flowing out from the sample storage well 51, which is the first portion of the blood sample to enter the optical chamber 13. Some examples of structural features include: a sample storage well insert having internal walls more wettable than the optical chamber inlet conduit (an example of a sample storage well insert is illustrated in details in U.S. Pat. Appl'n Pub. No. US 2019/0224667); a sample storage well having internal walls more wettable than the optical chamber inlet conduit; an optical chamber inlet conduit less wettable than the internal walls of the sample storage well; and any combination thereof. Also, the stringency of the requirement to mitigate blood flow from the sample storage well into the optical chamber inlet conduit depends on the property of the blood measured.

Cartridge 10A employs the use of positive pressure that may be applied to the surface of the blood sample in the sample storage well 51. This is accomplished by through participation of the following:
1) an air bladder 67A in the cartridge for generating positive pressure by squeezing a flexible member 71A (FIGS. 10G & 10H) of the air bladder 67A, and for generating negative pressure by releasing the squeezed flexible member 71A;
2) a means in an analyzer that is operating in conjunction with the cartridge when the cartridge is inserted within a receptor of the analyzer, the means for squeezing the air bladder via flexible member 71A (not shown);
3) an air bladder communication port 63A of a sample inlet portion 57A (FIGS. 10A & 10F),
4) an air bladder duct 65A (FIGS. 10A & 10H) for providing fluid connection between an air bladder 67A and an air bladder communication port 63A;
5) a vent 85A for releasing pressure in the optical chamber (FIGS. 10F-10H),
6) a flat surface 59A located on the upper surface of the cartridge body, the flat surface 59A of the cartridge body surrounding the top portion of the sample storage well 53 and the air bladder communication port 63A (e.g. as shown in FIG. 10J); and
7) a cap flat surface 76A located on the underside 75A of the cap 70A (see FIGS. 10A & 10F).

The cartridge is adjustable between an unsealed configuration (see FIG. 10F) and a sealed configuration (see FIG. 10G). In the unsealed configuration the sample storage well is configured to receive the blood sample; in the sealed configuration a portion of the flat surface 59A of the cartridge body mates with the cap flat surface 76A to form a closed air passage operatively connecting the air bladder communication port 63A to the sample storage well 51 so that either positive pressure or negative pressure is transferable to the sample storage well. The closed air passage may be facilitated by a groove set into the upper surface of the cartridge body (not shown), a recess 77A set into the underside 75A of the cap 70A, or a combination thereof. In this embodiment, a cap recess 77A is shown in FIGS. 10A, 10F, 10J & 10K, illustrating formation of the closed air passage.

Squeezing the air bladder 67A via the flexible member 71A creates positive pressure and releasing the flexible member 71A creates negative pressure at the surface of blood in the sample storage well 51. Therefore, the air bladder provides means for both pushing the blood towards the vent 85A and pull the blood away from the vent 85A. This is an example of a positive to negative pressure means for creating blood flow. A first alternative to air bladder 67A is provide for cartridge 10C shown collectively in FIGS. 12A-12J, whereby negative to positive pressure means is provided by an analyzer pump, which is discussed later. A second alternative to air bladder 67A is provide for cartridge 10D shown collectively in FIGS. 13A-13E, whereby positive to negative pressure means is provided by an analyzer pump, which is also discussed later. These alternative pressure means may be applied to any of the cartridges described, even when not explicitly illustrated. A closed configuration does not always imply a sealed configuration, which will become obvious after operation of cartridge 10C (see FIGS. 12A-12E) is explained later.

When blood from, for example a pin prick of blood on a patient's skin (i.e., capillary blood) or blood in a syringe (i.e., venous or arterial blood), is deposited in the sample storage well 51, the blood may stay in the sample storage well 51, depending on the cartridge design, the material used to build the cartridge, and the requirement of means for minimizing, mitigating, or modifying blood flow out of the sample storage well 51. After the cap 70A is closed, i.e., adjusting the cartridge from an unsealed to a sealed configuration, the cartridge is placed in a receptor like 14*a* illustrated in FIGS. 8A-8C, and the rest of the process is fully automated. The next step in this example is to use pressurized air from air bladder 67A to fill the optical chamber 13 (see FIGS. 10H & 10K) by pushing at least some of the blood out of the sample storage well 51. The activation of the air bladder may be programmed so that the leading edge of the blood stops anywhere in the optical chamber exit conduit, i.e., between the optical chamber 13 and the vent 85A. An alternative means for stopping flow of the leading edge of the blood is provided in cartridge 10B (see FIGS. 11A-11K) in the form of a conductivity sensor 200, discussed later.

Using a system configuration 30a as an example (see FIG. 2), sample interrogation takes place after the optical chamber 13 is filled with blood. The EMR transmitted through the blood in optical chamber 13 is split using beam splitter 16a. EMR reflected from the beam splitter 16a (i.e., a first set of emerging EMR) is projected on to the one-dimensional multi-channel detector 32a via an EMR dispersing element 28a, and EMR transmitted through the beam splitter 16a (i.e., a second set of emerging EMR) is projected on to the two-dimensional multi-channel detector 22a. Signals from the two detectors 22a and 32a are digitized using the analog to digital converter 26a, and the processor 26a processes digital data (or digital information). The processed information may be displayed as images of cells (37a) and an absorbance spectrum (39a). The displays may come from unaltered blood, but in some embodiments, the cartridge may contain one or more dry reagents disposed in the optical chamber inlet conduit or pre-optical chamber conduit 97A, the optical chamber 13, or the optical chamber exit conduit or post-optical chamber conduit 99A (see FIG. 10H), whereby the blood dissolves the one or more dry reagents. The use of liquid reagents, calibrators and diluents are discussed later, regarding cartridges 10E (see FIGS. 14A-14Y), 10F. (see FIGS. 15A-15X) and 10G (see FIGS. 16A-16P).

U.S. Pat. No. 7,521,243 to Lindberg et al teaches a sample acquiring device for volumetric enumeration of white blood cells in a blood sample, the device having an optical chamber containing several dry reagents, including RBC lysing reagents and WBC staining reagents. Lindberg does not teach disposing a reagent in the optical chamber exit conduit (or post-optical chamber conduit). Moreover, Lindberg's sample acquiring device depends on capillary action for blood flow, therefore blood can only flow in one direction into the optical chamber. In some modifications of cartridge 10A, the one or more reagents is disposed in the post-optical chamber conduit 99A. In this embodiment, the system may be programmed so that blood flows into the optical chamber exit conduit 99A whereby the blood is able to reach and dissolve at least a portion of the one or more reagents. The one or more reagents is disposed in the post-optical chamber conduit, sufficiently far enough from the optical chamber and the one of a vent (e.g. 85A in FIG. 10H) and a cartridge exit (e.g. 219C in FIGS. 12F & 12G), enabling the first sample interrogation on unaltered blood. Therefore, while the unaltered blood is being interrogated by EMR (i.e., a first sample interrogation), blood in the optical chamber exit duct 99A is reacting with at least a portion of the one or more reagents. After a predetermined time, after the first sample interrogation, the mixture of blood and one or more reagents (i.e., altered blood) is pulled back into the optical chamber for a second sample interrogation, by releasing the squeezed air bladder 67A. Therefore, the first sample interrogation uses unaltered blood and the second sample interrogation uses altered blood (i.e., a mixture of blood and some of the one or more reagents). As an example, if the reagents comprise hemolyzing reagents and leukocyte specific stains, the first sample interrogation could provide means for measuring hemoglobin concentration by using the one-dimensional multi-channel detector 32a as well as means for counting erythrocytes using the two-dimensional multi-channel detector 22a, and the second sample interrogation could provide means for counting leukocytes, also using the two-dimensional multi-channel detector 22a (see FIG. 2).

It is known that an average PCV (packed cell volume) or hematocrit is about 45%, and it is also known that erythrocytes account for most of the formed elements of blood (see Table 1). Therefore, the space between erythrocytes, which comprises mostly plasma, is about 55% of the area of the optical chamber, assuming cells are distributed approximately as a monolayer. A shallow (~50 µm) optical chamber is more likely to provide a monolayer of erythrocytes. It is also known that the number of leukocytes in a blood sample is about 0.1% the number of erythrocytes, therefore a deeper (~200 µm) optical chamber could provide a monolayer of leukocytes because of the relatively low cell count. Manual counting of erythrocytes using a hemocytometer (illustrated in FIGS. 1A-1F) and a microscope usually requires about 200× dilution of the blood sample, to provide an adequate number of cells for an accurate cell count. The dilution is required because the manual process is very tedious and error prone and a 200× dilution provides sufficient erythrocytes for counting. Cartridges 10E (see FIGS. 14A-14Y) and 10F (see FIGS. 15A-15X) are examples of cartridges with self-contained dilution means, and are discussed later.

During the first sample interrogation in the present invention, a magnified image of a relatively small area of the optical chamber containing undiluted blood provides sufficient erythrocytes and sufficient spaces between erythrocytes for accurate erythrocyte counting and may be an alternative to diluting the blood sample. If the shallow optical chamber is used, in order to provide erythrocyte counting, then it may be preferred to interrogate a larger area of the same optical chamber to provide leukocyte counting. As examples, magnification may be provided by magnification systems 18b, 18c, 18d, 18e and 18g are shown in FIGS. 3, 4, 5, 6 and 9 respectively. Magnification and/or high resolution two-dimensional multi-channel detectors may facilitate erythrocyte counting without having to dilute the blood sample. The size of an erythrocyte is 6-8 µm (see Table 1), therefore a preferred pixel pitch in a two-dimensional multi-channel detector for counting erythrocytes is less than 4 µm, and a preferred pixel pitch for counting erythrocytes and leukocytes is 1-10 µm.

The number of leukocytes is about 0.1% the number of erythrocytes, therefore, in order to count leukocytes it is preferred to use an undiluted blood sample. U.S. Pat. No. 7,521,243 to Lindberg describes a method to selectively lyse the erythrocytes (the term hemolyze may be used), leaving the leukocytes intact. Non-limiting examples of hemolyzing reagents include: a quaternary ammonium salt, a saponin, a bile acid such as deoxycholate, a digitoxin, a snake venom, a glucopyranoside, or a non-ionic detergent of type Triton (see U.S. Pat. No. 7,521,243 to Lindberg). For counting leukocytes, it may also be preferred to interrogate a larger area of the optical chamber and if the area of the optical chamber is similar to the area of the two-dimensional multi-channel detector, no magnification may be required. Another reagent may be a staining reagent. Staining reagents may selectively stain the nuclei of leukocytes. Without being limited in anyway, staining reagents may be selected from eosin, methylene blue, methylene green, azure, thionin, toluidine blue, or any combination thereof.

An aspect of the present invention is therefore to dispose the one or more reagents in the post-optical chamber conduit of the cartridge.

Figure 11A:
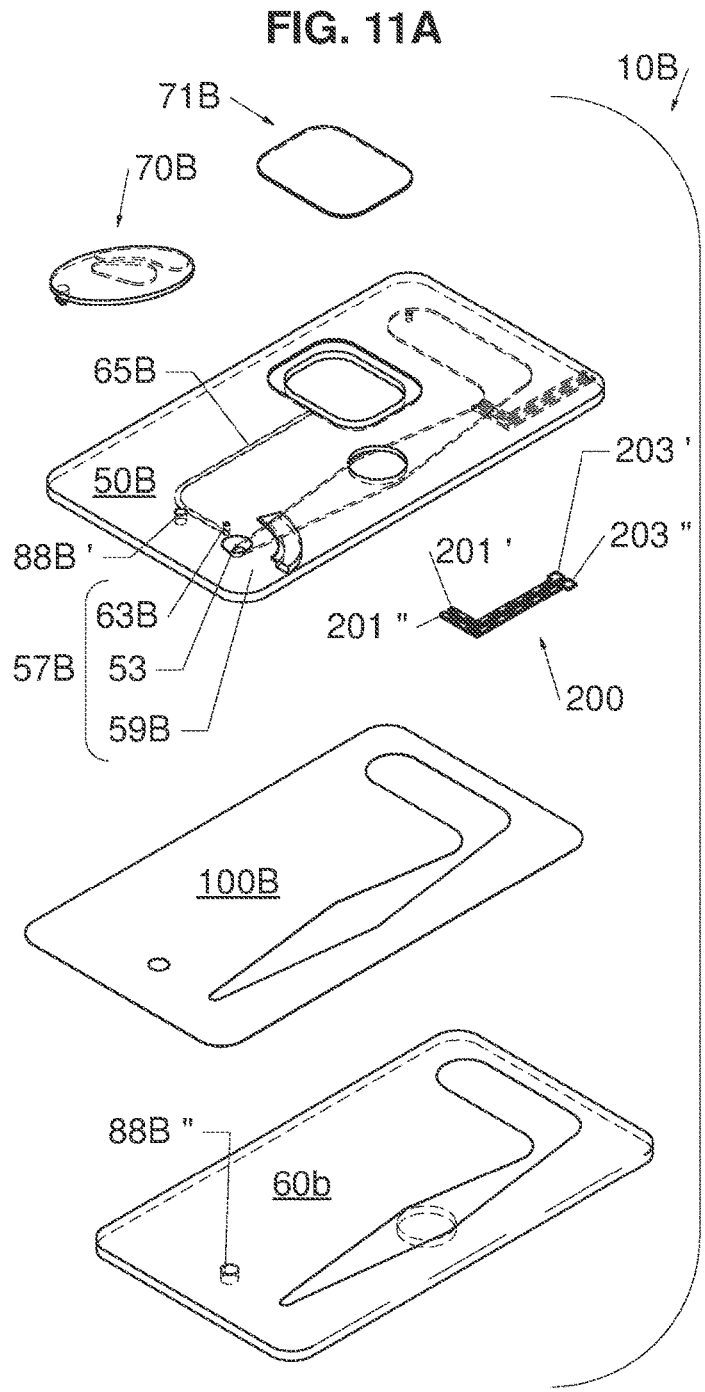
FIG. 11A is an exploded top perspective view of a cartridge 10B for measuring at least one property of blood, according to a second embodiment of the cartridge.

Shown in FIG. 11A is an exploded top perspective view of cartridge 10B that may be used instead of cartridge 10A. Some major differences in cartridge 10B compared with cartridge 10A are as follows:

1) the cap 70B is hingedly attached to the cartridge body via a pivot 89B in the cap 70B and holes 88B' and 88B" in the first and second housing members 50B and 60B respectively, for receiving the pivot 89B, and
2) in addition to recess 77B that is used to facilitate formation of a closed air passage discussed previously, there is a second recess or groove 94B disposed at the underside 75B and at the sweeping portion of cap 70B, for storing excess sample (see FIG. 11O).

In some embodiments, a groove may be set in the flat surface 59B of inlet portion 57B; by adding excess blood sample where the excess bulges above the top opening 53 of the sample storage well 51, the excess blood may be swept away by a sweeping edge of the cap, and a fixed volume of blood may be retained in the sample storage well 51. The recess 94B or a groove in the flat surface 59B (e.g., see groove 94E disposed at the inlet portion 57E of cartridge 10E, shown in FIG. 14A) could receive and store the excess blood and avoid contaminating the analyzer with blood. For some measurements, a predetermined ratio of blood volume to quantity of one or more reagents is required for more accurate measurement. Means for minimizing, mitigating, or modifying blood flow out of the sample storage well 51 were discussed previously, and these means in conjunction with means for removing the excess sample at the top opening 53 of the sample storage well 51, provides means for metering the blood sample in the sample storage well 51.

Figure 11B:
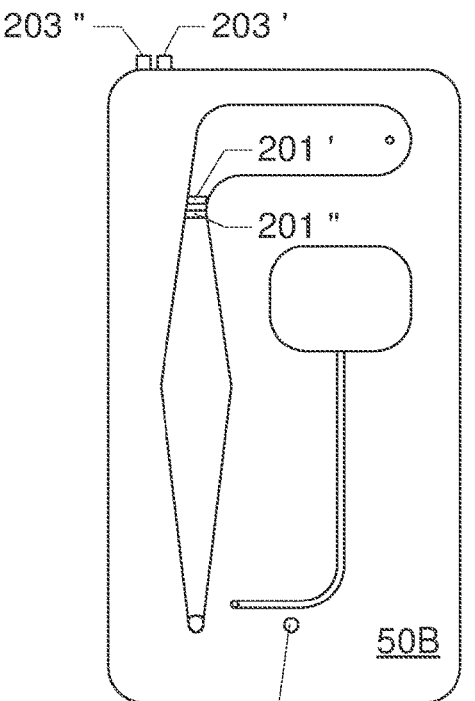
FIG. 11B is a bottom view of the first housing member 50B of the cartridge shown in FIG. 11A.
Figure 11C:
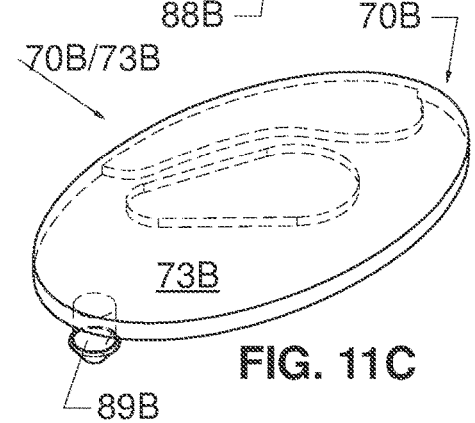
FIG. 11C is a perspective top view of the cap 70B shown in FIG. 11A.
Figure 11D:
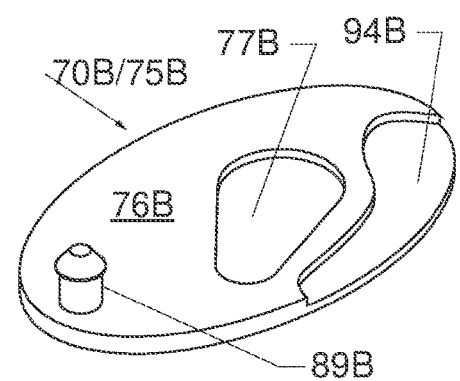
FIG. 11D is a perspective bottom view of the cap 70B shown in FIG. 11A.

Shown in FIG. 11B is a bottom view of the first housing member 50B of the cartridge shown in FIG. 11A. Shown in FIG. 11C is a perspective top view of the cap 70B shown in FIG. 11A showing the top side 73B. Shown in FIG. 11D is a perspective bottom view of the cap 70B shown in FIG. 11A showing the underside 75B. Shown in FIG. 11E is a perspective top view of the cartridge 10B shown in FIG. 11A, in a fully open position (or unsealed configuration). Shown in FIG. 11F is a perspective top view of the cartridge 10B shown in FIG. 11A, in a fully closed position (or sealed configuration). Shown in FIG. 11G is top view of the cartridge 10B shown in FIG. 11E. Shown in FIG. 11H is top view of the cartridge 10B shown in FIG. 11F. Shown in FIG. 11J is an enlarged cross-sectional view through the cartridge 10B shown in FIG. 11G along line J-J. Shown in FIG. 11K is an enlarged cross-sectional view through the cartridge 10B shown in FIG. 11H along line K-K, showing the closed air passage connecting air bladder communication port 63B to sample storage well 51 via cap recess 77B.

Another major difference in cartridge 10B is: 3) a cap latch 91B and a recess 92B in the cap latch 91B are used for engaging cap 70B, when the cartridge is adjusted from an unsealed configuration to a sealed configuration (see FIGS. 11G-11K). In some embodiments of caps 70A and 70B, gaskets are disposed at the cap flat surfaces 76A and 76B respectively, for creating better seals between caps and cartridges in their sealed configurations. Alternatively, the gaskets may be disposed at the flat surfaces 59A and 59B of the inlet portions 57A and 57B respectively of cartridges 10A and 10B respectively.

Yet another major difference in cartridge 10B is: 4) a conductivity sensor 200 comprising a pair of conductivity electrodes (also referred to as probes), for performing several functions, e.g., controlling air bladder activation means (e.g. a stepper motor in the analyzer, having a linear actuator that presses against flexible member 71B of air bladder 67B); an analyzer pump that is discussed below; and measuring hematocrit also discussed below.

Referring to FIGS. 11A, 11B, 11G and 11H, ends (pins) 203 and 203" of sensor 200 projecting out of cartridge 10B facilitate electrical communication with a relay, when the cartridge is properly inserted in the analyzer receptor. In use, a voltage is applied over ends 201' and 201" (see FIG. 11B) of conductivity sensor 200 via the relay in the associated analyzer. The ends 201' and 201" are exposed in optical chamber exit conduit 99B, and can make contact with blood when the leading edge of the blood reaches the ends 201' and 201". The ends 201' and 201' function as an open switch when the conduit is not occupied by blood, and function as a closed switch when blood bridges the gap between the ends 201' and 201". When the switch is closed, a current travels to the relay in the analyzer, and the relay may control, for example, a stepper motor. The relay is used to apply a voltage across sensor ends 201' and 201", and may be used to activate/deactivate an air bladder stepper motor. Some embodiments of a cartridge may comprise a conductivity sensor like 200, installed anywhere in the cartridge where the conductivity sensor can make contact with unaltered blood, and the sensor may be used for measuring hematocrit (see U.S. Pat. No. 5,821,399 to Zelin and U.S. Pat. No. 5,112,455 to Cozzette). The electrical conductivity of blood is inversely proportional to the hematocrit because the erythrocyte membranes act as insulators.

A conductivity sensor like 200 shown in cartridge 10B is not provided in cartridge 10A, and is optional in any cartridge described, even when a conductivity sensor is not explicitly disclosed. In embodiment 10A, activation of the air bladder of the cartridge may be controlled by preprogramming the activation based on pre-determined expected travel of the leading edge of the blood. However, a sensor 200 may be used to provide more precise movement of the leading edge of the sample.

Common to cartridges 10A and 10B is the use of respective air bladders 67A and 67B for providing positive pressure by squeezing the air bladder, and for providing negative pressure by releasing the squeezed air bladder (negative pressure can only be created after the air bladder is squeezed and then released). Therefore, the use of the air bladder may be described as a positive to negative pressure means for creating a blood flow in a direction towards the vent (85A & 85B) when positive pressure is built up in the air bladder (67A & 67B), and a means for creating a blood flow in a direction away from the vent when negative pressure is built up in the air bladder.

Cartridge 100 is described next, where a negative to positive pressure means is described. Positive to negative pressure means was discussed previously, and these pressure means are aspects of the present invention.

The most significant difference between cartridge 100 and cartridges 10A and 10B is the use of a pump in an associated analyzer, for providing a negative to positive pressure means. The negative pressure created by the analyzer pump may be used for pulling the leading edge of the blood sample from the sample storage well 51 to fill the optical chamber 13, for performing a first sample interrogation on unaltered blood. Subsequently, the same pump is used to create positive pressure for pushing against the leading edge of the blood. In embodiments having one or more reagents disposed in the optical chamber exit conduit 99C, the positive pressure may be used to fill the optical chamber 13 with altered blood, for conducting a second sample interrogation. First and second sample interrogations were discussed previously. An air bladder like 67A and a vent like 85A shown for cartridge 10A are not required for cartridge 10C, but instead a cap vent 223C (see FIG. 12F) is required for exposing the blood in the sample storage well 51 to atmospheric pressure. FIG. 12F provides an example where the cartridge is in a closed configuration but not in a sealed configuration.

Figure 12A:
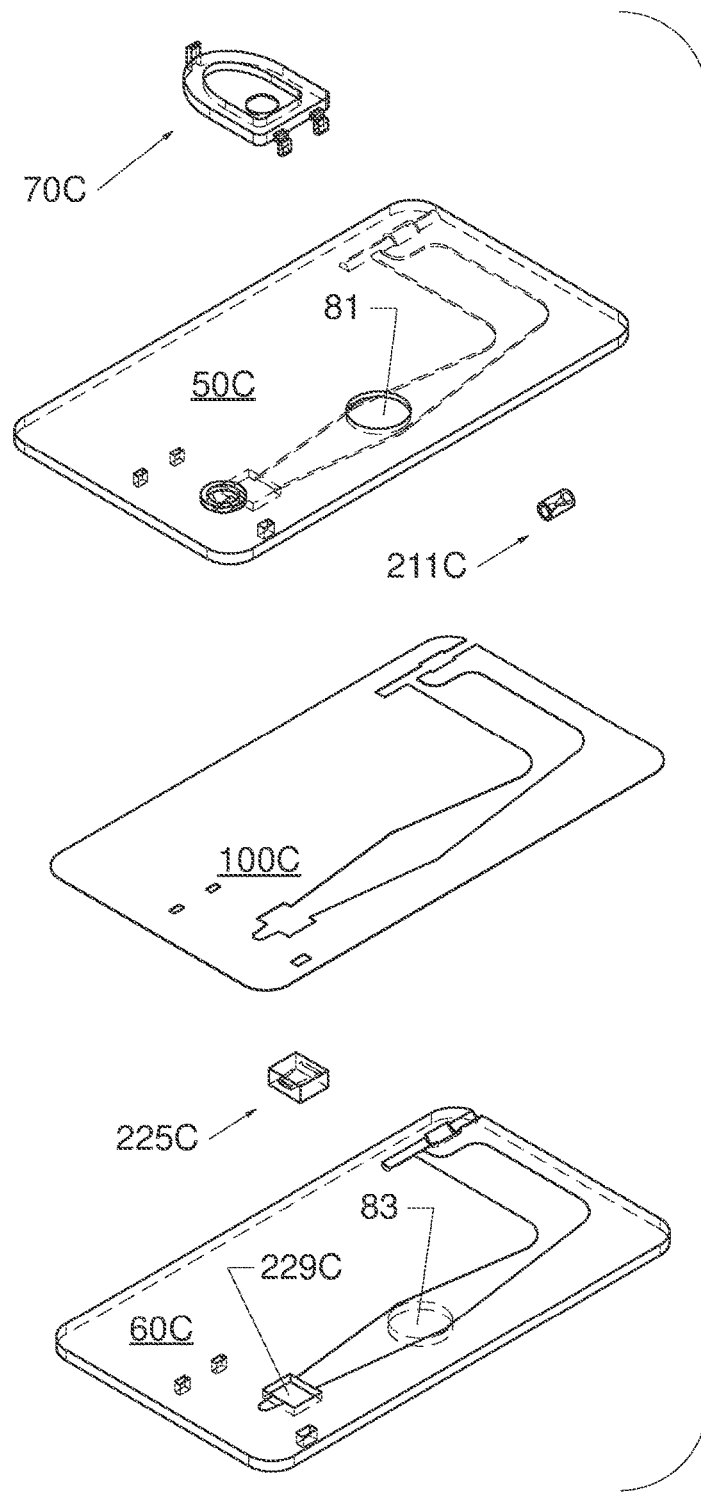
FIG. 12A is an exploded perspective top view of a cartridge 10C for measuring at least one property of blood, according to a third embodiment of the cartridge.
Figure 12B:
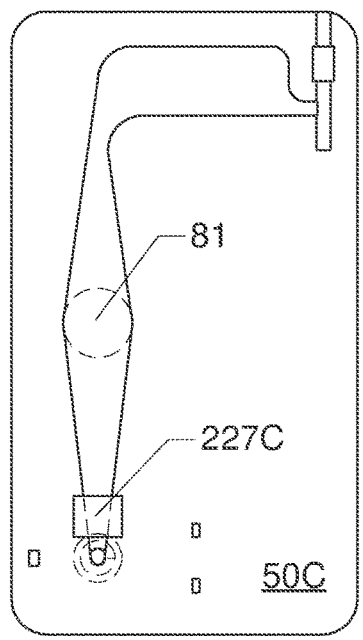
FIG. 12B is a bottom view of the first housing member 50C of the cartridge shown in FIG. 12A.
Figure 12C:
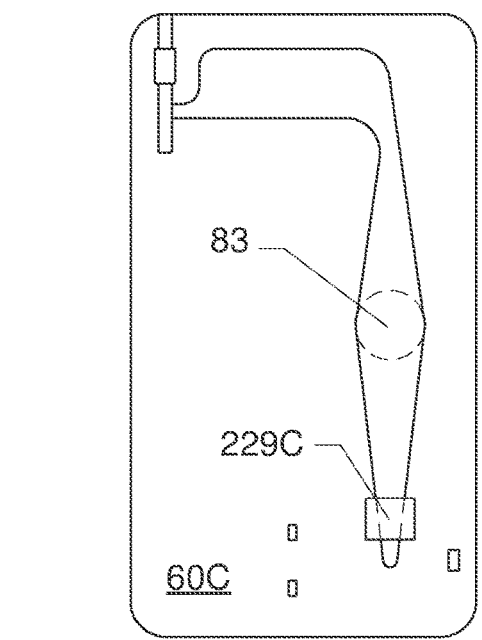
FIG. 12C is a top view of the second housing member 60C of the cartridge shown in FIG. 12A.

Illustrated in FIG. 12A is an exploded top perspective view of cartridge 100 for measuring at least one property of a sample, showing a sealing member 211C installed in a cartridge exit duct 217C (see FIGS. 12F & 12G), for frictionally engaging an outer surface of a pump hollow needle. The pump hollow needle comprises a first end operatively connected to a pump associate with an analyzer, a second end distal to the first end and operatively connected to the first end, and the outer surface of the pump hollow needle. Illustrated in FIG. 12B is a bottom view of the first housing member 50C of the cartridge 100 shown in FIG. 12A. Illustrated in FIG. 12C is a top view of the second housing member 60C of the cartridge shown in FIG. 12A. Illustrated in FIG. 12D is a perspective top view of the cartridge 10C in a fully open position and illustrated in FIG. 12E is a perspective top view of the cartridge 100 in a fully closed position, showing a cap vent, for example a cap breathable plug 223C. It should be noted that when cartridge 100 is in a fully closed position, it is not in a sealed configuration as cartridge 10A shown in FIG. 10G, since cap vent 223C exposes the blood in the sample storage well 51 to atmospheric pressure. A person having ordinary skill in the art should appreciate that other means may be used for subjecting the blood in the sample storage well 51 to atmospheric pressure, for example without any limitations, a hole in the cap, or a leaky seal between the cartridge body upper surface and the cap when the cap is closed. A person having ordinary skill in the art should also appreciate that a leaky seal between the cartridge body upper surface and the cap implies that the flat surface 59C of inlet portion 57C of cartridge 10C the cap flat surface 76C of cap 70C may not be continuous as shown in FIG. 12D. In other words, the flat surface of one or more of the flat surface of the cartridge and the cap flat surface may be substantially continuous, in order to define a leaky seal. For simplicity, the means for subjecting the blood in the sample storage well 51 to atmospheric pressure when the cap is closed, may be described as a cap vent. Illustrated in FIG. 12F is top view of the cartridge 100 shown in FIG. 12E, illustrating a flow path from the cap vent 223C to the cartridge exit 219C. Cartridge exit 219C is a portion of cartridge exit duct 217C of cartridge 100 used in conjunction with the sealing member 211C, to establish operative communication with an analyzer pump. Illustrated in FIG. 12G is an enlarged cross-sectional view through the cartridge 10C shown in FIG. 12F along line G-G. Illustrated in FIG. 12H is an enlarged cross-sectional view through the cartridge 100 shown in FIG. 12F along line H-H. Illustrated in FIG. 12J is an enlarged cross-sectional view through the cartridge 100 shown in FIG. 12F along line J-J.

Cartridge 100 also comprises the following features, which are not shown for cartridges 10A & 10B:
1) a sample storage well boss 221C for increasing the sample storage well storage capacity (see FIGS. 12D & 12J); and
2) a hydrophobic insert 225c (see FIGS. 12A, 12F, 12H & 12J) disposed close to the junction of the bottom opening 55 of the sample storage well 51 and the optical chamber inlet conduit 97C, for providing means for minimizing, mitigating, or modifying blood flow out of the sample storage well 51.

Recesses 227C and 229C in first housing member 50C and the second housing member 60C respectively, are shown in FIGS. 12B & 12C for installing the hydrophobic insert 225C. Hydrophobic insert 225C is an example of means for minimizing, mitigating, or modifying blood flow out of the sample storage well 51. In other embodiments, an enlarged cavity may replace the hydrophobic insert, and the enlarged cavity may function as a capillary break. In yet other embodiments, the sample storage well may be in the form of an insert made from hydrophilic (i.e. wettable) material, and the optical chamber inlet conduit 97A may be made from less hydrophilic material (i.e., less wettable). An example of a sample storage well insert is illustrated in U.S. Pat. Appl'n Pub. No. US 2019/0224667. Another example of a capillary break (or capillary stop) is a small hole 105K in the gasket 100K shown in FIG. 21F.

In addition to an enlarged cavity, a relatively small orifice fluidly connecting two conduits, a hydrophobic insert, and a sample storage well insert, other structural features may provide means for minimizing blood flow out of the sample storage well except when either positive pressure or negative pressure is applied to the blood sample. Some of these features include: a sample storage well insert having internal walls more wettable than the optical chamber inlet conduit; a sample storage well having internal walls more wettable than the optical chamber inlet conduit; an optical chamber inlet conduit less wettable than the internal walls of the sample storage well; and any combination thereof. As mentioned previously, the stringency of the requirement to mitigate blood flow from the sample storage well into the optical chamber inlet conduit 97C depends on the property of the blood measured.

Cartridge 10D (see FIGS. 13A-13E) is similar to cartridge 10A, except that an analyzer pump is required instead of an air bladder 67A (in cartridge 10A), to provide positive pressure to the closed air passage operatively connecting the analyzer pump communication port 63D to the sample storage well 51 (in cartridge 10D), whereby either positive pressure or negative pressure generated by the analyzer pump is transferable to the sample storage well (see FIG. 13E). Therefore, the use of the analyzer pump may be described as another positive to negative pressure means for creating a blood flow in a direction towards the vent 85D when the pump is operating in a positive pressure mode, and for creating a blood flow in a direction away from the vent 85D when the pump is operating in a negative pressure mode. A reversed mechanism was mentioned previously for cartridge 100 (see FIGS. 12A-12J), in that cartridge 10C provides a negative to positive pressure means, i.e., negative pressure is provided first, and if the optical chamber exit contains one or more reagents, positive pressure may be used to push a mixture of blood and reagent(s) back into the optical chamber.

Shown in FIG. 13A is an exploded perspective top view of a cartridge 10D for measuring at least one property of blood, showing a sealing member 211D installed in cartridge air inlet duct 217D (see FIGS. 13D & 13F), for frictionally engaging an outer surface of a pump hollow needle. Like the analyzer pump discussed regarding cartridge 100, the pump hollow needle comprises a first end operatively connected to the analyzer pump, a second end distal to the first end and operatively connected to the first end, and the outer surface of the pump hollow needle. Shown in FIG. 13B is a bottom view of the first housing member 50D of the cartridge shown in FIG. 13A. Shown in FIG. 13C is a top view of the second housing member 60D of the cartridge shown in FIG. 13A. Shown in FIG. 13D is top view of the cartridge 10D shown in FIG. 13A. Shown in FIG. 13E is an enlarged cross-sectional view through the cartridge 10D shown in FIG. 13D along line E-E, and shown in FIG. 13F is an enlarged cross-sectional view through the cartridge 10D shown in FIG. 13D along line F-F. For clarity, 217D is referred to as a cartridge air inlet duct and 219D is referred to as a cartridge air inlet. In contrast, similar structures 217C and 219C found in cartridge 100 are referred to as a cartridge exit duct and a cartridge exit, respectively. Moreover, it should be noted that cartridge 10D has a vent 85D (see FIG. 13D) similar to vent 85A in cartridge 10A (see FIG. 10H), whereas cartridge 100 does not have a vent like 85A and 85D; instead, cartridge 10C has a cap vent 223C (see FIG. 12F).

Overview of Cartridges 10E and 10F as Non-Limiting Examples

Cartridge 10E (see FIGS. 14A-14Y) is a fifth embodiment of a cartridge that may be used within a system for measuring one or more analyte quantities per unit volume of blood and one or more formed element quantities per unit volume of blood, in a blood sample. Cartridge 10E may also be used for measuring one or more properties of a blood sample, for example, but not limited to, the concentration of bilirubin or hemoglobin, and a leukocyte count. Cartridge 10E comprises a cartridge body having an upper surface and a cartridge lower surface. Shown in FIG. 14A is an exploded top perspective view of a cartridge 10E. In this example, the upper surface is the top surface of a first housing member 50E, and is shown in FIG. 14F. The lower surface is the bottom surface of a second housing member 60E, and is shown in FIG. 14G. The bottom surface is a plain surface having an optical window 83 and a bottom laminate 347E for covering a blister outlet conduit 317E and a transfer conduit 319E (see FIGS. 14G, 14H, 14J & 14L), and these elements are explained below.

Housing members 50E and 60E may be held together by a double-sided sticky gasket 100E as shown in FIG. 14A, however, this is a non-limiting example illustrating how the cartridge (comprising a cartridge body having an upper surface and a lower surface) may be manufactured and assembled. For example, the cartridge may comprise a plurality of members and gaskets, the cartridge may be 3-D printed, or the cartridge may be 3-D printed in combination with a plurality of members and gaskets.

Shown in FIG. 14B is a bottom view of the first housing member 50E of the cartridge shown in FIG. 14A, and shown in FIG. 14C is the bottom view of the first housing member 50E of the cartridge shown in FIG. 14B, overlaid by and in alignment with a gasket 100E shown in FIG. 14A. The cutouts in the gasket 100E are not labeled because FIGS. 14B-14E illustrate how the gasket cutouts are aligned with the first and second housing members 50E and 60E respectively, and a person having ordinary skill in the art should appreciate that the gasket cutouts could be designed differently without affecting the functionality of the cartridge in any significant way.

Shown in FIG. 14H is a top view of the cartridge 10E with the cap 70E in an open position. The cap 70E operates in a similar manner as cartridge 70B in cartridge 10B (see FIGS. 11A-11K), but there are several differences, as illustrated in FIG. 14S, a perspective top view of the cap, and in FIG. 14T, a perspective bottom view of the cap. The top side 73E of the cap 70E comprises a cap vent 85E (see FIG. 14S), and the underside 75E comprises a cap inlet 78E that leads to a cap mixing chamber 79E (see FIGS. 14P & 14Q). Therefore the cap is a hollow cap having an inlet 78E disposed at the underside 75E and a vent 85E disposed at the top side 73E, and the hollow chamber 79E of the cap functions as a mixing chamber and reservoir for altered or diluted blood. The underside 75E of the cap 70E comprises an inlet 78E to the mixing chamber 79E, and a flat surface 76E surrounding the inlet 78E, for mating with a flat surface 59E of the cartridge inlet portion 57E (see FIG. 14A).

In this example, blood and diluent (sometimes referred to as a liquid) are mixed in the mixing chamber 79E to provide diluted blood. It is explained below how a metered volume of blood (for example, 20 µL), is mixed with a metered volume of diluent (for example, 180 µL), to provide a 1:10 diluted blood sample. It was previously explained that some manual hemocytometers use a 1:200 diluted blood in order to count red blood cells. A 1:10 diluted blood sample may provide a compromise between 1:200 dilution and no dilution, for counting both red and white blood cells, using a system described in this application. However, other dilutions are within the scope of the present invention.

The diluent/liquid is stored in a sealed blister 301E, shown in FIGS. 14A, 14H, 14N. A cross-sectional view of the blister 301E is shown in FIG. 14J. The blister 301E may comprise a dome-shaped top, a flat bottom, and a cavity for containing the diluent. Blisters that may be used in the cartridge described herein are also provided in U.S. Pat. No. 9,470,67320 and CA Pat. No. 2,978,737 (to Samsoondar, which is incorporated herein by reference). In FIG. 14J the blister is shown resting on a compressible member 351E so that the spike 329E can only rupture the bottom portion of the blister when force is applied to the top portion of the blister. The blister window 305E (an opening on the top surface of first housing member 50E; see FIG. 14A) may be covered with a paper label, having perforations along a circle slightly smaller than the diameter of the window 305E, so that the paper label is easily torn by a stepper motor actuator, for example, which may be used to apply force on the blister for rupturing the blister. Instead of a sealed blister, other means may be used to provide the diluent or liquid, for example, the liquid/diluent may be stored in an analyzer liquid pouch, the analyzer being associated, or in liquid communication, with the cartridge. The analyzer liquid pouch may comprise collapsible walls and a liquid dispenser for dispensing a metered volume of liquid. Collapsible walls in the analyzer liquid pouch prevents suck back. The analyzer liquid dispenser may comprise a hollow needle (also termed analyzer pump hollow needle), or any other structure (e.g. a ball having a channel for creating fluid connectivity between the cartridge and the analyzer liquid pouch) that can fluidly connect the analyzer liquid pouch and the cartridge. An example of an arrangement that uses a hollow needle is described in U.S. Pat. Appl'n Pub. No. US 2019/0224667 to Samsoondar, which is incorporated herein by reference (see cartridge 10k, illustrated in FIGS. 24A-26E). The analyzer liquid dispenser may also be described as an analyzer pump probe.

After the blister is ruptured, the diluent flows through the hole 331E in the spike 329E, into a diluent holding conduit 303E via a blister outlet conduit 317E (see FIGS. 14H & 14J). The end of the diluent holding conduit 305E close to the blister outlet conduit 317E is referred to as a proximal end, and the other end is referred to as a distal end. A first directional valve element 313E shown in detail in FIG. 14U is installed in a receptor 349E (see FIGS. 14A & 14J). The first directional valve element 313E may be made from an elastomeric material, for example, which should not be considered limiting in any way, PDMS (polydimethylsiloxane). In this example, diluent flowing out of the blister outlet conduit 317E cannot flow back into the blister because the pressure closes the flap 315E of the valve element 313E, and seals off receptor 349E. In other words, valve element 313E functions as a check valve.

At the distal end of the diluent holding conduit 303E, a second directional valve element or valve stem 321E (see FIGS. 14V-14Y) is shown in the up (open) position, and air is allowed to escape through a diluent vent 325E (see FIG. 14P). An O-ring 337E (see FIGS. 14W-14Y) provides a seal between the second housing member 60E and the bottom flange 335E of element 321E of the second directional valve. While the step 321E is in the up position (see FIG. 14P), the analyzer may be programmed to force diluent from the blister 301E until a slight excess of diluent escapes past the diluent vent 325E (i.e. thereby filing or priming the diluent holding conduit 303E). A metered volume of diluent can be sequestered in the diluent holding conduit 303E by pushing the element 321E down (see FIG. 14L). As an example, a stepper motor actuator or a solenoid actuator in the analyzer may be used to push the valve stem 321E down, and keep the stem 321E in the down position. A resilient means, for example a spring, may be used to keep the valve stem in the up position, and the valve stem 321E must be pushed downward in order to keep it in the down position. Cartridge 10F (FIGS. 15A-15X) provides an example of a spring 235F used to keep element 321F in the up position (see FIG. 15N).

In some embodiments, the position of the valve stem 321E may be controlled using a metal insert in the valve stem, wherein the metal is capable of being attracted to one or more electromagnets installed in the analyzer above the valve element, below the valve element, or a combination thereof. By activating one of the electromagnets, the valve element may be pulled towards the activated electromagnet. When the analyzer comprises an electromagnet above and below the valve elements, a resilient means, for example a spring, may not be required to reverse the valve stem position. With a single electromagnet, a resilient means, such as a spring, may be required to reverse valve stem position. A person skilled in the art would understand that a spring can be installed above or below the valve element. Instead of a spring, other types of resilient means may be used, for example a diaphragm made from a resilient material, and a ball may be used as the valve stem. Some of these examples are described in U.S. Pat. Appl'n Pub. No. US 2019/0224667 (which is incorporated herein by reference).

With the stem 321E the up position and the diluent holding conduit 303E primed, the blood sample is deposited in the sample storage well 51 through the top opening 53 (see FIGS. 14H & 14M). The blood flow cannot proceed beyond the blood vent 323E (see FIG. 14P) because there is insufficient capillary action to allow the blood to leave the blood vent 323E. The valve stem 321E is preferably made from hydrophobic material, for example PTFE (polytetrafluoroethylene), and the sealing surfaces 343E and 345E (see FIGS. 14X & 14Y) may comprise, for example, a layer of elastomeric material to provide more efficient seals. With the position of the leading end of the blood determined, the blood volume is metered by skimming off excess blood at the sample storage well inlet 53 (i.e., the trailing end of the blood sample) when the cap 70E is closed. Therefore, with the valve stem 321E in the up position as shown in FIG. 14P, the cartridge can meter the volumes of both the diluent and the blood. By pushing the stem 321E down, the face 345E closes of both the blood vent 323E and the diluent vent 325E (see FIG. 14L), and fluid connection between the diluent and the blood is established.

After the fluid connection between the diluent and blood is established, the air bladder may be activated to provide positive air pressure, to push a metered volume of diluent into a metered volume of blood (at the leading end of the blood), whereby the blood and diluent are both pushed into the mixing chamber 79E (see FIG. 14L in conjunction with FIG. 14P) through the cap inlet 78E (see FIG. 14T). The diluent and the blood become mixed as the two flow into the large mixing chamber 79E in the cap 70E. Any trapped air is allowed to rise to the top of the mixing chamber 79E. The analyzer is programmed to provide sufficient pressurized air to ensure all the metered diluent enters the mixing chamber, and air in the mixing chamber escapes through the cap vent 85E (see FIG. 14S). Virtually all the metered blood should be washed away by the much larger volume of diluent (depending on the required dilution factor). By releasing the air bladder to sufficiently decrease the pressure in the optical chamber, the diluted blood is drawn into the optical chamber 13, via the optical chamber inlet conduit 97E and the optical chamber outlet exit conduit 99E (see FIGS. 14H & 14N). The diluted sample in the optical chamber is now ready for sample interrogation. FIG. 14P viewed in conjunction with FIGS. 14S & 14T provides an illustration of the cap mixing cavity 79E of hollow sliding cap 70E, slidably attached to the upper surface of cartridge 10E (see FIGS. 14N &14R). The cap mixing cavity 79E is defined by an upper cap wall (represented by the top side 73E shown in FIG. 14S), a lower cap wall (represented by the underside 75E shown in FIG. 14T), and side walls connecting the upper cap wall with the lower cap wall (shown unlabeled in the cross-sectional view FIG. 14P).

Figure 15A:
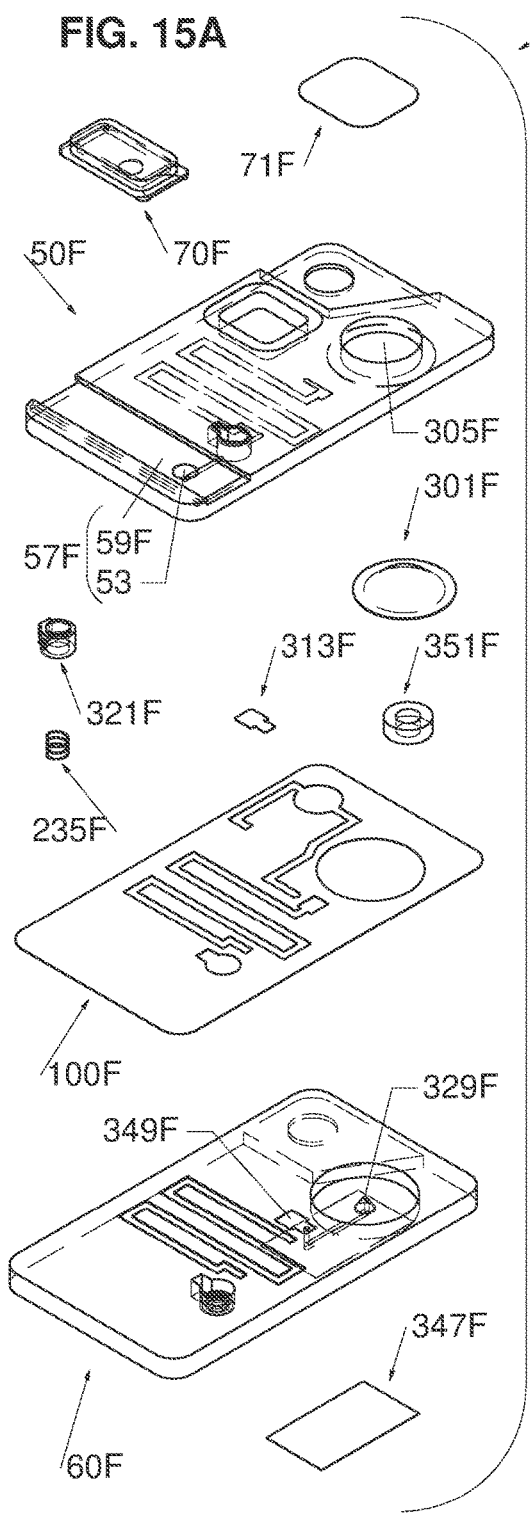
FIG. 15A is an exploded perspective top view of a cartridge 10F for measuring at least one property of blood, according to a sixth embodiment of the cartridge.
Figure 15B:
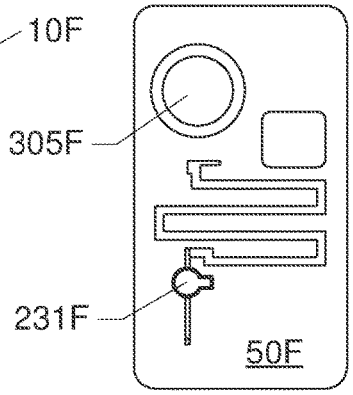
FIG. 15B is a bottom view of the first housing member 50F of the cartridge shown in FIG. 15A.
Figure 15C:
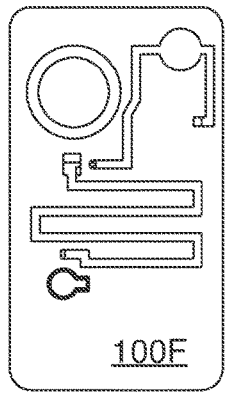
FIG. 15C is the bottom view of the first housing member 50F of the cartridge shown in FIG. 15B, overlaid by and in alignment with a gasket 100F shown in FIG. 15A.
Figure 15D:
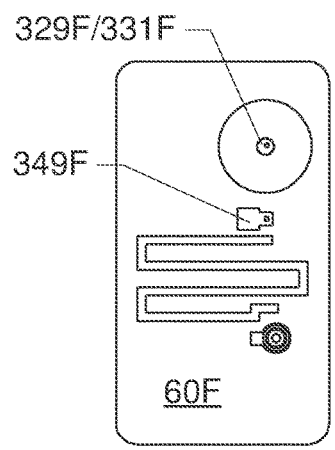
FIG. 15D is a top view of the second housing member 60F of the cartridge shown in FIG. 15A.
Figure 15E:
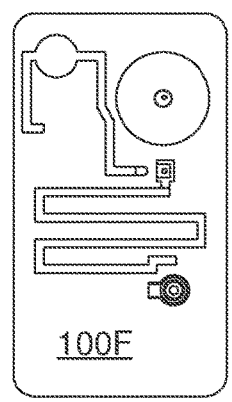
FIG. 15E is the top view of the second housing member 60F shown in FIG. 15D, overlaid by and in alignment with the gasket 100F shown in FIG. 15A.
Figure 15F:
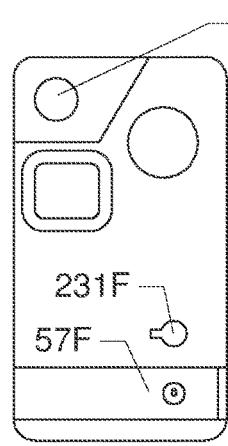
FIG. 15F is a top view of the cartridge 10F shown in FIG. 15A with the cap removed.
Figure 15G:
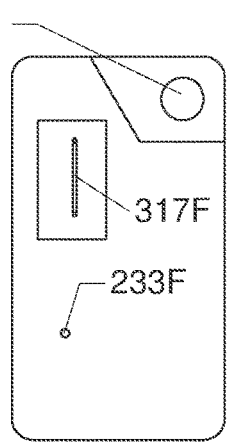
FIG. 15G is a bottom view of the cartridge 10F shown in FIG. 15A.
Figure 15H:
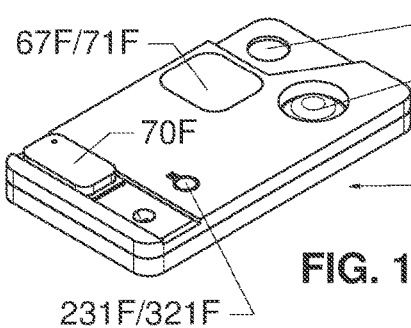
FIG. 15H is a perspective top view of the cartridge 10F shown in FIG. 15A with the cap in an open position.
Figure 15J:
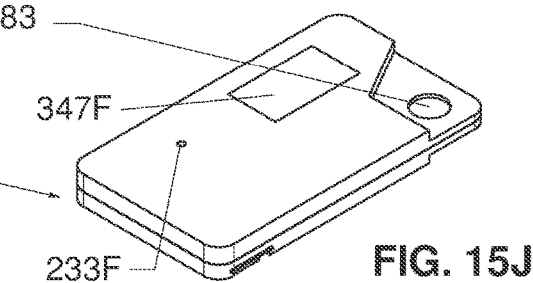
FIG. 15J is a perspective bottom view of the cartridge 10F shown in FIG. 15A.
Figures 15K, 15L, 15N:
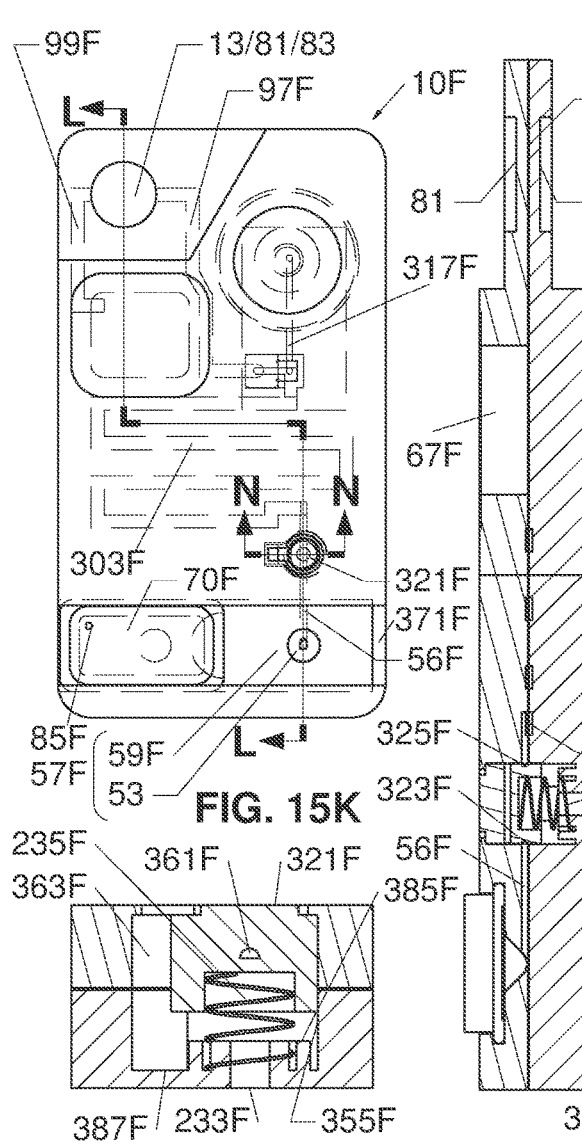
FIG. 15K is a top view of the cartridge 10F shown in FIG. 15A with the cap in an open position and the directional valve stem 321F in an up position (see FIG. 15N)
FIG. 15L is an enlarged cross-sectional view through the cartridge 10F shown in FIG. 15K along line L-L.
FIG. 15N is an enlarged cross-sectional view through the cartridge 10F shown in FIG. 15K along line N-N, showing the directional valve stem 321F in an up position.
Figures 15M, 15P, 15Q:
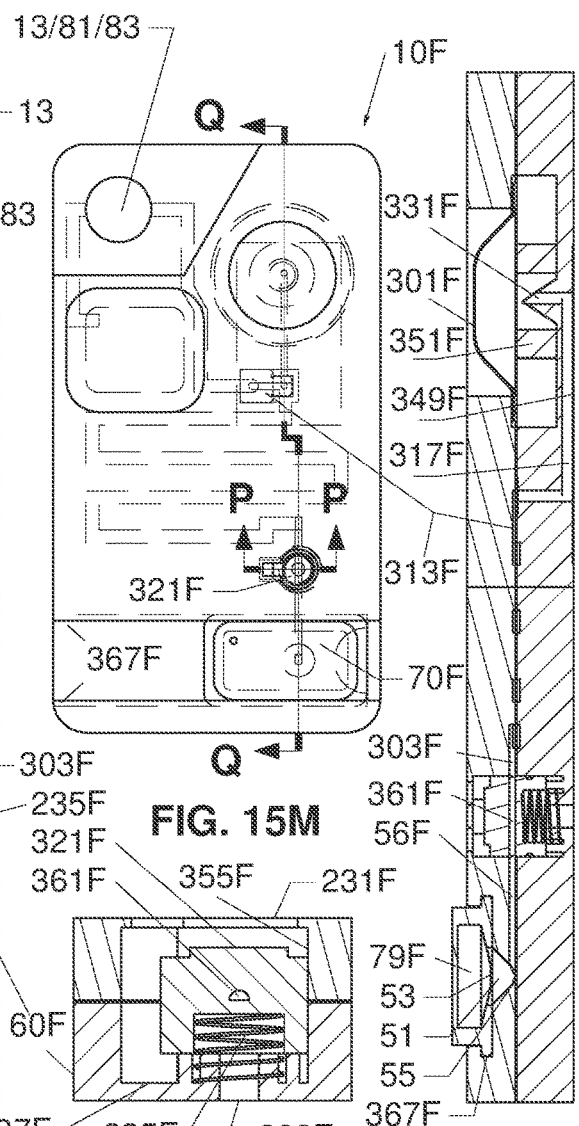
FIG. 15M is a top view of the cartridge 10F shown in FIG. 15A with the cap in a closed position and the directional valve stem 321F in a down position (see FIG. 15P)
FIG. 15P is an enlarged cross-sectional view through the cartridge 10F shown in FIG. 15M along line P-P showing the directional valve stem 321F in a down position.
FIG. 15Q is an enlarged cross-sectional view through the cartridge 10F shown in FIG. 15M along line Q-Q.
Figure 15R:
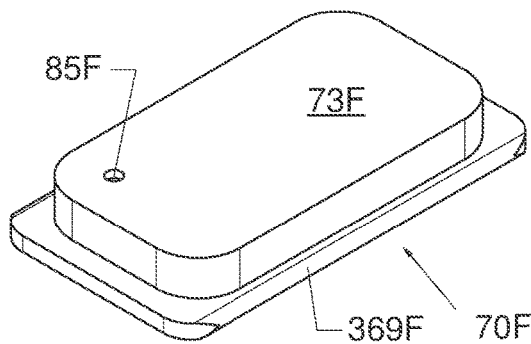
FIG. 15R is a perspective top view of the cap 70F of cartridge 10F.
Figure 15S:
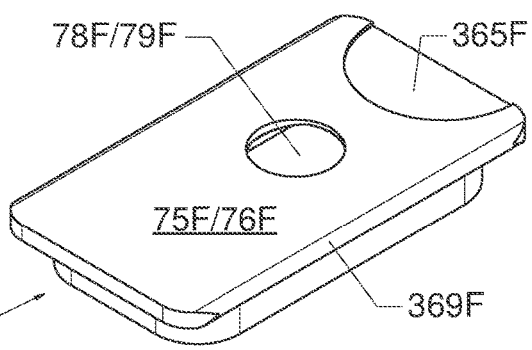
FIG. 15S is a perspective bottom view of the cap 70F of cartridge 10F.
Figure 15T:
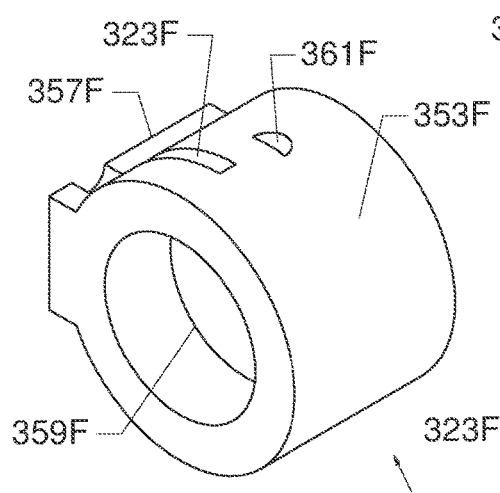
FIG. 15T is a first perspective view of a directional valve stem 321F showing the bottom side.
Figure 15U:
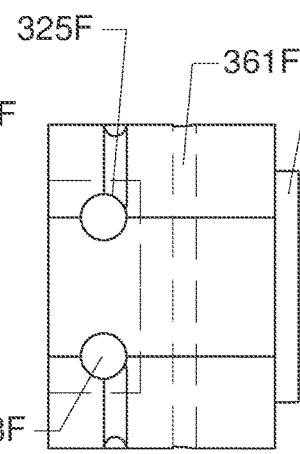
FIG. 15U is a left side view of a directional valve stem 321F shown in FIG. 15V.
Figure 15V:
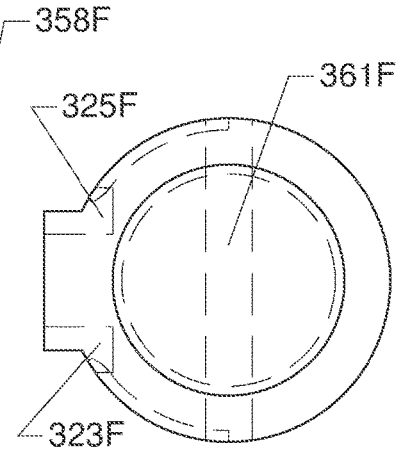
FIG. 15V is a top view of a directional valve stem 321F.
Figure 15W:
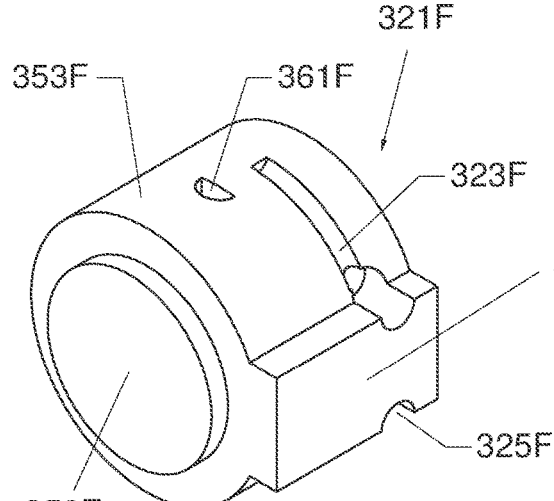
FIG. 15W is a second perspective view of a directional valve stem 321F showing the top side.

Cartridge 10F (see FIGS. 15A-15X) is a sixth embodiment of a cartridge that may be used for measuring one or more properties of a blood sample. Cartridge 10F is similar to cartridge 10E, and operation of cartridge 10F is similar to the operation of cartridge 10E. Some major differences are: a) design of the cap 70F (details shown in FIGS. 15R-15S); and b) design of the second directional valve stem 321F (details shown in FIGS. 15T-15X).

a) Shown in FIG. 15R is a perspective top view of the cap 70F of cartridge 10F, showing one of one or more cap male tracks 369F for frictionally engaging with one or more cartridge female tracks 367F (see FIGS. 15M & 15Q). In this non-limiting example, two cap male tracks 369F engage with two cartridge female tracks 367F. In some embodiments the cartridge tracks may be configured as cap male tracks, and the cap tracks may be configured as cap female tracks. Also show in FIG. 15R are a top side 73F and a cap vent 85F of the cap 70F. Shown in FIG. 15S is a perspective bottom view of the cap 70F of cartridge 10F, showing an underside 75F and a cap flat surface 76F for frictionally engaging with a flat surface 59F of a sample inlet portion 57F of cartridge 10F (see FIG. 15K). Also shown in FIG. 15S are a cap inlet 78F to a mixing chamber 79F, and a groove 365F in cap 70F for storing excess sample; some modified cartridge 10E may comprise a groove 94E disposed in the inlet portion 57E for storing the excess sample.

b) Shown in FIG. 15T is a first perspective view of the directional valve stem 321F showing a recess 359F disposed in the bottom side, and shown in FIG. 15W is a second perspective view of the directional valve stem 321F showing a boss 358F disposed in the top side. The recess 359F is useful for locating a spring 235F, which is a non-limiting example of a means for keeping valve stem 321F in an up position (see FIGS. 15N & 15L). The boss 358F has a diameter slightly smaller than the diameter of a hole 231F in the first housing member 50F of cartridge 10F (see FIG. 15F), for allowing only partial protrusion of valve stem 321F and keeping the valve stem in the up position (see FIGS.

Figure 15X:
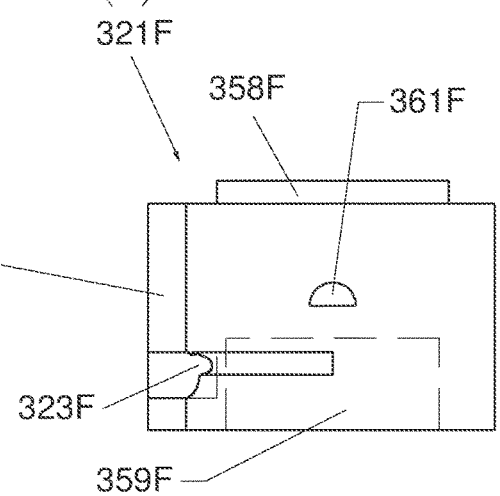
FIG. 15X is a front view of a directional valve stem 321F shown in FIG. 15V.

15N & 15P). Shown in FIGS. 15U, 15V &15X are a left side view, a top view and a front view respectively of the directional valve stem 321F shown in FIGS. 15T & 15W, showing the following details: a blood vent 323F for facilitating filling of the sample storage well 51; a diluent vent 325F for facilitating filling of the diluent holding conduit 303F (see FIG. 15K); a conduit 361F through the valve stem 321F for fluidly connecting the diluent holding conduit 303F (see FIG. 15K) and the extension 56F of the bottom opening 55 of sample storage well 51 (see FIG. 15Q); and a projection 357F for preventing rotation of valve stem 321F about the axis of the cylindrical portion of the valve stem 321F and facilitating alignment of valve stem conduit 361F with bottom opening 55 of sample storage well 51 and diluent holding conduit 303F. This alignment facilitates diluent flow from diluent holding conduit 303F into blood held in sample storage well 51.

Shown in FIG. 15A is an exploded perspective top view of cartridge 10F, showing the cap 70F and the second directional valve stem 321F. Also shown is a spring 235F, which is a non-limiting example of a means for keeping the valve stem 321F in an up position. A similar spring may also be used with cartridge 10E, previously described.

Shown in FIG. 15B is a bottom view of the first housing member 50F of the cartridge shown in FIG. 15A, and shown in FIG. 15C is the bottom view of the first housing member 50F of the cartridge shown in FIG. 15B, overlaid by and in alignment with a gasket 100F shown in FIG. 15A. Also shown in FIG. 15B is a hole 231F in the first housing member 50F for partial protrusion of valve stem 321F, and a blister window 305F in the first housing member 50F for accessing the sealed blister 301F for the purpose of rupturing the blister 301F.

Shown in FIG. 15D is a top view of the second housing member 60F of the cartridge shown in FIG. 15A, and shown in FIG. 15E is the top view of the second housing member 60F shown in FIG. 15D, overlaid by and in alignment with the gasket 100F shown in FIG. 15A. Also shown in FIG. 15D is a cavity (or receptor) 349F for housing the first directional valve element 313F (shown in FIGS. 15A, 15M & 15Q), and a spike 329F for rupturing the sealed blister 301F, the spike 329F having a hole 331F for draining fluid from the ruptured blister 301F into diluent holding conduit 303F via blister outlet conduit 317F (see FIGS. 15E & 15Q). The first directional valve element 313F is disposed at the junction of conduit 317F and conduit 303F, which for example, could be an elastomeric flap that functions as a check valve (see FIG. 15Q).

Shown in FIG. 15F is a top view of the cartridge 10F shown in FIG. 15A with the cap removed, and showing the hole 231F for partial protrusion of valve stem 321F. Also shown is an optical chamber 13 and a sample inlet portion 57F. Shown in FIG. 15G is a bottom view of the cartridge 10F shown in FIG. 15A, showing a hole 233F in the second housing member 60F for optionally accessing valve stem 321F, and a blister outlet conduit 317F for transferring blister fluid from blister 301F after it is ruptured, to the diluent holding conduit 303F (see FIG. 15K).

Shown in FIG. 15H is a perspective top view of the cartridge 10F shown in FIG. 15A with the cap 70F in an open position, and shown in FIG. 15J is a perspective bottom view of the cartridge 10F.

Shown in FIG. 15K is a top view of the cartridge 10F shown in FIG. 15A with the cap 70F in an open position and the directional valve stem 321F in an up position. Shown in FIG. 15N is an enlarged cross-sectional view through the cartridge 10F shown in FIG. 15K along line N-N, and shown in FIG. 15L is an enlarged cross-sectional view through the cartridge 10F shown in FIG. 15K along line L-L. Also shown in FIGS. 15L and 15N is a spring 235F, which keeps the valve stem 321F in the up position. With the valve stem 321F in an up position (see FIG. 15L), blood vent 323F and diluent vent 325F are brought into alignment with common vent 363F (see FIG. 15N), whereby there is no fluid communication between blood and diluent because conduit 361F in valve stem 321F is isolated when the valve stem 321F is in the up position. Details of valve stem 321F are provided in FIGS. 15T-15X. Any diluent or blood entering the common vent 363F will fall into trough 387F (see FIG. 15N). Also show in FIG. 15N is a valve stem stop 385F for locating the valve stem 321F in the down position, and a surface 355F on cartridge 10F for frictionally engaging surface 353F (see FIGS. 15T & 15 W) of valve stem 321F.

Shown in FIG. 15M is a top view of the cartridge 10F with the cap 70F in a closed position and the directional valve stem 321F in a down position. Shown in FIG. 15P is an enlarged cross-sectional view through the cartridge 10F shown in FIG. 15M along line P-P, and shown in FIG. 15Q is an enlarged cross-sectional view through the cartridge 10F shown in FIG. 15M along line Q-Q. In the down position, blood vent 323F and diluent vent 325F are brought into alignment with conduit 361F of valve stem 321F for fluidly connecting the diluent holding conduit 303F and the extension 56F of bottom opening 55 of sample storage well 51. The alignment of the conduits is facilitated by the valve stem stop 385F shown in FIG. 15N, projection 357F on valve stem 321F for preventing rotation of valve stem 321F about the axis of the cylindrical portion of the valve stem 321F, and downward force applied to the valve stem 321F.

Although cartridges 10E and 10F comprise air bladders 67E and 67F respectively as the means for moving the blood sample and the altered blood sample, other means may be used for example an analyzer pump attachable to the cartridge body, as described for cartridge 10C (see FIGS. 12A-12J), cartridge 10J (see FIGS. 18A-19H) and cartridge 10K (see FIGS. 20A-21F), whereby instead of the air bladders, the analyzer pump provides positive to negative pressure means or negative to positive pressure means for moving the blood sample and the altered blood sample.

Sample Measurement Using Cartridges 10E and 10F as Non-Limiting Examples

The following is a description of a method for measuring one or more properties of a blood sample, using cartridge 10E or 10F as a non-limiting example. The method comprises some or all of the following steps, not necessarily in the sequence given:

a) providing one of cartridge 10E or 10F in an open configuration, and with a second directional valve stem in an up position;
b) providing an analyzer comprising:
 1. a receptor for receiving the cartridge;
 2. at least one source of EMR for interrogating at least some of the blood sample when the blood sample is positioned within the optical chamber of the cartridge;
 3. at least one of a one-dimensional multi-channel detector and a two-dimensional multi-channel detector;
 4. at least one analog to digital converter;
 5. at least one processor for controlling the analyzer and processing data; and
 6. means for activating an air bladder housed within the cartridge body, or means for activating an analyzer pump attachable to the cartridge body;

c) depositing the blood sample from a body part or from a syringe, into the sample storage well, so that some of the sample bulges above the top opening of the sample storage well;

d) sliding the cartridge cap, thereby adjusting the cartridge from an open configuration (or a first position) to a closed configuration (or a second position), thereby metering the volume of blood to be diluted, and establishing fluid communication between the sample storage well and the cap mixing chamber;

e) inserting the closed cartridge into the receptor of the analyzer f) releasing the diluent from the sealed blister or an analyzer diluent pouch, and filling the diluent holding conduit with a slight excess of diluent;

g) adjusting the second directional valve stem from an up position to a down position, thereby metering the volume of diluent to be used for diluting the metered volume of blood, and establishing fluid communication between the metered volume of blood and the metered volume of diluent;

h) squeezing the air bladder or activating the air bladder for providing positive air pressure, thereby pushing virtually all of the metered blood and metered diluent into the cap mixing chamber, and thereby providing diluted blood in the cap mixing chamber;

i) releasing the air bladder or activating the air bladder for providing negative air pressure, thereby urging the diluted blood into the optical chamber (squeezing and releasing the air bladder may be repeated if necessary, depending on the ratio of diluent to blood volume, for more effective mixing);

j) interrogating the diluted blood sample with the at least one source of EMR; and k) measuring the one or more properties of the blood sample.

Overview of Cartridges 10G and 10H as Non-Limiting Examples

Cartridge 10G (see FIGS. 16A-16P) is a seventh embodiment of a cartridge for measuring one or more properties of a blood sample, comprising two detection chambers: an optical chamber and an electrochemical sensor chamber (also referred to as a biosensor chamber, a biosensor conduit, or an electrochemical sensor chamber/conduit). In other similar embodiments, the detection chamber may include an optical chamber with no electrochemical sensor chamber, for example cartridge 10H, which is discussed next. Yet, in other similar embodiments, the detection chamber may include an electrochemical sensor chamber with no optical chamber, for example cartridges 10J (see FIGS. 18A-19H) and 10K (see FIGS. 20A-21F), discussed below in a separate section. Cartridge 10G has some similarities to cartridge 10F; the major differences are as follows: a) cartridge 10G comprises an electrochemical sensor array 375G, and the fluid in blister 301G is used to calibrate the electrochemical sensors (the fluid blister 301F in cartridge 10F may contain fluid for diluting the blood sample, with or without other reagents, according to a pre-determined dilution ratio); b) the second directional valve element 321F (see FIG. 15K) is not required because the blister fluid or liquid is not used to dilute the blood; c) the cap 70G is similar to cap 70H shown in FIGS. 17D & 17E, and comprises a cap recess 77G (see 77H in FIG. 17E) instead of a vented mixing chamber 79F (see FIGS. 15Q & 15S), d) cartridge 10G comprises an optional enlarged cavity 241G disposed between optical chamber 13 and biosensor chamber inlet 377G (see FIGS. 16K & 16N), which may be used to insert an air bubble between the calibration fluid and the blood to prevent mixing of the calibration fluid and the blood, and to assist in removing residual calibration fluid from the biosensor chamber before the blood flows into the biosensor chamber; the enlarged cavity 241G may also receive excess blood volume leaving the optical chamber 13, and consequently restrict blood flow between the optical chamber exit conduit 99G and the enlarged cavity 241G; e) the sample inlet portion 57G (see FIG. 16A) also comprises an air bladder communication port 63G, for communicating pressurized air from the air bladder 67G to the sample storage well 51 (see FIGS. 16K-16M), when the cap 70G is in a closed or sealed configuration; e) cartridge 10G comprises a cartridge vent 85G for relieving pressure in the optical chamber 13 and electrochemical sensor chamber 379G, instead of a cap vent 85F, and f) cartridge 10G comprises an optional hydrophobic insert 225G disposed close to the junction of the bottom opening 55 of the sample storage well 51 and the optical chamber inlet conduit 97G of cartridge 10G (see FIG. 16P), for providing means for minimizing, mitigating, or modifying blood flow out of the sample storage well 51.

Shown in FIG. 16A is an exploded perspective top view of the cartridge 10G. Shown in FIG. 16B is a bottom view of the first housing member 50G of the cartridge shown in FIG. 16A, and shown in FIG. 16C is the bottom view of the first housing member 50G of the cartridge shown in FIG. 16B, overlaid by and in alignment with a gasket 100G shown in FIG. 16A. Shown in FIG. 16D is a top view of the second housing member 60G of the cartridge shown in FIG. 16A, showing a cavity (or receptor) 349G for housing the first directional valve element 313G (compare with similar cavity 349F in cartridge 10F, shown in FIG. 15D), and a recess 229G for installing an optional hydrophobic insert 225G, and shown in FIG. 16E is the top view of the second housing member 60G shown in FIG. 16D, overlaid by and in alignment with the gasket 100G shown in FIG. 16A. Shown in FIG. 16F is a top view of the cartridge 10G shown in FIG. 16A with the cap 70G removed, showing sample inlet portion 57G and optical chamber 13. Shown in FIG. 16G is a bottom view of the cartridge 10G shown in FIG. 16A, showing optical chamber 13, and a blister outlet conduit 317G for transferring blister fluid from blister 301G after it is ruptured, to the biosensor conduit 379G (see FIG. 16P).

Shown in FIG. 16H is a perspective top view of the cartridge 10G shown in FIG. 16A with the cap in an open position (or first position or unsealed configuration), and shown in FIG. 16J is a perspective bottom view of the cartridge 10G shown in FIG. 16A, showing bottom laminate 347G (see FIG. 16A), which is used to cover blister outlet conduit 317G shown in FIG. 16G.

Shown in FIG. 16K is a top view of the cartridge 10G shown in FIG. 16A with the cap in a closed position (or second position or sealed configuration). Shown in FIG. 16L is a first enlarged cross-sectional view through the cartridge 10G shown in FIG. 16K along line L-L, showing the fluid connection between the blister 301G and the electrochemical sensor chamber inlet conduit 377G, and the air bladder 67G. Shown in FIG. 16M is a second enlarged cross-sectional view through the cartridge 10G shown in FIG. 16K along line M-M, showing the closed air passage operatively connecting the air bladder communication port 63G to the sample storage well 51 so that positive pressure is transferable from the air bladder 67G to the sample storage well 51, when the cartridge cap 70G is in a closed configuration. Shown in FIG. 16N is a third enlarged cross-sectional view through the cartridge 10G shown in FIG. 16K along line N-N, showing a shut 82G for bypassing optical chamber 13 of cartridge 10G when blood is urged into the electrochemical sensor chamber 379G, and orientation of elastomeric flap 313G relative to the blister outlet conduit 317G and the electrochemical sensor chamber inlet conduit 377G. Shown in FIG. 16P is a fourth enlarged cross-sectional view through the cartridge 10G shown in FIG. 16K along line P-P, showing the compressible member 351G supporting the blister 301G, and the position of cap recess 77G over the sample storage well 51 when the cap 70G is in a sealed configuration or second position.

Cartridge 10H (see FIGS. 17A-17E) is an eight embodiment of a cartridge for measuring one or more properties of a blood sample, comprising an optical chamber 13, and using spectroscopic measurement discussed previously in this application. Cartridge 10H is similar to cartridge 10G (see FIGS. 16A-16P), except that cartridge 10H does not comprise electrochemical sensors, and consequently does not comprise means for calibrating electrochemical sensors (see 375G of cartridge 10G in FIGS. 16A & 16K). Cartridge 10H is also similar to cartridge 10A (see FIGS. 10A-10K), a major difference is that cartridge 10H comprises an unhinged sliding cap 70H instead of a hinged non-sliding cap 70A. Cartridge 10H is also similar to cartridge 10B (see FIGS. 11A-11K); a first major difference is that cartridge 10B comprises a hinged sliding cap 70B, and a second difference is that cartridge 10B comprises a conductivity sensor 200 comprising a pair of conductivity electrodes (also referred to as probes), for performing several functions, e.g., controlling air bladder stepper motor and measuring hematocrit. Some modifications of cartridge 10H may comprise a similar conductivity sensor 200 for performing similar functions. Cartridge 10H is also similar to cartridge 10D (see FIGS. 13A-13E); a major difference is that cartridge 10D does not comprise an air bladder 67H, and instead a pump from an associated analyzer is required, instead of an air bladder, to provide positive and negative pressure to the closed air passage operatively connecting the analyzer pump communication port 63D to the sample storage well 51 so that either positive pressure or negative pressure is transferable to the sample storage well (see FIG. 13E). Therefore, the pump from an associated analyzer ant its use may be described as a positive to negative pressure means for creating a blood flow in a direction towards the vent 85D and creating a blood flow in a direction away from the vent 85D. A reversed mechanism was mentioned previously for cartridge 10C (see FIGS. 12A-12J), in that a pump from an analyzer associated with cartridge 10C provides a negative to positive pressure means, i.e., negative pressure is provided first, and if the optical chamber exit 99H contains one or more reagents, positive pressure may be used to push a mixture of blood and reagent(s) back into the optical chamber 13. Therefore, some modifications of cartridge 10H may comprise a vented (see vent 223C in FIGS. 12E & 12J) unhinged sliding cap. Moreover, any of the features described previously may be incorporated in cartridge 10H, as a person having ordinary skill in the art should appreciate.

Shown in FIG. 17A is a top view of the cartridge 10H for measuring at least one property of blood, according to an eight embodiment of the cartridge, shown with the cap 70H in an open position (or first position or unsealed configuration), showing a sample inlet portion 57H, which comprises some elements of the cartridge that interacts with the cap 70H, for example, a flat surface 59H, a top opening (or top portion) 53 of a sample storage well 51, and an air bladder (shown as 67H having a flexible member 71H) communication port 63H. Also shown are an optical chamber (shown as 13, comprising a first and second optical windows 81 and 83 respectively) inlet conduit or pre-optical chamber conduit 97H, an optical chamber exit conduit or post-optical chamber conduit 99H that is in fluid connection with a vent 85H for relieving pressure in the optical chamber 13. Also shown is an air bladder duct 65H for providing fluid connection between an air bladder 67H and an air bladder communication port 63H. Shown in FIG. 17C is an enlarged cross-sectional view through the cartridge 10H shown in FIG. 17A along line C-C, showing the air bladder communication port 63H, the cap recess 77H, and the sample storage well 51. When the cap 70H is slid into a closed position (or second position or sealed figuration), the cross-sectional view looks like the cross-sectional view shown in FIG. 16M for cartridge 10G, which illustrates a closed air passage connecting the air bladder duct 65G with the sample storage well 51, via the air bladder communication port 63G and the cap recess 77G. Also shown is a cap stop 371H for aligning at least a portion of cap recess 77H and cartridge top opening 53 of sample storage well 51. A perspective top view of the cartridge 10H is shown in FIG. 17B, also showing cartridge tracks 367H for guiding linear motion of cap 70H. In this non-limiting example, two female cartridge tracks are shown; in some embodiments, the one or more cartridge tracks may be configured as male cartridge tracks. Although linear motion of the cap is illustrated, angular motion of a sliding cap on tracks is considered to be within the scope of the present application. In other words, the cap may travel in either a straight line or travel along an arc.

Shown in FIG. 17D is a perspective top view of the cap 70H (similar to cap 70G) of cartridge 10H, showing a top side 73H and a male cap tracks for frictionally engaging with one or more female cartridge tracks 367H (see FIG. 17B). In this non-limiting example, two male cap tracks are shown for engaging the two female cartridge tracks 367H. In some embodiments comprising cartridge male tracks, the cap tracks may be configured as cap female tracks. Shown in FIG. 17E is a perspective bottom view of the cap 70H showing an underside 75H comprising a cap flat surface 76H. Also shown is a cap recess 77H set in the cap underside, but in some cartridge embodiments, the groove may set in the sample inlet portion 57H, or a combination thereof. Also shown is a groove 365H for storing excess sample, but the groove in some cartridge embodiments may be set in the inlet portion 57H, as for example 94E shown in FIG. 14A regarding cartridge 10E.

Spectroscopic Sample Measurement (Using Cartridges 10G and 10H as Non-Limiting Examples)

The following is a brief description of a system for spectroscopic measurement of one or more properties of a blood sample using cartridge 10H as a non-limiting example. Subsequently a system fora combination of spectroscopic and electrochemical measurements of one or more properties of a blood sample using cartridge 10G as a non-limiting example, is briefly described. The systems comprise the cartridge and an associated analyzer. The analyzers may comprise at least: a) a source of electromagnetic radiation (EMR) for interrogating the sample when some of the blood sample is present in the optical chamber of the cartridge; b) a receptor for receiving the cartridge; c) an EMR dispersing element for dispersing EMR emerging from the blood in the optical chamber into wavelength-specific EMR; d) one or more photodetectors for receiving the wavelength-specific EMR and sending electrical signals to one or more analog to digital converters; e) one or more analog to digital converters for converting the electrical signals from the photodetectors into digital data; f) one or more processors for controlling the analyzer and calculating the one or more properties of the blood sample from the digital data; and g) means for activating the air bladder in the cartridge, or activating a pump associated with an analyzer. A block diagram of a non-limiting example of a system just described is shown in FIG. 2, absent the beam splitter 16a and the two-dimensional multi-channel detector 22a (30a, lower panel). An example of an output display for such a system is shown as 39a (upper right panel) as non-limiting example. With the inclusion of the beam splitter 16a and the two-dimensional multi-channel detector 22a, an example of an output display is shown as 37a. Although the EMR dispersing element 28a of system 30a is shown as a dispersion prism, it may also be a transmission grating (see 28b in FIG. 3), or a reflecting grating (see 28c in FIG. 4).

Cartridge 10G is a modified version of cartridge 10H, wherein an array of electrochemical sensor 375G is included down-stream of the optical chamber. The fluid in the optional blister 301G may be used to calibrate one or more of the electrochemical sensors in the array 375G.

The following is a description of a method for measuring one or more properties of a blood sample, using one of the cartridges previously described explicitly or implicitly. The method comprises some or all of the following steps, not necessarily in the sequence given: a) providing the cartridge in an unsealed configuration; b) providing an associated analyzer; c) obtaining a blood sample by pricking a body part and depositing the blood sample into the sample storage well, or depositing blood from a syringe into the sample storage well; d) sliding the cartridge cap along tracks and skimming off any excess blood, thereby arranging the cartridge in a sealed configuration, wherein the cap recess facilitates provision of a closed air passage connecting the air bladder communication port (or an analyzer pump communication port as shown in FIG. 13D as 63D) and the sample storage well for communicating pressurized air from the air bladder communication port to the sample storage well for urging the blood towards the optical chamber; e) inserting the sealed cartridge into the analyzer receptor; f) activating the air bladder or associated analyzer pump for providing the pressurized air; g) dissolving the optional one or more reagents into the blood; h) urging the blood or mixture of blood and the optional one or more reagents into the optical chamber; and i) measuring the one or more properties of the blood sample.

Electrochemical Sensor Sample Measurement (Using Cartridges 10G as Non-Limiting Example)

After the blood sample in the sample storage well 51 is urged to flow, a blood flow path is established. The blood makes two separate stops. The blood flow path begins at the sample storage well 51 and makes a first stop at a point between the optical chamber exit conduit 99G and the enlarged cavity 241G. In order for the blood to flow from the sample storage well 51 to the optical chamber exit conduit 99G, the blood may flow through the optical chamber 13, through the shunt 82G or any similar structure surrounding the optical chamber 13, or a combination thereof. Therefore, the term "blood flowing out of the optical chamber" may imply blood flowing through the optical chamber and/or any shunt-like structure. After the first stop, the spectroscopic measurement is performed as previously described.

At any time the calibration fluid blister 301G is ruptured by applying force to the top of blister, pushing the blister 301G against a spike 329G (see FIG. 16L), a calibration fluid flow path is established. The calibration fluid flow path begins at the calibration fluid pouch 301G and terminates at a point between the electrochemical sensor chamber exit 381G and the vent 85G, via a waste receptacle 383G. Since both the calibration fluid and the blood must pass through the electrochemical sensor chamber 379G, the blood flow path and the calibration fluid flow path share a common path. The common path begins at an optional elastomeric flap 313G and terminates at a point between the electrochemical sensor chamber exit 381G and the vent 85G. The elastomeric flap 313G is also referred to as a first directional valve element, because it directs calibration fluid flow towards the electrochemical sensors 375G and prevents back flow towards the optical chamber 13.

After spectroscopic measurement and calibration of the electrochemical sensors, the system is arranged for electrochemical measurement of the blood. At this point, the blood and the calibration fluid is separated by an air bubble. Further activation of the air bladder forces the blood into the electrochemical sensor chamber 379G (see FIG. 16P) for electrochemical measurement of the blood. The air bubble, in addition to preventing mixing of the blood and calibration fluid, is also useful for removing residual calibration fluid from the electrochemical sensor chamber 379G.

Overview of Cartridges 10J and 10K as Non-Limiting Examples

Cartridge 10J (see FIGS. 18A-19H) is a ninth embodiment of a cartridge and cartridge 10K (see FIGS. 20A-21F) is a tenth embodiment of a cartridge used with an analyzer for measuring one or more properties of blood. Shown in FIG. 18A and FIG. 20A are exploded perspective top views of a cartridges 10J and 10K respectively. Like cartridges 10F, 10G and 10H, cartridges 10J and 10K comprise a sliding cap (e.g. 70J shown in FIG. 19A) and two tracks (e.g. 367J shown in FIGS. 19C, 19G & 19H) that slidingly attach the sliding cap 70J to the body of cartridge 10J so that the cap flat surface 76J (see FIG. 19E) faces and slides along the flat surface 59J of the inlet portion 57J of the cartridge (see FIG. 18A). The sliding cap 70A is also slidable from a first position (see FIG. 19A) to a second position (see FIG. 19B).

The major differences in cartridges 10J and 10K when compared with, for example, cartridge 10H, include: a) the detection chamber 98J (see FIGS. 19A & 19F) and 98K comprise electrochemical sensor arrays 375J and 375K respectively, instead of an optical chamber 13 (see FIGS. 17A & 17B as an example); and b) the means for creating blood flow includes an analyzer pump instead of a cartridge air bladder (see 67H in FIG. 17A as an example).

A major difference between cartridges 10J and 10K is that cartridge 10J requires negative to positive pressure means and cartridge 10K requires positive to negative pressure means from the respective analyzer pumps, in order to create reciprocating or oscillating blood movement (also referred to as back and forth movement along the same path), if for example, mixing of a reagent in the cartridge with a blood sample, is required. The electrochemical sensor array 375J/ 375K shown may include one or more of an amperometric sensor (e.g an oxygen electrode for measuring the partial pressure of oxygen in a blood sample), a conductivity sensor also referred to as a conductimetric or conductometric sensor (e.g. a hematrocrit sensor, or an electrical switch), and a potentiometric sensor (e.g. an ion-selective electrode).

The electrochemical sensor array 375J or 375K, may be calibrated using fluid obtained from an analyzer that is in fluid communication with the cartridge. Means for calibrating electrochemical sensors are described, for example, in U.S. Pat. No. 5,096,669 to Imants Lauks et. al. and U.S. Pat. No. 9,901,928 to Chao Lin et. al. U.S. Pat. No. 5,096,669 describes a sealed blister within the cartridge, wherein the sealed blister contains the calibration fluid. U.S. Pat. No.

9,901,928 describes a collapsible calibration fluid pouch within the analyzer, wherein the collapsible fluid pouch contains the calibration fluid.

A difference between cartridges 10J and 100 and 10D, is the interface between the cartridge and the pump: cartridge 10J comprises a sealing member 211J (see FIGS. 18A, 19B & 19F) in the shape of a pliable washer that could mate with an analyzer pump probe (also termed analyzer liquid dispenser) for creating fluid connectivity between the cartridge and the analyzer pump. Cartridge 10K comprises a similar sealing member 211K. As an example, the analyzer pump probe could be a spring-loaded ball having a channel for creating fluid connectivity between the cartridge and the analyzer pump. In other words, instead of a pump needle as described previously, whereby the seal is between the outer surface of the needle and the sealing member 211C (see FIG. 12G) and 211D (see FIG. 13F), the seal is made at the surface of the washer 211J. A person having skill in the art could design other means for creating fluid connectivity between the cartridge and the analyzer pump, and any such means are considered to be within the scope of the present invention. The term analyzer pump probe (analyzer liquid dispenser) may be used to describe a hollow needle, a ball having a channel, or any other means for establishing fluid communication between the cartridge and an analyzer pump, provided that means for establishing fluid communication is used to transfer liquid from the analyzer to the cartridge.

Shown FIG. 18A is an exploded perspective top view of a cartridge 10J for measuring at least one property of blood, according to a ninth embodiment of the cartridge. Shown in FIG. 18B is a bottom view of the first housing member 50J of the cartridge shown in FIG. 18A, and shown in FIG. 18C is the bottom view of the first housing member 50J of the cartridge shown in FIG. 18B, overlaid by and in alignment with a gasket 100J shown in FIG. 18A. A cavity 395J is shown in first housing member 50J for forming a secondary mixing chamber 397J (see FIG. 19A). Shown in FIG. 18D is a top view of the second housing member 60J of the cartridge shown in FIG. 18A, and shown FIG. 18E is the top view of the second housing member 60J shown in FIG. 18D, overlaid by and in alignment with the gasket 100J shown in FIG. 18A. A cavity 391J is shown in second housing member 60J for forming a primary mixing chamber 393J (see 19A).

The two mixing chambers 393J and 397J cartridge 10J (see FIGS. 19A, 19B & 19C) in series is an example of a means to provide more efficient mixing of blood and dry reagent. One or more reagents may be disposed in the first mixing chamber 393J, for example, dry thromboplastin and a thrombin substrate that generates electroactive fragments as the clotting endpoint, for measuring PT-INR. In this example, turbulence is created as the blood flows into the larger volume of the mixing chamber 393J and dissolves the reagents. In order to create a more homogenous blood-reagent mixture, the mixture is allowed to flow from the primary mixing chamber 393J located at the bottom of the cartridge to the secondary mixing chamber 397J located at the top of the cartridge, via an orifice 101J in the gasket 100K, where further turbulence is created as the mixture moves through the orifice 101J (see FIGS. 18A-18O). Further mixing may be accomplished by oscillating the blood flow through the mixing chambers, as will be described for cartridge 10K.

Shown in FIG. 18F is a perspective top view of the cartridge 10J shown in FIG. 18A with the cap removed and shown in FIG. 18G is a perspective bottom view of the cartridge 10J shown in FIG. 18A.

Other properties of a blood sample, reagents, means for rapid dissolving of dried reagents, and means for mixing blood and reagents are described in U.S. Pat. No. 7,923,256 to Opalsky (hereby incorporated by reference). As explained by Opalsky, thrombin substrates are referred to as electrogenic materials because electrochemically detectable species are generated to allow determination of test endpoint. If the detection chamber comprises an optical chamber, "chromogenic" or "fluorogenic" substrates may be used whereby a change in the light absorbing or emitting properties of a sample may be used to indicates the endpoint. In a chromogenic test, for example, the substrate is an oligopeptide-chromogen which is colorless, but a brightly colored molecule is liberated (a chromophore) after thrombin cleaves the chromophore from the oligopeptide-chromogen complex. Example of electrogenic substrates (See U.S. Pat. No. 7,923,256 to Opalsky) include tosyl-glycyl-prolinyl-arginyl-, H-D-phenylalanyl-pipecolyl-, or benzyl-phenylalanyl-Valyl-arginyl moiety attached to an N-phenyl-p-phenylenediamine or N-pmethoxyphenyl-l-p-phenylenediamine moiety. Thrombin cleaves the amide bond at the carboxy-terminus of the arginine residue or pipecolyl residue because the bond structurally resembles the thrombin-cleaved amide linkage in fibrinogen. In these examples, the product of the thrombin-substrate reaction is an electrochemically inert tosyl-glycyl-prolinyl-arginyl-, H-D-phenylalanyl-pipecolyl-, or benzyl-phenylalanyl-valyl arginyl- and the electroactive compounds N-phenyl-p-phenylenediamine or N-p-methoxyphenyl-l-p-phenylenediamine. The tripeptide sequence is preferred because it renders the substrate virtually non-reactive with blood proteases other than thrombin and the reactivity of thrombin with the arginine amide linkage in the molecule is very similar to its reactivity with the target amide linkage in fibrinogen. When the substrate is present in a blood sample, generated thrombin simultaneously converts it and fibrinogen to their cleavage products. The electrochemical species reaction product is detected by an amperometric sensor.

Some embodiments of the cartridge, for example cartridge 10K do not have mixing chambers like 393J and 397J. Instead, the one or more dry reagents may be placed at any location in the entire fluid path from the sample storage well 51 to the detection chamber 98K. The one or more reagents may be deposited in a portion of the walls of the fluid path. Mixing of the blood and reagents may be accomplished by oscillating the blood along the fluid path containing reagents. A set of conductivity sensors, which could be in the detection chamber 98K (an electrochemical sensor chamber) or outside the detection chamber 13 (an optical chamber) as shown in FIG. 11G for cartridge 10B (see 200 in FIG. 11A), can be used to control the analyzer pump or a stepper motor that controls an air bladder like 67B in cartridge 10B, via a relay.

Shown in FIG. 19A is a top view of the cartridge 10J shown in FIG. 18A with the cartridge in an open position (i.e. the cap is in a first position), and shown in FIG. 19B is a top view of the cartridge 10J shown in FIG. 18A with the cartridge in a closed position (i.e. the cap is in a second position). Sometimes the cartridge in an open position is referred to as the cap in an open position, and the cartridge in a closed position is sometimes referred to as the cap in a closed position. Shown in FIG. 19D is a perspective top view of the cartridge cap 70J shown in FIG. 18A, and shown in FIG. 19E is a perspective bottom view of the cartridge cap 70J shown in FIG. 18A. Cap 70J is similar to cap 70G/70H shown in FIGS. 17D & 17E, except that cap 70J comprises a cap vent 85J.

Shown in FIG. 19C is an enlarged cross-sectional view through the cartridge 10J shown in FIG. 19B along line C-C, showing the mixing chambers 393J and 397J. Shown in FIG. 19F is an enlarged cross-sectional view through the cartridge 10J shown in FIG. 19A along line F-F, showing the sealing member 211J housed in a cartridge exit duct 217J, and the detection chamber 98J, which in this example is an electrochemical sensor chamber/conduit.

Shown in FIG. 19G is an enlarged cross-sectional view through the cartridge 10J shown in FIG. 19A along line G-G, when the cartridge is in an open position, and shown in FIG. 19H is an enlarged cross-sectional view through the cartridge 10J shown in FIG. 19B along line H-H, when the cartridge is in a closed position.

Shown in FIG. 20A is an exploded perspective top view of a cartridge 10K for measuring at least one property of blood, according to a tenth embodiment of the cartridge. Shown in FIG. 20B is a bottom view of the first housing member 50K of the cartridge shown in FIG. 20A, and shown in FIG. 20C is the bottom view of the first housing member 50K of the cartridge shown in FIG. 20B, overlaid by and in alignment with a gasket 100K shown in FIG. 20A. Shown in FIG. 20D is a top view of the second housing member 60K of the cartridge shown in FIG. 20A, and shown in FIG. 20E is the top view of the second housing member 60K shown in FIG. 20D, overlaid by and in alignment with the gasket 100K shown in FIG. 20A.

An extension 56K of the bottom opening 55 of sample storage well 51 of cartridge 10K is shown in FIGS. 20D and 20A, and enlarged views are provided in FIGS. 20F and 20H respectively. Shown in FIG. 20G is detail G shown in FIG. 20E, which is the extension 56K overlaid by and aligned with the gasket 100K. FIG. 20G should be viewed in conjunction with FIG. 21F, which illustrates a capillary stop in the form of an orifice 105K in the gasket 100K. Except for the orifice 105K, the gasket 100K provides a barrier between overlapping sections of the extension 56K of the bottom opening 55 of the sample storage well 51 and a distal portion of the detection chamber inlet conduit 97K, the proximal portion being the portion closer to the detection chamber 98K. In this case the detection chamber comprises an electrochemical/biosensor chamber/conduit. Providing that appropriate materials use for cartridge construction, capillary action is not sufficient for blood to be transferred from the extension 56K to the detection chamber inlet conduit 97K via the orifice 105K, but positive or negative pressure is sufficient to overcome any resistance provided by the orifice 105K. Therefore, the metered volume of blood after the cap 70K is slid from the first position (see FIG. 21A) to the second position (see FIG. 21B), is the volume from the top opening 53 of the sample storage well 51 to the orifice 105K. The orifice 105K is another example of a means for minimizing, mitigating, or modifying blood flow out of the sample storage well 51. Another advantage of the orifice 105K is that it may provide an escape for any air bubbles in the blood sample. In the case of cartridge 10J, a hydrophobic insert 225J (see FIGS. 19C, 19G & 19H) is used as the means for minimizing, mitigating, or modifying blood flow out of the sample storage well 51.

As illustrated in FIG. 21F, the volume of the extension 56K of the bottom opening 55 of sample storage well 51 of cartridge 10K is significantly smaller than the volume of the sample storage well 51, therefore any blood leaking past the bottom opening 55 into the extension 56K will not significantly affect the precision of the blood volume. In FIG. 21D, the bottom opening 55 of sample storage well 51 of cartridge 10K is shown to coincide with the gasket hole 103K. As illustrated in FIGS. 19C, 19G & 19H, the bottom opening 55 of sample storage well 51 of cartridge 10J is close to the hydrophobic insert 225J and no blood is expected to flow past the bottom opening 55 due to the hydrophobicity of the insert 225J. These two means for minimizing, mitigating, or modifying blood flow out of the sample storage well 51, are preferred to an enlarged cavity outside the bottom opening of the sample storage well, mentioned previously, because better precision in the metered volume of blood is expected. However, any means for minimizing, mitigating, or modifying blood flow out of the sample storage well 51 is considered to be within the scope of the present invention.

The detection chamber in a cartridge having a sliding cap may be one of an optical chamber and an electrochemical or biosensor chamber, and in the preceding discussions, either detection chamber may be used for measuring blood coagulation parameters, as an example. As described herein the cartridge comprises a sliding cap having one or more tracks that slidingly attach the sliding cap to the cartridge body so that the cap flat surface faces, and slides along, the upper surface, with the sliding cap sildable from a first position to a second position. In the first position the sample storage well is configured to receive the blood sample, and in the second position at least a portion the flat surface of the cartridge body mates with at least a portion of the cap flat surface and the sliding cap is positioned over the sample storage well.

Although the tracks are illustrated as linear tracks 367J/369J for example (see FIGS. 19B & 19C), the tracks may also be non-linear, for example having a reasonable amount of curvature whereby functionality is maintained. Linear and non-linear tracks are considered to be within the scope of the present invention. Regarding the relative height of the tracks, in some embodiments, for example cartridge 10K, distance H1 (see FIG. 21C) is slightly smaller than distance H2 (see FIG. 21D) in order for the cap to become wedged in as it moves from the first position to the second position, so as to provide an airtight seal between the cap and the cartridge when the cap is in the second position. H1 is defined as a height at one or more points along a second portion of the track 367K, wherein the second portion of the track is a portion of the track occupied by the cap when the cap is in the second position, and H2 is defined as a height of the track 367K at all points along a first portion of the track, wherein the first portion of the track is a portion of the track occupied by the cap when the cap is in the first position. H1 and H2 are sufficiently high to facilitate movement of the cap along the track, and wherein H1 is sufficiently smaller than H2 in order to provide an airtight seal between the cap and the cartridge when the cap is in the second position.

While the above description provides example embodiments, it will be appreciated that the present invention is susceptible to modification and change without departing from the fair meaning and scope of the accompanying claims. Accordingly, what has been described is merely illustrative of the application of aspects of embodiments of the invention. Numerous modifications and variations of the present invention are possible in light of the above teachings. It is therefore to be understood that within the scope of the appended claims, the invention may be practiced otherwise than as specifically described herein. Furthermore, the discussed combination of features might not be absolutely necessary for the inventive solution.

I claim:

1. A cartridge for measuring one or more properties of a blood sample, the cartridge comprising:
a cartridge body;
the cartridge body comprising an upper surface and a lower surface, the upper surface defining a sample storage well, and an optical chamber in fluid communication with the sample storage well;
the sample storage well comprising a top portion for receiving the blood sample and a bottom portion, the bottom portion for releasing at least a portion of the blood sample into the optical chamber, or for receiving a liquid stored within the cartridge or from a system when the cartridge is in fluid communication with the system, the liquid for mixing with the blood sample to produce an altered blood sample and releasing at least a portion of the altered blood sample into the optical chamber;
the optical chamber comprising at least one of an upper optical window and a lower optical window, the optical chamber for facilitating interrogation of the blood sample, or the altered blood sample by electromagnetic radiation;
a post-optical chamber conduit for receiving excess blood or excess altered blood from the optical chamber;
a flat surface located on the upper surface of the cartridge body, the flat surface of the cartridge body surrounding the top portion of the sample storage well;
one or more tracks that slidingly attach a sliding cap to the cartridge body, the sliding cap having a top side and an underside, wherein the underside of the sliding cap comprises a cap flat surface, the cap flat surface faces, and slides along, the upper surface, the sliding cap slidable from a first position to a second position;
in the first position the sample storage well is configured to receive the blood sample; and
in the second position at least a portion the flat surface of the cartridge body mates with at least a portion of the cap flat surface and the sliding cap is positioned over the sample storage well;
the cartridge further comprising at least one vent defined by a surface in the cap, or the at least one vent defined by a surface in the post-optical chamber conduit; and
the cartridge comprising a means for moving the blood sample or the altered blood sample out of the sample storage well and into the optical chamber.

2. The cartridge of claim 1, wherein the means for moving the blood sample or the altered blood sample comprises:
an air bladder disposed in the cartridge body, the air bladder in fluid communication with the sample storage well, the optical chamber and the post-optical chamber conduit, or
an analyzer pump attachable to the cartridge body and in fluid communication with the sample storage well, the optical chamber and the post-optical chamber conduit.

3. The cartridge of claim 2, wherein:
the at least one vent is defined by the surface of the post-optical chamber conduit, and
the flat surface of the cartridge body comprises an air bladder communication port or an associated analyzer pump communication port, and when the sliding cap is positioned over the sample storage well, a closed air passage is formed,
the closed air passage operatively connecting the air bladder communication port, or the associated analyzer pump communication port to the sample storage well so that pressurized air from the air bladder, or the associated analyzer pump, is transferable to the sample storage well,
wherein the closed air passage is facilitated by
a groove set into the upper surface of the cartridge body and aligned with the cap flat surface when the sliding cap is in the second position,
a recess set into the underside of the cap, or
a combination thereof,
whereby when the air bladder is squeezed, or the associated analyzer pump is activated, some, or all, of the blood sample is urged from the sample storage well towards the optical chamber, and air within the optical chamber is purged through the at least one vent.

4. The cartridge of claim 1, wherein the vent is defined by a surface in the cap, and the cartridge further comprises a cartridge exit duct operatively connected to the optical chamber, the cartridge exit duct attachable to an analyzer pump so that when the cartridge body is operatively connected to the analyzer pump, negative pressure from the analyzer pump is transferable through the exit duct and the optical chamber to the bottom portion of the sample storage well.

5. A system for measuring one or more properties of a blood sample, the system comprising a cartridge of claim 1 and an analyzer, the analyzer comprising:
a receptor for receiving the cartridge;
at least one source of interrogating electromagnetic radiation (EMR) for interrogating at least some of the blood sample when the blood sample is positioned within the optical chamber, or for interrogating at least some of the altered blood sample when the altered blood sample is positioned within the optical chamber;
at least one of:
a one-dimensional multi-channel detector for receiving EMR emerging from one of the blood sample in the optical chamber or the altered blood sample in the optical chamber, via an EMR dispersing element, the EMR dispersing element for providing wavelength-specific EMR and the one-dimensional multi-channel detector for generating wavelength-specific electrical signals, or
a two-dimensional multi-channel detector for receiving EMR emerging from one of the blood sample in the optical chamber or the blood sample in the optical chamber, and generating detector-specific electrical signals;
one or more analog to digital converter for receiving one or more of the wavelength-specific electrical signals for generating wavelength-specific digital information, or the detector-specific electrical signals for generating detector-specific digital information; and
one or more processors for controlling the analyzer and transforming at least one of the wavelength-specific digital information and the detector-specific digital information into the one or more properties of the blood sample.

6. The system of claim 5, wherein the system comprises the one-dimensional multi-channel detector and the two-dimensional multi-channel detector.

7. The system of claim 5, wherein the means for moving the blood sample or the altered blood sample comprises:
an air bladder disposed in the cartridge body, the air bladder in fluid communication with the optical chamber and the sample storage well, or an analyzer pump attachable to the cartridge body and in fluid communication with the optical chamber and the sample storage well.

8. The cartridge of claim 1, wherein the cartridge further comprises means for mitigating blood flow out of the bottom portion of the sample storage well when blood is received in the sample storage well through the top portion.

9. A cartridge for measuring one or more properties of a blood sample, the cartridge comprising:
a cartridge body;
the cartridge body comprising an upper surface and a lower surface, the upper surface defining a sample storage well, the sample storage well comprising a top portion for receiving the blood sample, and a bottom portion for receiving a liquid for mixing with the blood sample to produce an altered blood sample;
an optical chamber in fluid communication with the sample storage well, the optical chamber comprising at least one of an upper optical window and a lower optical window, the optical chamber for facilitating sample interrogation by electromagnetic radiation;
a flat surface located on the upper surface of the cartridge body, the flat surface of the cartridge body surrounding the top portion of the sample storage well;
a hollow sliding cap, slidably attached to the upper surface, the hollow sliding cap comprising an upper cap wall, a lower cap wall, side walls connecting the upper cap wall with the lower cap wall, the upper cap wall, the lower cap wall and the side walls defining a cap mixing cavity, the upper cap wall defining a cap vent for releasing pressure in the cap mixing cavity, the lower cap wall comprising a lower cap flat surface, the lower cap wall defining a cap inlet leading into the cap mixing cavity, the lower flat cap surface faces and slides along the upper surface, the hollow sliding cap movable from a first position to a second position;
in the first position the sample storage well is configured to receive the blood sample;
in the second position at least a portion of the flat surface of the cartridge body mates with at least a portion of the lower cap flat surface, and at least a section of the top portion of the sample storage well and at least a section of the cap inlet are brought into alignment so that the sample storage well is in fluid communication with the cap mixing cavity; and
the cartridge comprising a means for moving the blood sample and the liquid into the cap mixing cavity, and for moving the altered blood sample into the optical chamber.

10. The cartridge of claim 9, wherein the cartridge body further comprises one of:
one or more tracks that slidingly attach the hollow sliding cap to the cartridge body, the one or more tracks for sliding the hollow sliding cap from the first position to the second position, and
a pivot that slidingly attaches the hollow sliding cap to the cartridge body, the pivot for rotatably sliding the hollow sliding cap from the first position to the second position.

11. The cartridge of claim 9, wherein the cartridge body further comprises:
a directional valve stem moveable from a first position to a second position wherein, in the first position, the blood sample and the liquid are not in fluid communication, in the second position, a fluid communication between the blood sample and liquid is established; and
a means for moving the valve stem from the first position to the second position.

12. The cartridge of claim 11 wherein, when the cartridge is inserted into an analyzer, the means for moving the valve stem from the first position to the second position is provided by the analyzer.

13. The cartridge of claim 12, wherein the cartridge body further comprises:
a sealed blister containing the liquid,
a means for rupturing the sealed blister to produce a ruptured blister,
a liquid holding conduit in communication with the sample storage well when the valve is in the second position, the liquid holding conduit for temporarily holding a metered volume of the liquid after the liquid is released from the ruptured blister.

14. The cartridge of claim 12, wherein the cartridge body further comprises, a flappable valve element for preventing backflow of the liquid from the liquid holding conduit into the ruptured blister.

15. The cartridge of claim 9, wherein the post-optical chamber conduit comprises one or more reagents, the one or more reagents for mixing with the blood sample when present to produce an altered blood sample, and a means for drawing the altered blood sample into the optical chamber for altered blood sample interrogation.

16. A system for measuring one or more properties of a blood sample, the system comprising the cartridge of claim 9 and an analyzer, the analyzer comprising:
a receptor for receiving the cartridge;
at least one source of interrogating electromagnetic radiation (EMR) for interrogating at least some of the altered blood when the altered blood is positioned within the optical chamber;
at least one of:
a one-dimensional multi-channel detector for receiving EMR emerging from the altered blood sample in the optical chamber via an EMR dispersing element, the EMR dispersing element for providing wavelength-specific EMR, and the one-dimensional multi-channel detector for generating wavelength-specific electrical signals, or
a two-dimensional multi-channel detector for receiving EMR emerging from the altered blood sample in the optical chamber, and generating detector-specific electrical signals;
one or more analog to digital converter for receiving one or more of the wavelength-specific electrical signals for generating wavelength-specific digital information and the detector-specific electrical signals for generating detector-specific digital information; and
one or more processors for controlling the analyzer and transforming at least one of the wavelength-specific digital information and the detector-specific digital information into the one or more properties of a blood sample.

17. The system of claim 16, wherein system comprises the one-dimensional multi-channel detector and the two-dimensional multi-channel detector.

18. The system of claim 16, wherein the means for moving the blood sample and the liquid into the cap mixing cavity, and for moving the altered blood sample into the optical chamber comprises:
an air bladder disposed in the cartridge body, the air bladder in fluid communication with the optical chamber and the sample storage well, or
an analyzer pump attachable to the cartridge body and in fluid communication with the optical chamber and the sample storage well.

19. The system of claim 16, wherein the cartridge comprises the liquid in a sealed blister, or the cartridge is in fluid communication with the analyzer and the analyzer comprises the liquid in an analyzer liquid pouch.

20. The cartridge of claim 9, wherein the means for moving the blood sample and the liquid, and for moving the altered blood sample comprises:
   an air bladder disposed in the cartridge body, the air bladder in fluid communication with the optical chamber and the sample storage well, or
   an analyzer pump attachable to the cartridge body and in fluid communication with the optical chamber and the sample storage well.

21. A cartridge for measuring one or more properties of a blood sample, the cartridge comprising:
   a cartridge body comprising an upper surface and a lower surface, the upper surface defining a sample storage well, and one or more detection chambers in fluid communication with the sample storage well;
   the sample storage well comprising a top portion for receiving the blood sample and a bottom portion, the bottom portion for releasing at least a portion of the blood sample into the one or more detection chambers;
   a detection chamber exit conduit for receiving excess blood from the one or more detection chambers;
   a flat surface located on the upper surface of the cartridge body, the flat surface of the cartridge body surrounding the top portion of the sample storage well;
   one or more tracks that slidingly attach a sliding cap to the cartridge body, the sliding cap having a top side and an underside, wherein the underside of the sliding cap comprises a cap flat surface, the cap flat surface faces, and slides along, the upper surface, the sliding cap slidable from a first position to a second position;
   in the first position the sample storage well is configured to receive the blood sample; and
   in the second position at least a portion of the flat surface of the cartridge body mates with at least a portion of the cap flat surface and the sliding cap is positioned over the sample storage well;
the cartridge further comprising at least one vent defined by a surface in the cap, or the at least one vent defined by a surface in the detection chamber exit conduit; and
the cartridge comprising a means for moving the blood sample out of the sample storage well and into the one or more detection chambers.

22. The cartridge of claim 21, wherein the means for moving the blood sample comprises:
   an air bladder disposed in the cartridge body, the air bladder in fluid communication with the sample storage well, the one or more detection chambers and the detection chamber exit conduit, or
   an analyzer pump attachable to the cartridge body and in fluid communication with the sample storage well, the one or more detection chambers and the detection chamber exit conduit.

23. The cartridge of claim 21, wherein the one or more detection chambers comprises an optical chamber having at least one of an upper optical window and a lower optical window, the optical chamber for facilitating interrogation of the blood sample by electromagnetic radiation.

24. The cartridge of claim 21, wherein the one or more detection chambers comprises an electrochemical sensor chamber having at least one of an amperometric sensor, a conductivity sensor and a potentiometric sensor.

25. The cartridge of claim 21, wherein the one or more detection chambers comprises an optical chamber having at least one of an upper optical window and a lower optical window, the optical chamber for facilitating interrogation of the blood sample by electromagnetic radiation, and an electrochemical sensor chamber having at least one of an amperometric sensor, a conductivity sensor and a potentiometric sensor, and wherein the optical chamber is disposed between the sample storage well and the electrochemical sensor chamber, whereby the electrochemical sensor chamber receives blood flowing out of the optical chamber.

26. The cartridge of claim 25, further comprising means for calibrating at least one of the electrochemical sensors.

27. The cartridge of claim 21, wherein the one or more tracks is a female track having
   a first height defined as a height along a first portion of the track, wherein the first portion of the track is a portion of the track occupied by the cap when the cap is in the first position, and
   a second height defined as a height along a second portion of the track, wherein the second portion of the track is a portion of the track occupied by the cap when the cap is in the second position, wherein
   the first height and the second height are sufficiently high to facilitate movement of the cap along the track, and wherein the second height is sufficiently smaller than the first height in order to provide an airtight seal between the cap and the cartridge when the cap is in the second position.

28. The cartridge of claim 21, wherein cartridge further comprises one or more reagents and means for mixing the blood sample and one or more reagents.

29. The claim of cartridge 21, wherein the cartridge further comprises means for mitigating blood flow out of the bottom portion of the sample storage well when blood is received in the sample storage well through the top portion.

* * * * *

UNITED STATES PATENT AND TRADEMARK OFFICE
CERTIFICATE OF CORRECTION

PATENT NO. : 11,161,109 B2  
APPLICATION NO. : 16/854201  
DATED : November 2, 2021  
INVENTOR(S) : James Samsoondar Page 1 of 1

It is certified that error appears in the above-identified patent and that said Letters Patent is hereby corrected as shown below:

On the Title Page

On page 2 in the first column, change Reference Cited:  
From: 9,634,607 B2 4/2017 Nguyen et al.  
To: 8,634,607 B2 1/2014 Levenson et al.

Signed and Sealed this  
Fifteenth Day of March, 2022

Drew Hirshfeld  
*Performing the Functions and Duties of the*  
*Under Secretary of Commerce for Intellectual Property and*  
*Director of the United States Patent and Trademark Office*